(12) United States Patent
Usui et al.

(10) Patent No.: US 6,289,650 B1
(45) Date of Patent: Sep. 18, 2001

(54) AUTOMATIC PLATE MAKING MACHINE EQUIPPED WITH PHOTOSENSITIVE PRINTING PLATE SUPPLYING APPARATUS AND PRINTING PLATE PACKAGING MEANS

(75) Inventors: Takayuki Usui; Toshizi Sone, both of Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/302,259

(22) Filed: Apr. 30, 1999

(30) Foreign Application Priority Data

May 7, 1998 (JP) .................................. 10-125075
May 8, 1998 (JP) .................................. 10-126186

(51) Int. Cl.[7] .................................................. B65B 43/26
(52) U.S. Cl. ........................................ 53/381.1; 53/284.4
(58) Field of Search ................................. 206/585, 499, 206/501; 414/412; 53/381.1, 492, 284.4

(56) References Cited

U.S. PATENT DOCUMENTS 3,912,932 * 10/1975 Matsumoto et al. .
4,992,815 * 2/1991 Kudo .
5,246,121 * 9/1993 Mitake et al. .
5,884,451 * 3/1999 Kano et al. .
5,893,002 * 4/1999 Dirx .
5,907,946 * 6/1999 Oishi et al. .

* cited by examiner

Primary Examiner—Eugene Kim
(74) Attorney, Agent, or Firm—Sughrue, Mion, Zinn, Macpeak & Seas, PLLC

(57) ABSTRACT

A photosensitive printing plate supplying apparatus for supplying a photosensitive printing plate to an automatic plate making machine for a photosensitive printing plate includes a printing plate packaging device which accommodates a bundle of photosensitive printing plates; a printing plate accommodating portion to which the printing plate packaging device is removably attached and which can completely shield light from the exterior; and a taking-out/conveying device which takes out the photosensitive printing plates from an interior of the printing plate packaging device in the light-shielded accommodation portion and conveys the photosensitive printing plates to a predetermined position. When the printing plate packaging means has an opening/closing lid, the photosensitive printing plate supplying apparatus may further include a lid opening/closing device. In this case, the lid opening/closing device operates in an interlocking manner with the taking-out/conveying device, and is opened when the taking-out operation by the taking-out/conveying device is started, and is closed when the taking-out operation is completed.

7 Claims, 36 Drawing Sheets

AUTOMATIC PLATE MAKING MACHINE EQUIPPED WITH PHOTOSENSITIVE PRINTING PLATE SUPPLYING APPARATUS AND PRINTING PLATE PACKAGING MEANS

BACKGROUND OF THE INVENTION

1. Field of the Invention

The present invention relates to an automatic plate making machine equipped with a photosensitive printing plate supplying apparatus and photosensitive printing plate packaging means. In the photosensitive printing plate supplying apparatus, photosensitive printing plates packaged in the printing plate packaging means are first taken out therefrom in a condition in which light from the outside is blocked, and the photosensitive printing plates which have been taken out are conveyed to a predetermined position in an automatic plate making machine or the like by the same supplying apparatus. The photosensitive printing plate packaging means is designed such that taking out the photosensitive printing plates from the packaging means by the photosensitive printing plate supplying apparatus can be carried out in an optimum way inside the same supplying apparatus.

2. Description of the Related Art

In recent years, since the automation of plate making processes has become easy due to electrophotographic plate making methods, photosensitive printing plates (PS plates) have been widely used. Such a photosensitive printing plate is, for example, a plate in which an electrophotographic photosensitive layer is formed on a thin aluminum plate. The electrophotographic printing plate is loaded into an automatic plate making machine such as a digital plate recorder (setter) or the like. The electrophotographic photosensitive layer is exposed, developed, fixed, and the like on the basis of an original image by this automatic plate making machine to form a printing plate.

Further, the automatic plate making machine may include a printing plate supplying apparatus for automating the supply of photosensitive printing plates. When a bundle of photosensitive printing plates, in which a plurality of photosensitive printing plates are stacked, is loaded into this printing plate supplying apparatus, one photosensitive printing plate is taken out from the bundle of photosensitive printing plates by the printing plate supplying apparatus when the plate making process is started, and this photosensitive printing plate is conveyed to a position at which the plate making process is started.

The automatic plate making machine successively conveys the photosensitive printing plates, which have been conveyed to the starting position of plate making, to an exposure portion, a development portion, a fixing portion, and the like in accordance with a predetermined plate making process and discharges the photosensitive printing plates, for which the plate making has been completed, to the exterior of the apparatus.

The photosensitive printing plate as described above has high photosensitivity and a chemical change may occur in the photosensitive layer when exposed by light, even if the amount of light is very small. Further, a change may occur in the photosensitive layer by the photosensitive layer absorbing moisture in the air.

In order to prevent a change in the quality of the photosensitive printing plate due to such changes, the photosensitive printing plates are packaged in an internal wrapper, which has light-shielding properties and moisture-proof properties, from the time when the photosensitive printing plates are manufactured to the time when the photosensitive printing plates are loaded into the photosensitive printing plate supplying apparatus in the automatic plate making machine. The internal wrapper includes a paper having good light-shielding properties and moisture-proof properties, for example, an aluminum kraft paper in which polyethylene is melted and applied to the kraft paper to adhere aluminum foil thereon, a black polyethylene laminated kraft paper in which melted polyethylene mixed with black carbon is applied to kraft paper, or the like.

Further, in order to prevent damage or the like to the photosensitive printing plates or the internal wrapper in a carrying process or a storing process from the time when the photosensitive printing plates are manufactured to the time when the photosensitive printing plates are loaded into the photosensitive printing plate supplying apparatus in the automatic plate making machine, a packaging box is separately manufactured and the photosensitive printing plates packaged in the internal wrapper are accommodated within this packaging box. The packaging box is, for example, a corrugated cardboard box or the like which is light and has high strength.

However, in this case, when the photosensitive printing plates packaged in the internal wrapper are loaded into the photosensitive printing plate supplying apparatus in the automatic plate making machine, the internal wrapper has to be opened to take out the photosensitive printing plates.

Similarly, in the case of photosensitive printing plates which are packaged in an internal wrapper and placed within a packaging box, when the photosensitive printing plates are loaded into the printing plate supplying apparatus in the automatic plate making machine, it is necessary to open the packaging box first, to take out the photosensitive printing plates from the packaging box, and further to open the packaging, i.e., the internal wrapper having light-shielding properties.

As a result, in order to prevent accidental exposure of the photosensitive printing plates before loading, the operation in which the photosensitive printing plates are loaded into the photosensitive printing plate supplying apparatus is to be effected manually in a dark environment. Accordingly, the operational efficiency is extremely poor and the work is burdensome to the operator.

Moreover, when the entire room in which the automatic plate making machine is provided is made dark, it is difficult to carry out other operations within the room and it is sometimes necessary to stop such other operations. Thus, the operational efficiency is unsatisfactory.

SUMMARY OF THE INVENTION

With the aforementioned in view, an object of the present invention is to provide an automatic plate making machine which is equipped with: a printing plate automatic supplying apparatus, in which it is not necessary to open manually a packaging material, such as a packaging paper (an internal wrapper), a packaging box, or the like, of a photosensitive printing plate and the loading operation of the printing plates can be effected under the bright environment; and the photosensitive printing plate packaging means which is designed such that taking out the photosensitive printing plates from the packaging means by the photosensitive printing plate supplying apparatus can be carried out in an optimum way inside the same supplying apparatus.

In order to achieve the above-described object, the present invention has following aspects.

A first aspect of the present invention is an automatic plate making machine for a photosensitive printing plate, comprising: a photosensitive printing plate supplying apparatus; and printing plate packaging means which accommodates a bundle of photosensitive printing plates and which has an opening/closing lid which can open and close a supply opening through which the photosensitive printing plates are taken out, wherein the photosensitive printing plate supplying apparatus includes: a printing plate accommodating portion to which the printing plate packaging means is removably attached, the supply opening being closed by the opening/closing lid of the printing plate packaging means when the printing plate packaging means is attached to the printing plate accommodating portion, and which holds the printing plate packaging means within a light-shielded chamber which shields light from the exterior; taking-out/conveying means which takes out the photosensitive printing plates one by one from the interior of the printing plate packaging means whose supply opening is opened in the light-shielded chamber, and conveys the photosensitive printing plate to a predetermined position; and lid opening/closing means which, when the taking-out operation by the taking-out/conveying means is started, moves the opening/closing lid of the printing plate packaging means to an opening position in which the supply opening is opened, and after the taking-out operation by the taking-out/conveying means is completed, the lid opening/closing means returns the opening/closing lid of the printing plate packaging means to a closing position in which the supply opening is closed.

In accordance with the first aspect, in the light-shielded chamber of the printing plate accommodating portion, the opening/closing lid of the printing plate packaging box is moved to the opening position by the lid opening/closing means and the supply opening is opened interlocking with the starting of the taking-out operation by the taking-out/conveying means, and after the taking-out operation by the taking-out/conveying means is completed, the opening/closing lid of the printing plate packaging box is returned to the closing position by the lid opening/closing means and the supply opening is closed.

Thus, when the printing plate packaging box, within which the bundle of photosensitive printing plates is accommodated, is attached with its lid portion being closed to the printing plate accommodating portion, the photosensitive printing plates can be automatically taken out from the printing plate packaging box in the light-shielded chamber by the taking-out/conveying means. Therefore, there is no need to effect the operation of opening the opening/closing lid of the printing plate packaging box containing the bundle of the photographic printing plates at the exterior of the apparatus, and the operation of loading the photosensitive printing plates can be effected even under the bright environment without exposing the photosensitive printing plates.

Further, even if the printing plate packaging box attached to the printing plate accommodating portion is removed to the outside of the apparatus, exposure of the photosensitive printing plates is reliably prevented by the opening/closing lid. Accordingly, the photosensitive printing plates can be replaced without being subject to exposure even under the bright environment.

The taking-out operation by the taking-out/conveying means may be completed (that is, may complete one cycle) every time the one sheet of photosensitive printing plate is taken out from the printing plate packaging box. However, when the plurality of sheets of photosensitive printing plates are taken out continuously from the printing plate packaging box, the taking-out operation may be completed when the last sheet of the plurality of sheets of photographic printing plates is taken out to the exterior, instead of completing the taking-out operation when each sheet of photosensitive printing plate is taken out.

Further, when the bundle of photosensitive printing plates is accommodated within the printing plate packaging box, the photosensitive printing plates are accommodated within the printing plate packaging box in a state in which the printing plates are stacked in the thickness direction. At this time, a sheet of superposing paper may be inserted between each photosensitive printing plate for protecting the photosensitive surfaces of the photosensitive printing plates. The number of sheets of the photosensitive printing plates accommodated within the printing plate packaging box does not have to be plural and may be only one.

A second aspect of the present invention is an automatic plate making machine for a photosensitive printing plate according to the first aspect, wherein the printing plate packaging means includes a box main body, which is formed in a box shape such that the bundle of photosensitive printing plates can be accommodated therein and which is provided with the supply opening through which the photosensitive printing plates are taken out, and an opening/closing lid which can be removably attached to the box for opening/closing the supply opening.

In accordance with the second aspect, when the above-described photosensitive printing plate packaging means is attached to the printing plate accommodating portion in the printing plate supplying apparatus, the lid opening/closing means moves the opening/closing lid to a opening position or an closing position in the light-shielded chamber and thus the supply opening of the printing plate packaging box can be opened/closed. Also, in accordance with the second aspect, since the opening/closing lid removably covers the box, when the supply opening is to be opened, the lid opening/closing means moves the opening/closing lid to the opening position which removes the opening/closing lid from the box, and when the supply opening is to be closed, the lid opening/closing means moves the opening/closing lid at the opening position to the closing position in which the opening/closing lid covers the box.

A third aspect of the present invention is an automatic plate making machine for a photosensitive printing plate according to the first aspect, wherein the printing plate packaging means includes a box main body, which is formed in a box shape such that the bundle of photosensitive printing plates can be accommodated therein and which is provided with the supply opening through which the photosensitive printing plates are taken out, and an opening/closing lid which can be swingably attached to the box for opening/closing the supply opening.

In accordance with the third aspect, when the above-described photosensitive printing plate packaging means is attached to the printing plate accommodating portion in the printing plate supplying apparatus, the lid opening/closing means moves the lid portion to a opening position or an closing position in the light-shielded chamber and thus the supply opening of the printing plate packaging box can be opened/closed. Also, in accordance with the third aspect, since the lid portion is swingably supported by the box, the lid opening/closing means swings the lid portion to the opening position or the closing position.

A fourth aspect of the present invention is an automatic plate making machine for a photosensitive printing plate, wherein the printing plate packaging means includes a box main body, which is formed in a box shape such that the bundle of photosensitive printing plates can be accommodated therein and which is provided with the supply opening through which the photosensitive printing plates are taken out, and an opening/closing lid which can be slidably attached to the box for opening/closing the supply opening.

In accordance with the fourth aspect of the present invention, when the above-described photosensitive printing plate packaging means is attached to the printing plate accommodating portion in the printing plate supplying apparatus, the lid opening/closing means moves the opening/closing lid to an opening position or a closing position in the light-shielded chamber and thus the supply opening of the printing plate packaging box can be opened/closed. Also, in accordance with the fourth aspect, since the opening/closing lid is slidably supported by the box, the lid opening/closing means slides the opening/closing lid to the opening position or the closing position.

The box and the opening/closing lid in the printing plate packaging box serving as the photosensitive printing plate packaging means which is based on the above-described second through fourth aspects are formed from any suitable materials having light-shielding properties, e.g., corrugated cardboards, or corrugated cardboards, in which an opaque resin film or the like is adhered onto one side surface thereof so that the light-shielding properties are strengthened. Further, in a case of the structure in which any joint is formed at the box or the opening/closing lid, it is necessary to reliably close or cover the joint so that the light does not enter the box from this joint. Further, it may be necessary to provide a specific portion on the lid portion through which the lid portion and the box closely contacting each other along the supply opening such that the gap between the lid portion and the box is completely closed and entry of light into the gap is not allowed. Providing a light-shielding material along the supply opening is another option among options for achieving this purpose.

A fifth aspect of the present invention is an automatic plate making machine for a photosensitive printing plate, comprising: a photosensitive printing plate supplying apparatus; and printing plate packaging means which accommodates a bundle of photosensitive printing plates, wherein the photosensitive printing plate supplying apparatus includes: a printing plate accommodating portion to which the printing plate packaging means is removably attached and which holds the printing plate packaging means within a light-shielded chamber which shields light form the exterior; and taking-out/conveying means which takes out the photosensitive printing plates one by one from the interior of the printing plate packaging means in the light-shielded chamber and conveys the photosensitive printing plates to a predetermined position, and the printing plate packaging means includes: a packaging means main body which packages and shields the photosensitive printing plates from light and exposes at least a portion of the packaged photosensitive printing plates when a pulling-out force of a predetermined value or more is applied from the exterior; and a jutting-out portion which is provided at the packaging means main body, and in a state in which the packaging member is loaded into the photosensitive printing plate supplying apparatus and light-shielded, the jutting-out portion jutting out of the photosensitive printing plate supplying apparatus.

In accordance with this fifth aspect, the photosensitive printing plates are packaged and completely shielded from light in the packaging means main body. As a result, the photosensitive printing plates can avoid accidental exposure much more reliably than the prior art from the time when the photographic printing plate is manufactured to the time when the photographic printing plate is loaded into the printing plates supplying apparatus.

Moreover, according to this aspect, when the packaging means main body in which the photosensitive printing plates are packaged is loaded and completely shielded from light within the photosensitive printing plate supplying apparatus, the jutting-out portion provided at the packaging means main body juts outwards from the photosensitive printing plate supplying apparatus. As a result, this pulling-out portion is pulled out such that the pulling-out force is applied to the packaging means main body from the exterior.

When this pulling-out force reaches a predetermined value, the packaging means main body breaks and at least a portion of the packaged photosensitive printing plate packaged therein is made exposed. The photosensitive printing plate supplying apparatus can now convey the photosensitive printing plate to the starting position of plate making of the automatic plate making machine. Further, as the photosensitive printing plates made exposed 64 losing the packaging means main body is still completely shielded from light by the photosensitive printing plate supplying apparatus, the photosensitive printing plate can reliably avoid being subject to accidental exposure.

Accordingly, since the photosensitive printing plate is always loaded into the photosensitive printing plate supplying apparatus in a state in which the photosensitive printing plate is light-shielded by the packaging means main body, the loading operation can be carried out even under the bright environment. Therefore, the operational efficiency improves as compared to the conventional example in which the loading operation is effected under the dark environment, and the operator's burden is significantly reduced.

The package means main body may have a structure in which the entire photosensitive printing plate is exposed by the pulling-out force, in place of the aforementioned structure in which only a portion of the photosensitive printing plate is exposed. In order to make the entire photosensitive printing plate exposed, it is preferable that the materials or structures are determined so as to reduce the coefficient of friction between the outer surface of the packaging means main body and the portion of the photosensitive printing plate supplying apparatus which contacts the packaging means main body, such that a portion of the photosensitive printing plate is made exposed even by a small pulling-out force.

In a sixth aspect of the present invention, the packaging means main body based on the fifth aspect is further provided with separate portions which separate the packaging means main body into two or more portions when a pulling-out force applied from the jutting-out portion is applied.

Consequently, when the pulling-out force which is applied to the packaging means main body by way of the jutting-out portion reaches a predetermined value, the packaging means main body is separated at the separate portions and the portion of the photosensitive printing plate can be made exposed.

Namely, by simply providing the separate portions in the packaging means, a portion of the photosensitive printing plate can be made exposed more easily when the pulling-out force is applied.

In a seventh aspect of the present invention, the separate portions based on the sixth aspect are provided as two linear portions which cross substantially at right angles.

Consequently, when the packaging means main body which packages the photosensitive printing plate is loaded into the photosensitive printing plate supplying apparatus, it is not necessary to consider the loading direction of the packaging means main body with respect to the supplying apparatus. In addition, it is not necessary to consider the orientation of the packaging means main body with respect to the photosensitive printing plates in packaging. Therefore, applicability of the packaging means main body increases.

In an eighth aspect of the present invention, the packaging means main body based on the fifth aspect is formed by a plurality of packaging member which have been separated in advance, and the jutting-out portion is provided at at least one of the packaging members.

In the eighth aspect, the packaging means main body is formed by the plurality of packaging members separated in advance and, as a result, the contact portions of the packaging members function as separate portions. In this case, since it is not necessary to provide the specific "separate portions", the structure of the packaging means main body is simplified and the manufacturing thereof is easy.

In accordance with the eighth aspect, as the jutting-out portion provided at at least one of the packaging members juts outwards from the photosensitive printing plate supplying apparatus, the packaging members are separated by pulling this jutting-out portion and a portion of the photosensitive printing plate is easily exposed.

In a ninth aspect of the present invention, light-shielding means which completely shields the interior of the packaging means main body from the exterior (light) is provided at the separate portions based on the sixth or seventh aspect.

Due to the light-shielding means, light does not enter the packaging means main body through the separate portions and the photosensitive printing plate packaged in the packaging means main body can reliably avoid accidental exposure.

In the tenth aspect of the present invention, to the plurality of the packaging members based on the eighth or ninth aspect which form the packaging means main body, fixing means for fixing the plurality of packaging members to each other is removably attached.

Because the plurality of packaging members are reliably fixed by such fixing means, when the packaging means main body is carried, stored, or the like, the packaging member is less likely to experience accidental separation.

Since the fixing means is removably attached to the packaging member, when the fixing means is removed, the jutting-out portion which juts out of the photosensitive printing plate supplying apparatus can be pulled out so as to separate the packaging members, and thus at least a portion of the photosensitive printing plate can be made exposed within the photosensitive printing plate supplying apparatus.

In an eleventh aspect of the present invention, holding means is provided at the jutting-out portion in the structure according to any one of the fifth through tenth aspects.

In accordance with the eleventh aspect, the operator can hold the holding means, and therefore, can reliably pull out the jutting-out portion and apply the pulling-out force thereto.

In a twelfth aspect of the present invention, seal means which seals the packaging means main body at the jutting-out portion is provided at the jutting-out portion in the structure according to any one of the fifth through eleventh aspects.

Namely, the packaging means main body is sealed at the jutting-out portion by the seal means provided at the jutting-out portion and the light-shielding properties are increased.

The seal means may be the one which completely seals the jutting-out portion by an adhesive agent or the like. However, the seal means may be, for example, the one which simply bends a portion or all of the jutting-out portion.

In a thirteenth aspect of the present invention, display means which displays information regarding the packaging means main body and/or the photosensitive printing plate is provided at at least a portion of the packaging means main body in the structure according to any one of the fifth through twelfth aspects.

This display means may be a display means, which is directly seen and readable by the operator, or a display means of another type (e.g., barcode, magnetic information, optical information, or the like), which is mechanically readable by a reading device or the like provided at the photosensitive printing plate supplying apparatus.

When the operator directly reads the display means, the operational efficiency can be increased, for example, by displaying the operational procedure and the direction of loading, the size, the type, the amount, or the like of the photosensitive printing plates. When the machine reads the display means, the operation of the photosensitive printing plate supplying apparatus and the automatic plate making machine or the like can be automatically controlled by recognizing the size, the type, the amount, or the like of the photosensitive printing plate.

DESCRIPTION OF THE PREFERRED EMBODIMENTS

[First Embodiment]

(Structure of First Embodiment)

Figure 1:
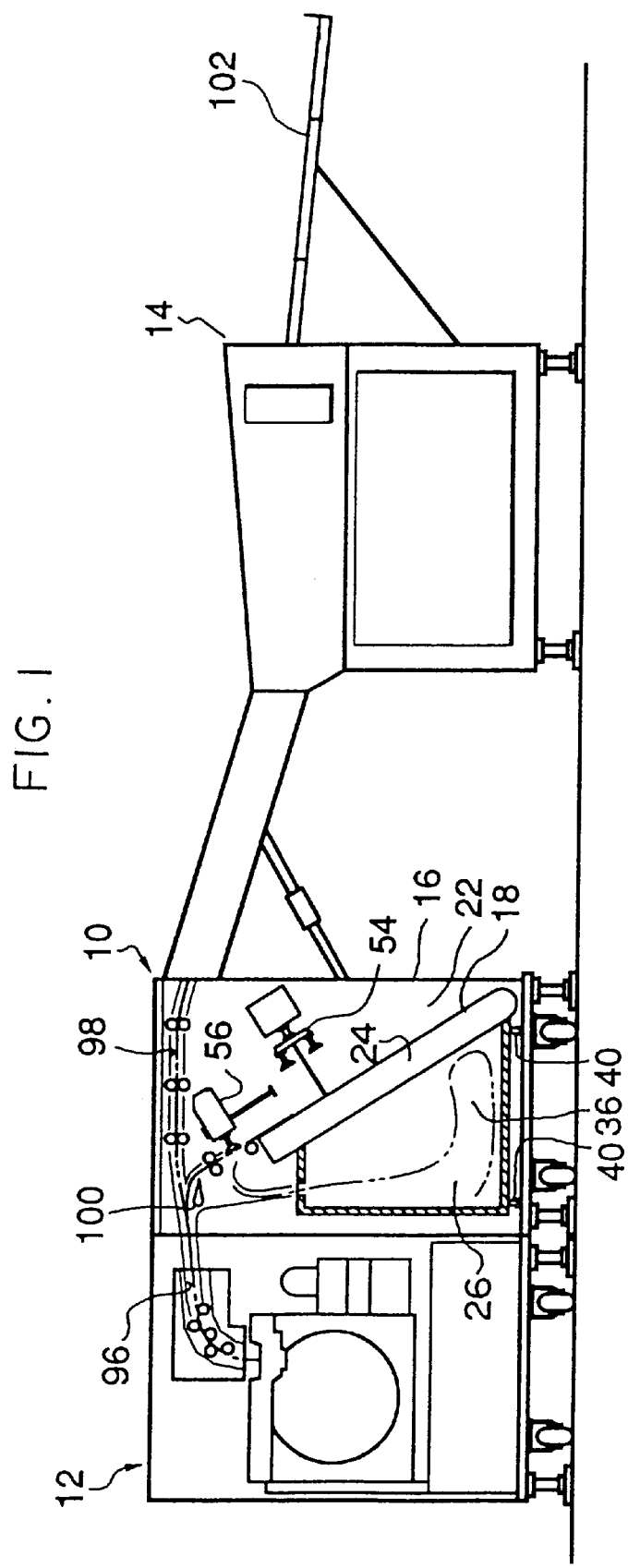
FIG. 1 is a side cross-sectional view showing an automatic plate making machine to which a printing plate supplying apparatus based on a first embodiment of the present invention is applied.
Figure 2:
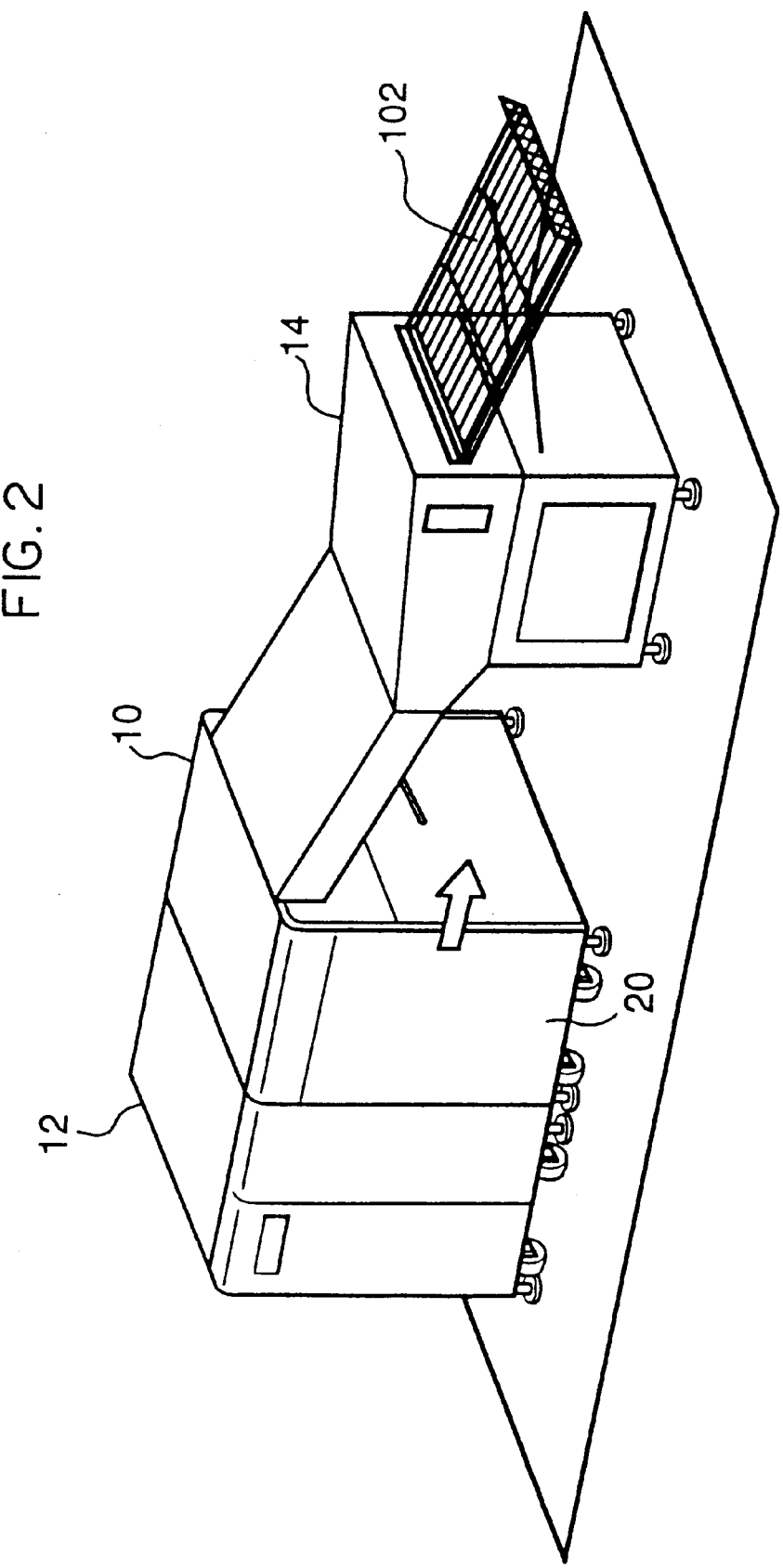
FIG. 2 is a perspective view showing the automatic plate making machine to which the printing plate supplying apparatus based on the first embodiment is applied.
Figure 3:
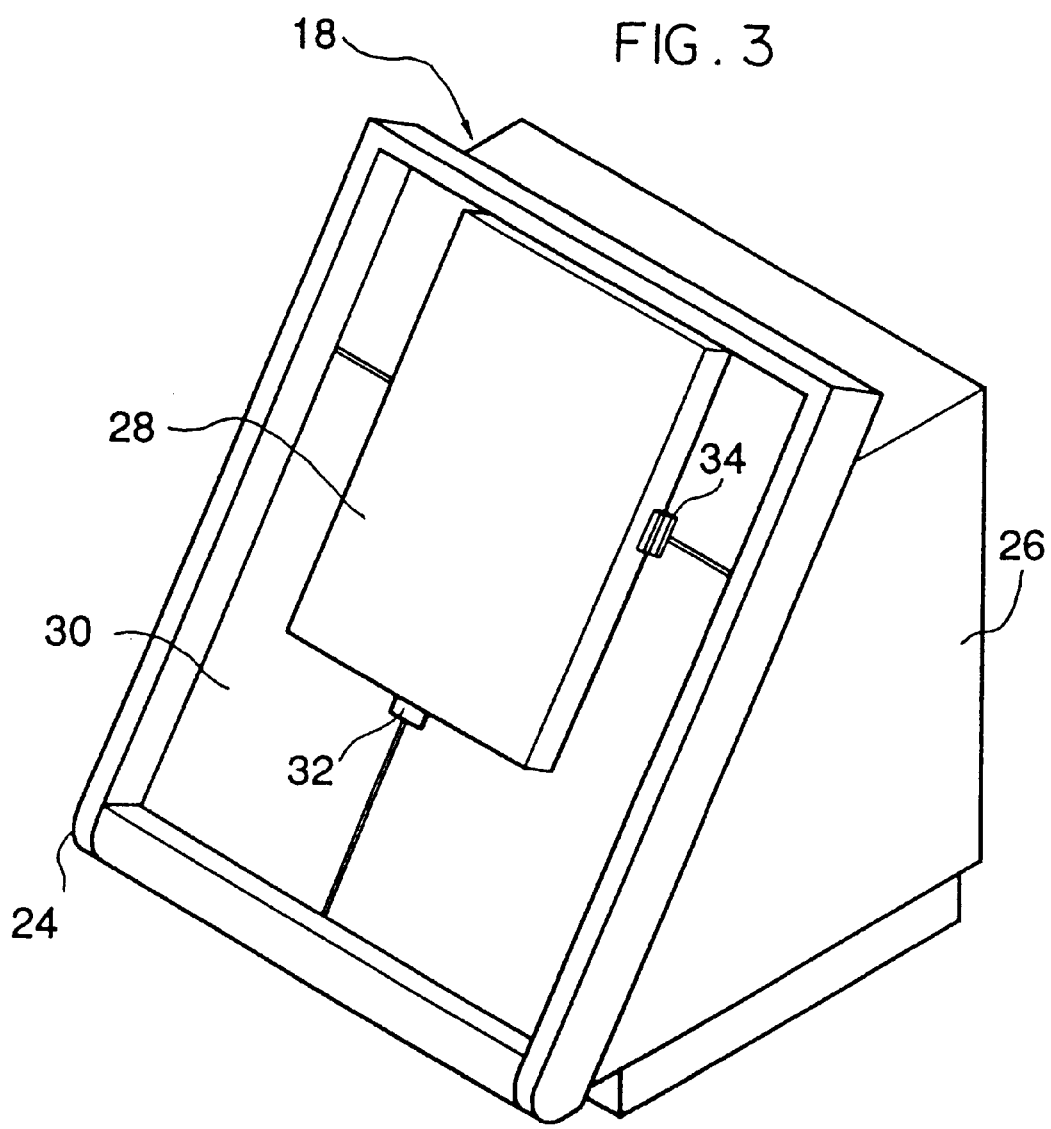
FIG. 3 is a perspective view showing a state in which a printing plate packaging box serving as photosensitive printing plate packaging means is loaded into a printing plate supplying cassette relating to the first embodiment.

FIGS. 1 and 2 show an automatic plate making machine to which a printing plate supplying apparatus based on a first embodiment of the present invention is applied. FIG. 3 shows a printing plate supplying cassette serving as photosensitive printing plate packaging means which is loaded into the printing plate supplying apparatus relating to the first embodiment of the present invention.

As shown in FIG. 1, the automatic plate making machine comprises a printing plate supplying apparatus 10, an exposure apparatus 12, and a developing-fixing apparatus 14. The printing plate supplying apparatus 10 includes a cabinet-shaped plate accommodating portion 16 and a printing plate supplying cassette 18 which is removably attached to this printing plate accommodating portion 16.

An attachment/removal port (not shown) for attaching and removing the printing plate supplying cassette 18 is formed on one side surface of the printing plate accommodating portion 16, and as shown in FIG. 2, a slide door 20 is disposed at this attachment/removal port. The slide door 20 is slidably supported along the attachment/removal port by the printing plate accommodating portion 16 and is held at a closed position shown in FIG. 2 or an opened position at which the slide door 20 has been slid from the closed position in the direction of an arrow such that the attachment/removal port opens.

When the slide door 20 is held at the opened position, the printing plate supplying cassette 18 is attachable to/removable from the printing plate accommodating portion 16. When the slide door 20 is held at the closed position, a light-shielded chamber 22 in which the entry of light from outside is completely blocked is formed within the printing plate accommodating portion 16 and the printing plate supplying cassette 18 is held within this light-shielded chamber 22.

As shown in FIG. 3, the printing plate supplying cassette 18 includes a printing plate loading case 24 and a supporting stand 26 which supports this printing plate loading case 24. The printing plate loading case 24 is formed in a shallow cabinet shape in which one surface (upper surface) thereof in the thickness direction is opened. A substantially rectangular mounting surface 30, at which a printing plate packaging box 28 is set, is provided on the bottom surface of the printing plate loading case 24. Positioning plates 32 and 34 for positioning and fixing the printing plate packaging box 28 at a predetermined reference position are disposed on this mounting surface 30.

The supporting stand 26 supports the printing plate supplying cassette 18 from the lower surface side of the cassette 18 so that the longitudinal extending portion of the mounting surface 30 slants with respect to the horizontal direction. The positioning plate 32 is disposed such that it can be moved in the longitudinal direction of the mounting surface 30, and when the printing plate packaging box 28 is loaded onto the mounting surface 30, the positioning plate 32 is fixed at a position which corresponds to the lower end of the printing plate packaging box 28 such that the positioning plate 32 abuts the lower side surface of the printing plate packaging box 28 on the mounting surface 30.

When the printing plate packaging box 28 is positioned, the printing plate packaging box 28 is positioned so that the side surface disposed at the upper side substantially corresponds to the upper end of the mounting surface 30. Further, the pair of positioning plates 34 are disposed so as to be movable in the transverse directions of the mounting surface 30. When the printing plate packaging box 28 is loaded onto the mounting surface 30, the positioning plates 34 are fixed at the positions which corresponds to the lateral ends of the printing plate packaging box 28 such that the positioning plates 34 respectively abut the transverse direction side surfaces of the printing plate packaging box 28 on the mounting surface 30. Accordingly, the printing plate packaging box 28 is positioned so that the transverse direction center thereof substantially corresponds to that of the mounting surface 30.

The reference position on the mounting surface 30 need not be at the center. The reference position may be set to a "left side surface reference position" at which one side surface of the printing plate packaging box 28 abuts the left-hand-side inner side wall of the printing plate loading case 24 or to a "right side surface reference position" at which one side surface of the printing plate packaging box 28 abuts the right-hand-side inner side wall of the printing plate loading case 24.

As shown in FIG. 1, the supporting stand 26 forms superposing paper accommodating portion 36 in the shape of a hollow chamber beneath the printing plate loading case 24. Further, a pair of guide members 40 are provided on the bottom surface of the printing plate accommodating portion 16. The pair of guide members 40 extends in the transverse direction of the printing plate loading case 24 and engages with the lower surface of the supporting stand 26. In this way, in a state in which the slide door 20 is held at the opened position, the printing plate supplying cassette 18 is supported movably between an attachment position at which the printing plate supplying cassette 18 can be accommodated within the printing plate accommodating portion 16 by the guide members 40 and a printing plate replacement position at which the cassette 18 is supported at the exterior of the printing plate accommodating portion 16.

Figure 4:
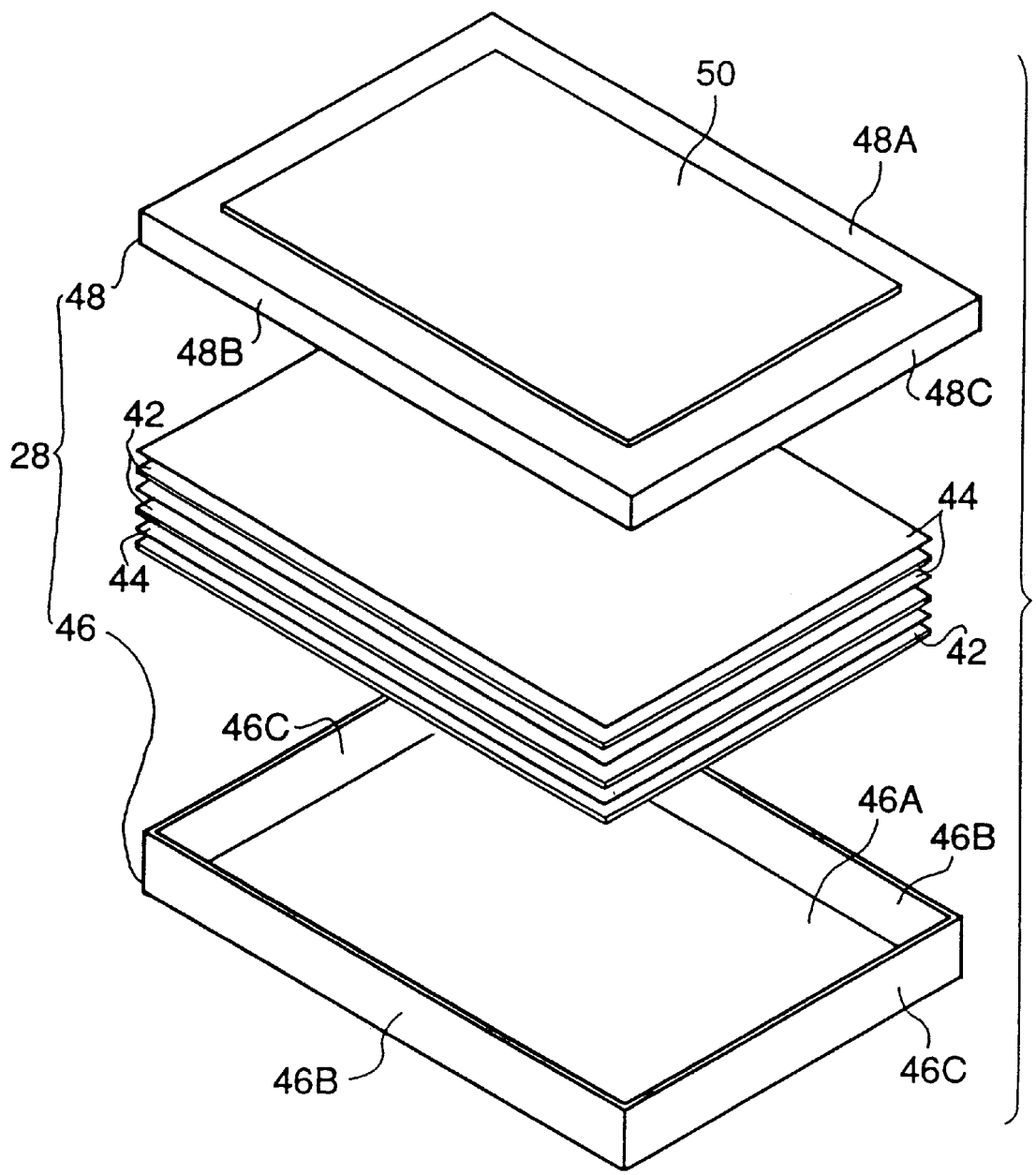
FIG. 4 is a perspective view showing a state in which an opening/closing lid of the printing plate packaging box which is loaded into the printing plate supplying cassette relating to the first embodiment has been removed from a box.
Figure 5A:
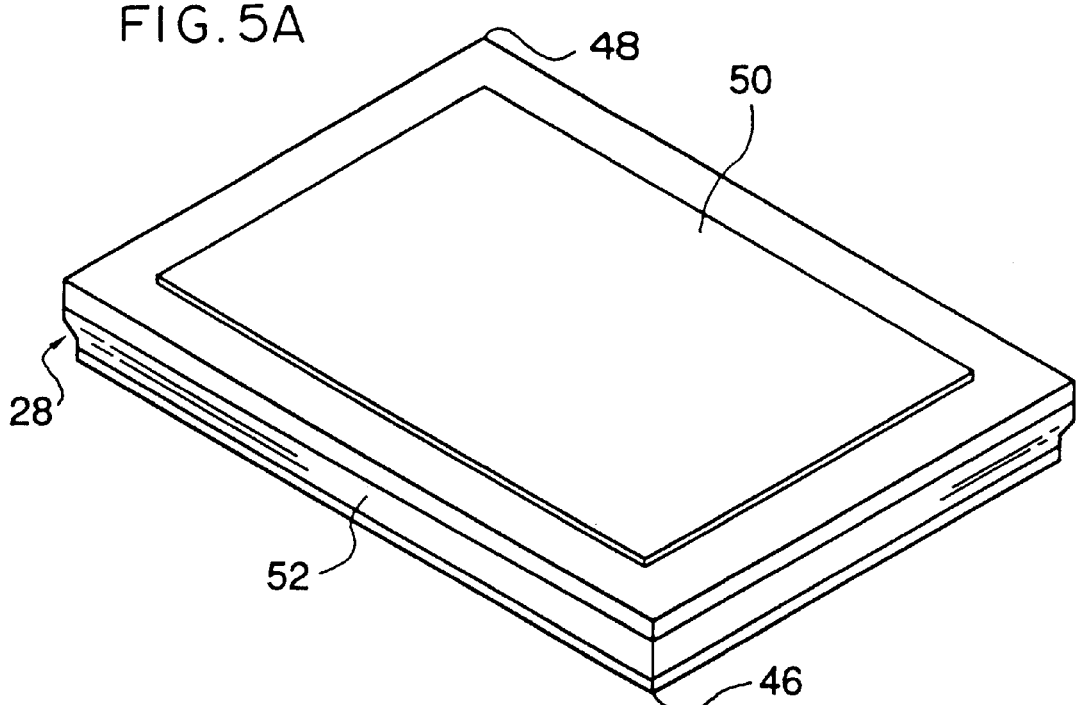
FIG. 5A is a perspective view which shows a state in which the opening/closing lid covers the box of the printing plate packaging box which is loaded into the printing plate supplying cassette relating to the first embodiment.
Figure 5B:
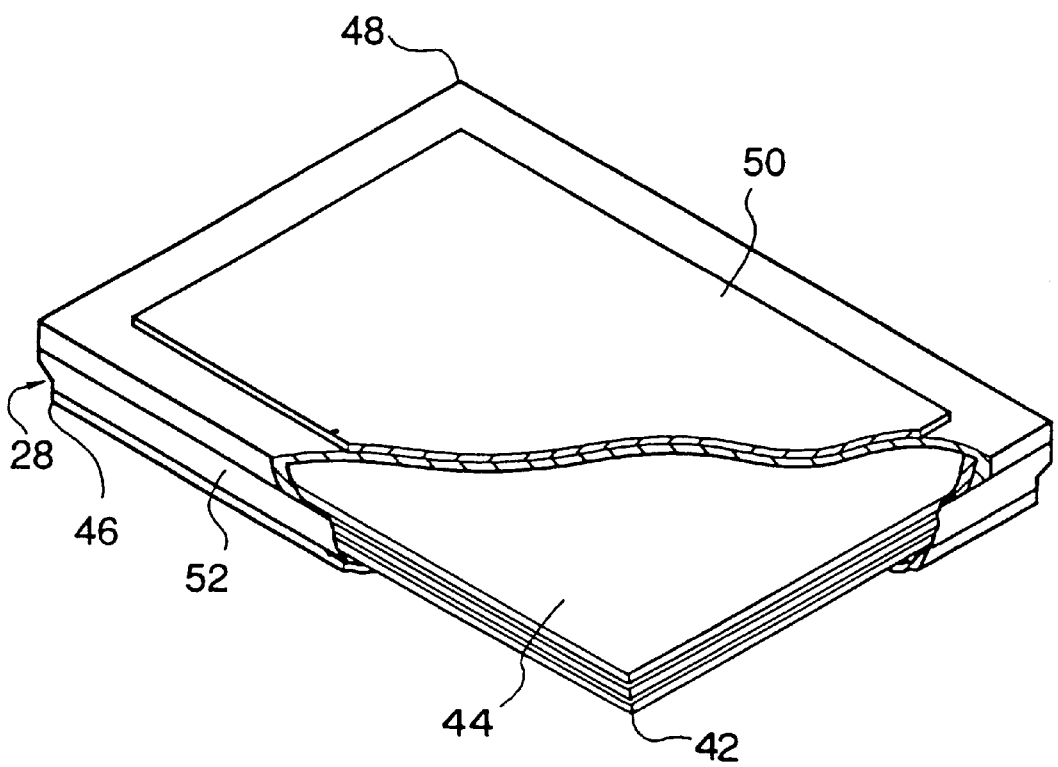
FIG. 5B is a perspective view in which a portion of the printing plate packaging box in FIG. 5A is broken.

FIGS. 4 and 5 show a printing plate packaging box 28 which is loaded into the printing plate supplying cassette 18 in the first embodiment.

The printing plate packaging box 28 contains a plurality of sheets of photosensitive printing plates 42 and superposing papers 44 and is loaded into the printing plate loading case 24 of the printing plate supplying cassette 18. As shown in FIG. 4, the printing plate packaging box 28 comprises a box main body 46 and an opening/closing lid 48 which removably covers the box main body 46.

These box main body 46 and opening/closing lid 48 are manufactured from materials having sufficient strength and light-shielding properties. Such materials include: for example, an A-flute double wall corrugated fiberboard having basic weights of an outer liner, a central core, and a middle liner of 280 g/m$^3$, 125 g/m$^3$, and 280 g/m$^3$, respectively; a double wall corrugated fiberboard having basic weights of an outer liner and a middle liner of 150 g/m$^3$ and 400 g/m$^3$, respectively, and basic weight of a central core of 100 to 250 g/m$^3$; a double wall corrugated fiberboard which uses a reinforced central core as a central core; a double wall corrugated fiberboard having an AB flute; a cardboard of basic weight is approximately 400 to 3000 g/m$^3$, a laminated paper in which a plurality of thin papers are laminated and which has basic weight of approximately 400 to 3000 g/m$^3$.

As shown in FIG. 4, the box main body 46 comprises a bottom plate portion 46A which forms a rectangular bottom surface portion of the box, a side plate portion 46B at a long edge side and a side plate portion 46C at a short edge side which are bent at substantially right angles from the peripheral edge of this bottom plate portion 46A. The upper surface side of the box main body 46 is opened and this upper surface opening serves as a supply opening for taking out the photosensitive printing plate 42 to the exterior.

Since the side plate portions 46B and 46C are directly bent from the bottom plate portion 46A, a joint is not formed between the bottom plate portion 46A and the side plate portions 46B, 46C. However, a joint in which edge portions of a pair of the side plate portions 46B and 46C are joined together is formed between the side plate portions 46B and 46C. In order to obtain reliably sufficient light-shielding properties at this joint, a developed (unfolded) configuration of the box main body 46 is designed such that the box main body 46 has portions in which the side plate portions 46B and 46C overlap (for adhesion) in an assembled state. The overlapping portion as the adhesion widths are adhered together by vinyl acetate adhesive agent or the like, and as a result, the side plate portions 46B and 48B are joined without clearance. It is not necessary to form the box main body 46 from one material. For example, the box main body 46 may be formed by attaching the side plate portions 46B and 46C integrally shaped as a quadrate frame onto the bottom plate portion 46A.

As shown in FIG. 4, the opening/closing lid 48 comprises a top plate portion 48A in which a rectangular top surface which corresponds in shape to the upper opening of the box main body 46 is formed, a side plate portion 48B at a long edge side and a side plate portion 48C at a short edge side which are bent at right angles from the peripheral edge of this top plate portion 48A. In the same way as the case of the box main body 46, a joint is formed between the side plate portions 48B and 48C. Therefore, the opening/closing lid 48 has a developed (unfolded) configuration in which the opening/closing lid 48 has portions in which the side plate portions 48B and 48C overlap (for adhesion) in an assembled state. The overlapping portions as the adhesion widths are adhered together and the side plate portions 48B and 48C are joined without clearance.

As shown in FIG. 4, a predetermined number of photosensitive printing plates 42 and superposing papers 44 are accommodated within the box main body 46.

The photosensitive printing plate 42 is, for example, the one in which an electrophotographic photosensitive layer is formed on one surface of an aluminum plate having a thickness of 0.3 mm and is used as a material of a printing plate in known electrophotographic plate making methods. Further, the superposing paper 44 is manufactured, for example, from bleached pulp and is adhered to the photosensitive surface of the photosensitive printing plate 42 at weak adhesive strength for protecting the photosensitive layer of the photosensitive printing plate 42. The photosensitive printing plate 42 and the superposing paper 44 are alternately stacked in the thickness direction and placed on the bottom plate portion 46A in a state in which the photosensitive printing plates 42 and the superposing papers 44 are accommodated within the box main body 46.

The inner dimensions of the box main body 46 in the long edge direction and the short edge direction are slightly larger than those of the photosensitive printing plate 42 in the longitudinal direction and the transverse direction. The movement of the photosensitive printing plates 42 within the box main body 46 is restricted by the side plate portions 46B and 46C. The opening/closing lid 48 covers the box main body 46 containing the photosensitive printing plates 42 and the superposing papers 44 such that the upper surface opening (supply opening) is closed.

The opening/closing lid 48 is formed so that the depth thereof is smaller than that of the box main body 46. When the opening/closing lid 48 covers the box main body 46, the lower end portions of the side plate portions 46B and 46C of the box main body 46 are exposed to the exterior. Therefore, when the printing plate packaging box 28 is attached to the mounting surface 30, the positioning plates 32 and 34 abut only the lower end portions of the side plate portions 46B and 46C (that is, not abutting the side plate portions 48B and 48C located outside of the side plate portions 46B and 46C) when these positioning plates 32 and 34 position the printing plate packaging box 28 at a predetermined reference position. Accordingly, since the positioning plates 32 and 34 are prevented from contacting the opening/closing lid 48, the opening/closing lid 48 can be opened and closed without being interfered with by the positioning plates 32 and 34.

The opening/closing lid 48 is provided with a light-shielding portion (not shown) which adheres over the entire peripheral edge portion of the upper opening in a state in which the box main body 46 is covered. Due to this light-shielding portion of the opening/closing lid 48, light is prevented from entering the interior of the printing plate packaging box 28 through the clearance between the box main body 46 and the opening/closing lid 48.

Such light-shielding portion of the opening/closing lid 48 adheres to at least one portion of the upper end, the outer side surface, and the inner side surface of the side plate portions 46B and 46C of the box main body 46. Further, in order to increase the light-shielding properties of the light-shielding portion at the opening/closing lid 48, a sponge or velvet-type light-shielding member or the like having light-shielding properties and flexibility may be adhered along the light-shielding portion.

As shown in FIG. 5A, a sheet material whose surface is sufficiently smooth and air tight is adhered to the outer surface of the top plate portion 48A of the opening/closing lid 48 and this sheet material functions as a portion 50 to be sucked. When the outer surface of the top plate portion 48A has sufficient smoothness and air tightness, the portion 50 to be sucked as the sheet material or the like can be omitted.

Further, before the printing plates packaging box 28 is loaded into the printing plate supplying cassette 18, the opening/closing lid 48 of the printing plates packaging box 28 is fixed to the box main body 46 by an adhesive tape 52 for fixing. This adhesive tape 52 is adhered over the lower end portions of the opening/closing lid 48 to the outer side surfaces of the box main body 46 in such a way that the clearance between the lower end portions of the opening/closing lid 48 and the outer side surfaces of the box main body 46 are sealed up and the opening/closing lid 48 is fixed to the upper portion of the box main body 46. The adhesive tape 52 is adhered to the box main body 46 and the opening/closing lid 48 at the adhesive strength which does not cause the surface layer portions of the box main body 46 and the opening/closing lid 48 to peel off at the time of peeling the adhesive tape 52.

The adhesive tape 52 attached to the printing plate packaging box 28 structured as described above is peeled and removed when the printing plate packaging box 28 is loaded into the printing plate supplying cassette 18. As shown in FIG. 1, the printing plate supplying cassette 18, into which this printing plate packaging box 28 is loaded, is installed within the printing plate accommodating portion 16 at the attachment position. Within the light-shielded chamber 22 of the printing plate accommodating portion 16, the lid opening/closing mechanism 54 is disposed at a position corresponding to the opening/closing lid 48 of the printing plate packaging box 28 and the taking-out/conveying mechanism 56 is disposed at a position corresponding to the photosensitive printing plate 42 within the printing plate packaging box 28.

Figure 6:
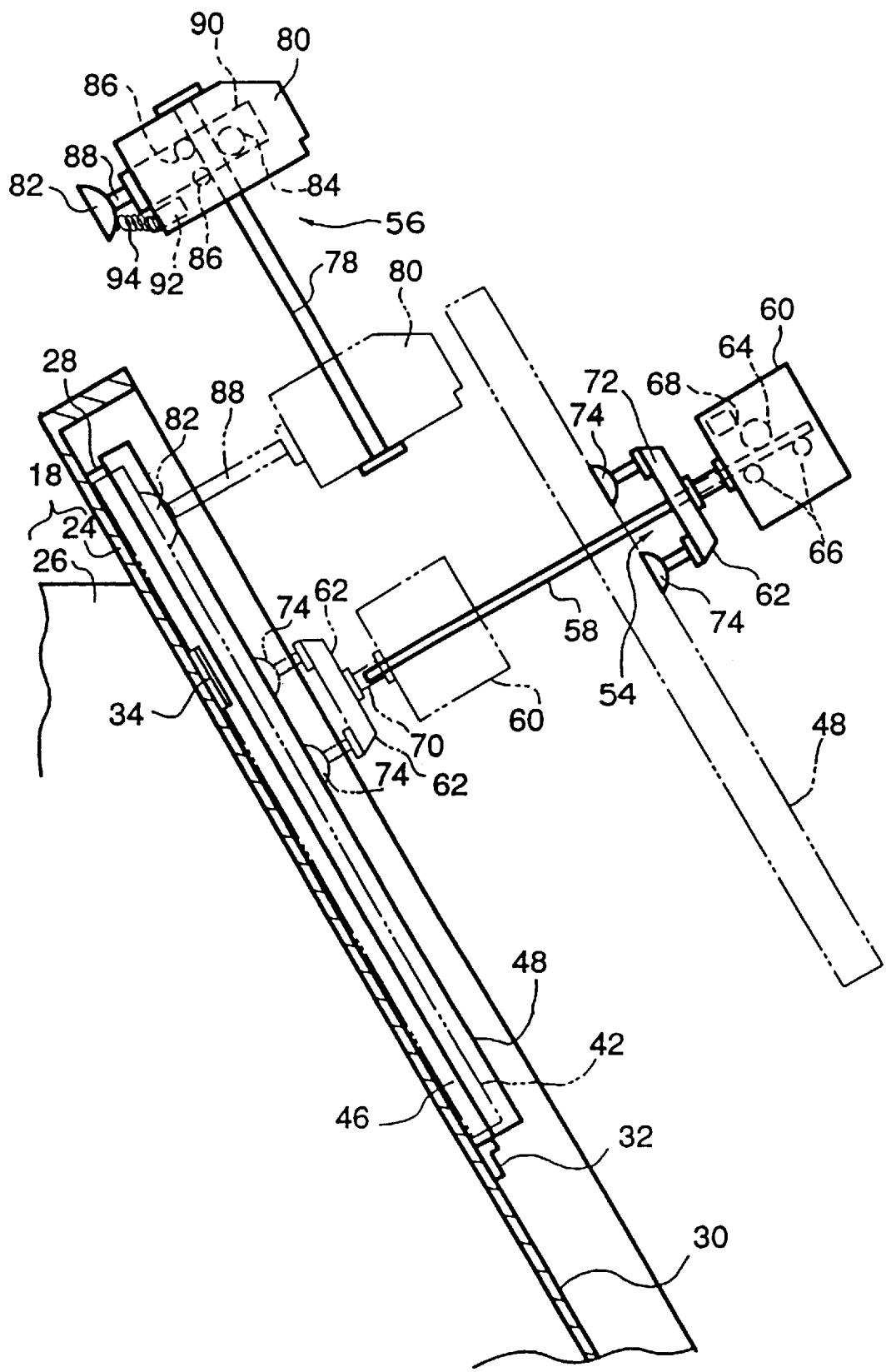
FIG. 6 is a side view which shows the structure of a lid opening/closing mechanism and a taking-out/conveying mechanism in the printing plate supplying apparatus based on the first embodiment.

As shown in FIG. 6, the lid opening/closing mechanism 54 includes a guide rail 58 which is fixed to the interior of the printing plate accommodating portion 16, a drive portion 60 which is movably supported along this guide rail 58, and a lid sucking portion 62 which is supported by this drive portion 60.

The guide rail 58 extends in the direction normal to the mounting surface 30 of the printing plate supplying cassette 18. The drive portion 60 is provided with a drive motor (not shown), a drive roller 64 which is normally and reversely rotated by this drive motor, and idle rollers 66 which sandwich the guide rail 58 with this drive roller 64 as shown. When the drive roller 64 of the drive portion 60 rotated normally or reversely, the drive portion 60 moves in the direction of moving closer to or away from the printing plate packaging box 28 on the mounting surface 30. Further, an air suction pump 68 is provided in the drive portion 60.

The lid sucking portion 62 includes a slide shaft 70 and a supporting plate 72. The drive portion 60 slidably supports the slide shaft 70 in the direction normal to the mounting surface 30 and urges the slide shaft 70 towards the mounting surface 30 at a predetermined bias force.

The supporting plate 72 is fixed to the distal end portion of the slide shaft 70 such that the supporting plate 72 is disposed substantially parallel to the mounting surface 30, and a plurality of suction cups 74 (two in FIG. 6) are disposed on this supporting plate 72 such that the suction cups 74 oppose the mounting surface 30. The suction cups 74 are molded from an elastic material such as a silicon rubber or the like and the suction surfaces thereof which oppose the mounting surface 30 is formed as concave-shaped curved surfaces. An air suction pipe (not shown), which extends from the air suction port of the air suction pump 68, is connected to the suction cups 74, and the terminal end of this air suction pipe opens at the suction surfaces of the suction cups 74.

As shown in FIG. 6, the taking-out/conveying mechanism 56 includes a guide rail 78 which is fixed within the printing plate accommodating portion 16, a drive portion 80 which is movably supported along this guide rail 78, and a suction cup 82 which is supported by this drive portion 80. The guide rail 78 is supported so as to be disposed substantially parallel to the longitudinal direction of the mounting surface 30.

The drive portion 80 is provided with a drive motor (not shown), a drive roller 84 which is normally and reversely rotated by this drive motor, and idle rollers 86 which sandwich the guide rail 78 with this drive roller 84 as shown. When the drive roller 84 of the drive portion 80 is rotated normally or reversely, the drive portion 80 moves in the lower end direction or the upper end direction of the guide rail 78.

The drive portion 80 is provided with an air suction pump 92 and an actuator 90 which extends or contracts the slide shaft 88 in the direction normal to the mounting surface 30. The suction cup 82 is fixed to the distal end of the slide shaft 88 and this suction cup 82 extends or contracts the slide shaft 88 and moves closer to or away from the printing plate packaging box 28 on the mounting surface 30 in accordance with extension/retraction of the slide shaft 88.

The suction cup 82 is molded from an elastic material such as a silicon rubber or the like, and the suction surface thereof which opposes the photosensitive printing plate 42 is formed as a concave-shaped curved surface. An air suction tube 94, which extends from the air suction port of the air suction pump 92, is connected to the suction cup 82, and the terminal end of this air suction tube 94 opens on the suction surface of the suction cup 82. Moreover, the drive portion 80 is provided with a metal sensor (not shown) which determines whether an object sucked by the suction cup 82 is a metal.

In the above-described lid opening/closing mechanism 54 and the taking-out/conveying mechanism 56, the provision of the air suction pump 68 in the drive portion 60 and that of the air suction pump 92 in the drive portion 80 may be omitted. Or, these air suction pumps 68 and 92 may be directly supported by the printing plate accommodating portion 16 and connected to the suction cups 74 and 82 by an extensible/retractable air suction tube or the like.

As shown in FIG. 1, the automatic plate making machine in the first embodiment is provided with a printing plate conveying path 96 which extends from the printing plate accommodating portion 16 to the exposure apparatus 12 and a printing plate conveying path 98 which extends from the printing plate accommodating portion 16 to the development-fixing apparatus 14.

These printing plate conveying paths 96 and 98 are formed by the guide plate, the conveying roller, or the like and conveys the photosensitive printing plate 42 along the conveying path shown by a double-dashed chain line. An entrance portion of the plate conveying path 96 is provided within the printing plate accommodating portion 16. At the entrance portion of this printing plate conveying path 96, a pair of conveying rollers and a switching pawl 100 for switching the conveying direction of the superposing paper 44 and the photosensitive printing plate 42 which are being conveyed by the conveying roller pair, are provided.

The exposure apparatus 12 is provided with a supporting drum which takes up the photosensitive printing plate 42 conveyed by the printing plate conveying path 96 and supports the taken-up photosensitive printing plate 42 from the reverse surface side, and an optical writing unit which scans by laser beam the photosensitive surface of the photosensitive printing plate 42 supported by this supporting drum and other members. The photosensitive printing plate 42, on which a latent image has been formed by this exposure apparatus 12, is conveyed to the development-fixing apparatus 14 by the printing plate conveying paths 96 and 98. The development-fixing apparatus 14 develops and fixes the latent image on the photosensitive printing plate 42, and thereafter, discharges the printing plate 42 onto a printing plate tray 102.

(Operation of First Embodiment)

The operation of the printing plate supplying apparatus 10 structured as above based on the first embodiment will be explained.

The printing plate supplying apparatus 10 is controlled by a system control portion (not shown) which controls the entire automatic plate making machine. The system control portion receives a starting signal of plate making and image data corresponding to an original image from a host apparatus or the like provided at the exterior of the printing plate supplying apparatus 10 and then starts an operation of supplying the photosensitive printing plates 42 by the printing plate supplying apparatus 10.

At the start of the supplying operation of the photosensitive printing plates 42, the system control portion normally rotates the drive roller 64, moves the drive portion 60 from a standby position shown by a solid line in FIG. 6 to a suction position shown by a double-dashed chain line, and drives the air suction pump 68.

In this way, the suction cups 74 press and contact the portion 50 to be sucked of the printing plate packaging box 28 loaded into the printing plate supplying cassette 18 and are stuck to the portion 50 to be sucked due to the negative pressure generated by the air suction pump 68. At this time, when the suction cups 74 press the portion 50 to be sucked at a predetermined force or more, the slide shaft 70 which is slidably supported and urged in the extending direction by the drive portion 60 retracts. Accordingly, application of excessively large pressing force to the printing plate packaging box 28 by the suction cups 74 is prevented.

Further, after the suction cups 74 are stuck to the portion 50 to be sucked, the air suction pump 68 closes a pressure valve (not shown) in an internal circuit which communicates with the air suction pipe so that negative pressure generated between the suction cups 74 and the portion 50 to be sucked is maintained.

In a state in which the suction cups 74 are stuck to the portion 50 to be sucked of the opening/closing lid 48, the system control portion reversely rotates the drive roller 64 and moves the drive portion 60 from the suction position to the standby position. As the drive portion 60 moves toward the standby position, the opening/closing lid 48 is removed from the box main body 46 and the upper opening of the box main body 46 is exposed. When the drive portion 60 has moved to the standby position, the opening/closing lid 48 is held at the release position in which the opening/closing lid 48 does not interfere with the operation of the taking-out/conveying mechanism.

When the opening/closing lid 48 is stuck to the lid sucking portion 62 and the drive portion 60 moves to the standby position, the system control portion normally rotates the drive roller 84 and moves the drive portion 80 of the taking-out/conveying mechanism 56 from a supply position shown by a solid line in FIG. 6 to a removal position shown by a double-dashed chain line. At this time, the suction cup 82 is supported by the drive portion 80 so as to face the photosensitive surface of the photosensitive printing plate 42 within the box main body 46.

When the drive portion 80 moves to the taking-out position, the system control portion extends the slide shaft 88 by the actuator 90 so that the suction cup 82 presses and contacts the superposing paper 44 or the photosensitive printing plate 42 and then drives the air suction pump 92. In this way, the suction cup 82 is stuck to the superposing paper 44 or the photosensitive printing plate 42 due to negative pressure generated by the air suction pump 92. After the suction cup 82 is stuck to the photosensitive printing plate 42, the air suction pump 92 closes a pressure valve (not shown) within an internal circuit which communicates with the air suction tube 94 so that the negative pressure generated between the suction cup 82 and the superposing paper 44 or the photosensitive printing plate 42 is maintained.

Further, the system control portion determines whether the suction cup 82 is stuck to the superposing paper 44 or to the photosensitive printing plate 42 on the basis of the signal from the metal sensor provided in the drive portion 80 and changes the position of the switching pawl 100 in accordance with the type of an object stuck to the suction cup 82.

When the suction cup 82 is stuck to the photosensitive printing plate 42 or the superposing paper 44, the system control portion retracts the slide shaft 88 by the actuator 90, lifts the superposing paper 44 or the photosensitive printing plate 42 from the interior of the box main body 46, and brings the distal end portion of this superposing paper 44 or the photosensitive printing plate 42 to the exterior of the loading case 24. From this state, the system control portion reversely rotates the drive roller 84 and moves the drive portion 80 towards the upper end of the guide rail 78.

In this way, the superposing paper 44 or the photosensitive printing plate 42 is conveyed towards the entrance portion of the printing plate conveying path 96 within the printing plate accommodating portion 16. When the drive portion 80 has reached the upper end of the guide rail 78, the distal end portion of the superposing paper 44 or the photosensitive printing plate 42 is inserted through a nip portion between the conveying roller pair disposed at the entrance portion of the printing plate conveying path 96. Thereafter, the system control portion opens the pressure valve disposed at the internal circuit of the air suction pump 92 so that air is introduced into the suction cup 82 and the suction cup 82 loses the absorbing force, and then starts conveying the photosensitive printing plate 42 and the superposing paper 44 by the printing plate conveying path 96.

When the rear end of the photosensitive printing plate 42 or the superposing paper 44 is conveyed to the exterior of the printing plate supplying cassette 18, the system control portion normally rotates the drive roller 64 and moves the drive portion 60 again to the suction position. Due to this, the opening/closing lid 48 which is stuck to the lid sucking portion 62 covers the box main body 46 and the upper opening of the photosensitive printing plate 42 is closed.

When the drive portion 60 moves to the suction position, the system control portion opens the pressure valve in the internal circuit of the air suction pump 68 so that the suction force between the suction cups 74 and the portion 50 to be sucked is lost. Thereafter, the drive roller 64 is reversely rotated and the drive portion 60 is returned to the standby position.

Moreover, when it is determined that the object stuck to the suction cup 82 is the superposing paper 44, the system control portion moves the switching pawl 100 (see FIG. 1) to the position in which the pawl blocks the printing plate conveying path 96. On the contrary, when it is determined that the object stuck to the suction cup 82 is the photosensitive printing plate 42, as shown in FIG. 1, the system control portion holds the switching pawl 100 at the position in which the pawl does not block the printing plate conveying path 96.

As a result, when the taking-out/conveying mechanism 56 takes out one sheet of superposing paper 44 from the box main body 46, this superposing paper 44 falls onto the superposing paper accommodating portion 36 by the printing plate conveying path 96. When the taking-out/conveying mechanism 56 takes out one sheet of photosensitive printing plate 42 from the box main body 46, this photosensitive printing plate 42 is conveyed to the exposure apparatus 12 by the printing plate conveying path 96.

In accordance with the above-described printing plate supplying apparatus 10 of the first embodiment, in association with the start of the taking-out operation of the photosensitive printing plate 42 by the taking-out/conveying mechanism 56 in the light-shielded chamber 22 of the printing plate accommodating portion 16, the opening/closing lid 48 of the printing plate packaging box 28 is removed from the box main body 46 and the upper opening of the box main body 46 is exposed by the lid opening/closing mechanism 54. In addition,, when the taking-out operation of the photosensitive printing plate 42 by the taking-out/conveying mechanism 56 is completed, the opening/closing lid 48 of the printing plate packaging box 28 is moved back to the box main body 46 (the closed position) by the lid opening/closing mechanism 54 so that the opening/closing lid 48 covers the box main body 46 and the upper opening of the box main body 46 is closed.

In this way, when the printing plate packaging box 28, within which a plurality of sheets of photosensitive printing plates 42 are accommodated, is loaded into the printing plate supplying cassette 18 in a state in which the lid portion 48 is closed and the printing plate supplying cassette 18, into which this printing plate packaging box 28 has been loaded, is installed within the printing plate accommodating portion 16, the photosensitive printing plates 42 can be automatically taken out from the printing plate packaging box 28 by the taking-out/conveying mechanism 56 within the light-shielded chamber 22. Consequently, there is no need to carry out the operation of opening (removing) the opening/closing lid 48 of the printing plate packaging box 28, within which the photosensitive printing plates 42 are accommodated, at the outside of the apparatus. Therefore, the operation of loading the photosensitive printing plates 42 can be carried out under the bright environment without exposing the photosensitive printing plates 42.

Further, even if the slide door 20 is opened and the printing plate supplying cassette 18 is removed from the printing plate accommodating portion 16 to the exterior of the apparatus at the time when the photosensitive printing plates 42 are not taken out or conveyed by the taking-out/conveying mechanism 56, the opening/closing lid 48 of the printing plate packaging box 28 is closed and the exposure of the photosensitive printing plates 42 can be prevented because of the printing plate packaging box 28. Thus, the operation of replacing the photosensitive printing plates 42 can be carried out under the bright environment.

[Second Embodiment]

(Structure of Second Embodiment)

Figure 7:
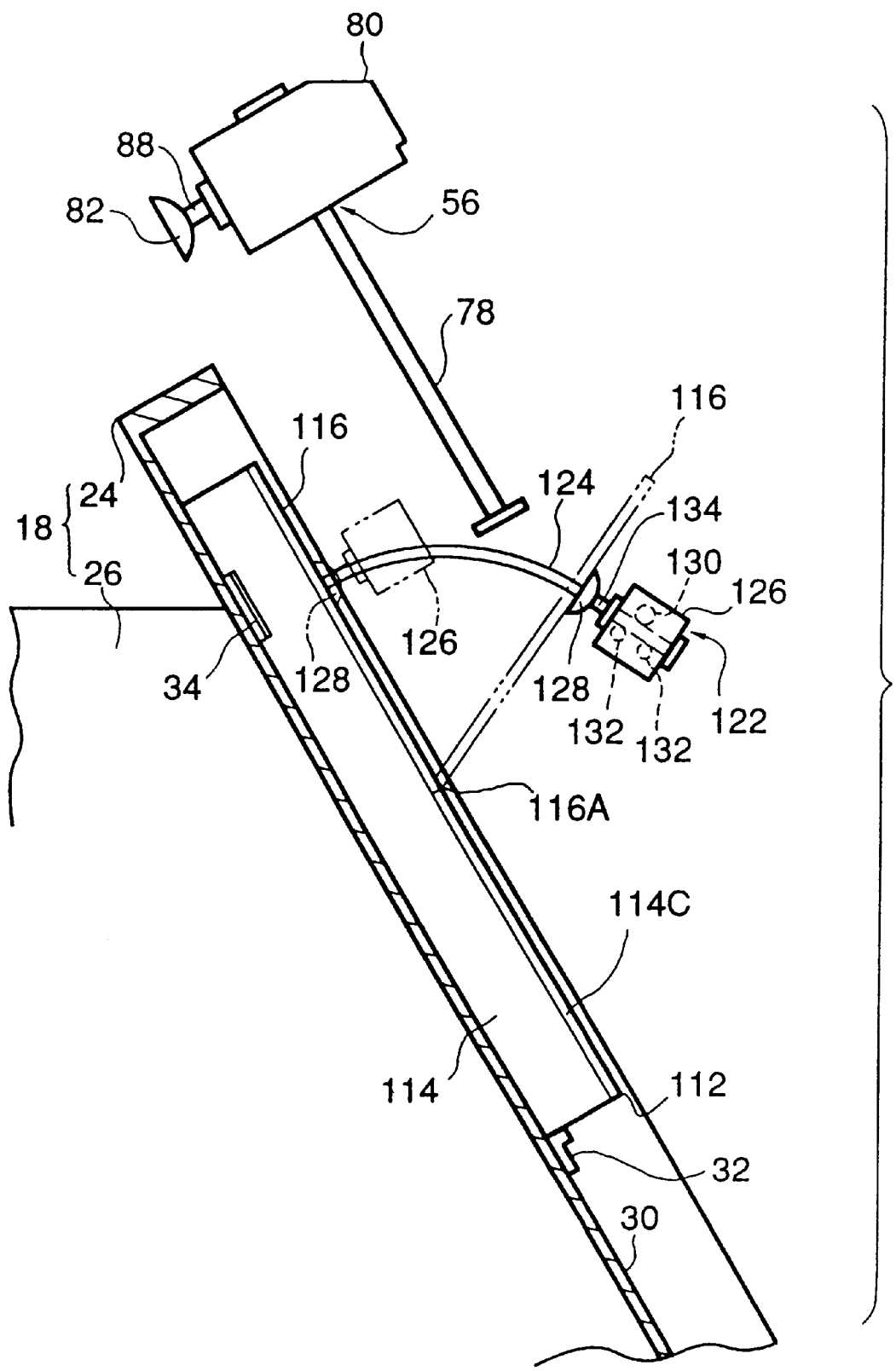
FIG. 7 is a side view which shows the structure of a lid opening/closing mechanism and a taking-out/conveying mechanism in a printing plate supplying apparatus based on a second embodiment.
Figure 8A:
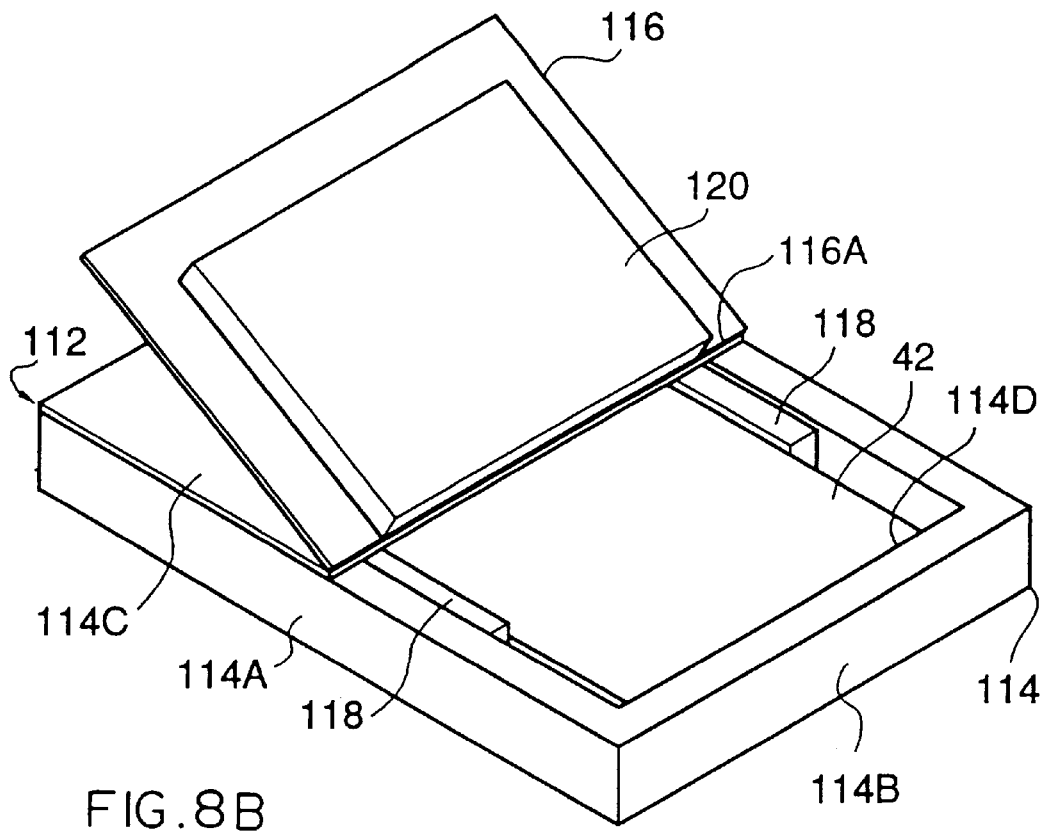
FIG. 8A is a perspective view which shows a state in which an opening/closing lid of a printing plate packaging box serving as photosensitive printing plate packaging means which is used in the printing plate supplying apparatus based on the second embodiment is opened.

FIG. 7 shows a lid opening/closing mechanism and a taking-out/conveying mechanism of a printing plate supplying apparatus based on a second embodiment. FIG. 8 shows a printing plate packaging box serving as photosensitive printing plate packaging means used in the printing plate supplying apparatus based on the second embodiment of the present invention.

In the printing plate supplying apparatus in the second embodiment of the present invention, the basic structures of members which are the same as those in the printing plate supplying apparatus 10 of the first embodiment are denoted by the same reference numerals, and descriptions thereof are omitted.

Similarly to the printing plate packaging box 28 of the first embodiment, a printing plate packaging box 112 contains the plurality of sheets of photosensitive printing plates 42 and superposing papers 44 and is loaded into the printing plate supplying cassette 18. As shown in FIG. 8, the printing plate packaging box 112 comprises an box main body 114 and an opening/closing lid 116 which is swingably supported by this box main body 114. These box main body 114 and opening/closing lid 116 are manufactured from materials having sufficient strengths and light-shielding properties.

The box main body 114 comprises a rectangular bottom plate portion, a side plate portion 114A at a long edge side and a side plate portion 114B at a short edge side which are bent at substantially right angles from the peripheral edge of this bottom plate portion, and a top plate portion 114C which is fixed to the upper end surfaces of the side plate portions 114A and 114B.

In the box main body 114, the one side region of the box main body 114 with respect to the longitudinal direction center is covered by the top plate portion 114C and the supply opening 114D for supplying the photosensitive printing plates 42 to the exterior is formed in the remaining one-side region. The end portion of the top plate portion 114C which faces the supply opening 114D is connected to a supporting end portion 116A which is one end portion of the opening/closing lid 116.

The top plate portion 114C and the opening/closing lid 116 are connected by a hinge type connecting member, or a tape type connecting member having flexibility and strong adhesive strength, or the like. The opening/closing lid 116 is swingably supported by the top plate portion 114C about the supporting end portion 116A.

In the box main body 114, a spacer 118 is disposed between the side plate portions 114A, 114B and the side end of the photosensitive printing plate 42. The spacers 118 restrict the movement of the photosensitive printing plates 42 within the box main body 114.

The opening/closing lid 116 is formed of a corrugated cardboard or the like whose configuration is substantially the same as that of the top plate portion 114C. The opening/closing lid 116 is swingably supported between a closed position shown in FIG. 8B in which the supply opening 114D is closed and an opened position shown in FIG. 8A in which the supply opening 114D is opened.

A pressing member 120 having elasticity is adhered onto the inner surface of the opening/closing lid 116. In a state in which the opening/closing lid 116 is held at the closed position, the upper surface of the photosensitive printing plate 42 is pressed by the pressing member 120 and the movement of the photosensitive printing plates 42 is prevented.

In the printing plate packaging box 112 of the second embodiment, in the same way as in the printing plate packaging box 28 relating to the first embodiment, it is necessary that a joint between the side plate portions 114A and 114B is reliably closed or covered so that no clearance is formed therein, and that ajoint between the side plate portions 114A, 114B and the top plate portion 114C, as well as a connecting portion between the top plate portion 114C and the opening/closing lid 116 are reliably closed or covered.

Further, the opening/closing lid 116 is provided with a light-shielding portion which closely contacts over the entire peripheral edge portion of the supply opening 114D in a state in which the opening/closing lid 116 is at the closed position. By this light-shielding portion, entry of light into the interior of the box main body 114 through a clearance between the opening/closing lid 116 and the box main body 114 is reliably prevented.

Further, it is preferable that the pressing member 120 has a configuration which corresponds to that of the opening of the supply opening 114D such that the pressing member 120 at a closed position presses and closely contacts the portion of the box main body 114 along the supply opening 114D. In this structure, the light-shielding properties of the printing plate packaging box 112 can be strengthened and the movement of the opening/closing lid 116 from the closed position due to vibrations or the like can be prevented.

Figure 8B:
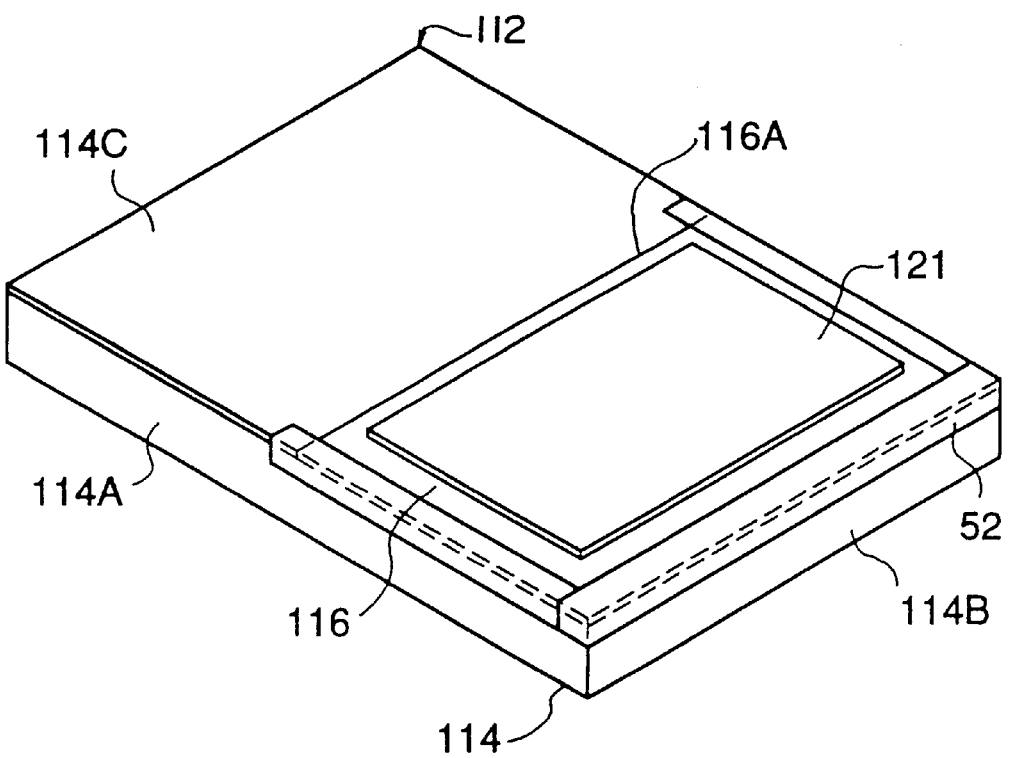
FIG. 8B is a perspective view which shows a state in which the opening/closing lid of the printing plate packaging box in FIG. 8A is closed.

As shown in FIG. 8B, a sheet material whose surface is sufficiently smooth and air tight is adhered to the outer surface of the opening/closing lid 116 and this sheet material functions as a portion 121 to be sucked at the opening/closing lid 116. When the outer surface of the opening/closing lid 116 has sufficient smoothness and air tightness, the portion 121 to be sucked as the sheet material or the like can be omitted.

Further, before the box 112 is loaded into the printing plate supplying cassette 18, the opening/closing lid 116 is fixed on the box main body 114 at the closed position by the adhesive tape 52 for fixing which is adhered over the opening/closing lid 116 to the box main body 114.

As shown in FIG. 7, when the printing plate packaging box 112 structured as described above is loaded into the printing plate supplying cassette 18, the adhesive tape 52 is peeled and removed before loading. Then, the printing plate supplying cassette 18 and the printing plate packaging box 112 attached thereto are installed in the printing plate accommodation portion 16.

In the printing plate accommodating portion 16, a lid opening/closing mechanism 122 is disposed at a position corresponding to the opening/closing lid 116 of the printing plate packaging box 112 and the taking-out/conveying mechanism 56 is disposed at a position corresponding to the photosensitive printing plate 42.

As shown in FIG. 7, the lid opening/closing mechanism 122 includes a guide rail 124 which is fixedly provided inside to the interior of the printing plate accommodating portion 16, a drive portion 126 which is movably supported along this guide rail 124, and a suction cup 128 which is supported by this drive portion 126. The guide rail 124 is bent so that the radius of curvature measured from the supporting end portion 116A in the printing plate packaging box 112 loaded onto the mounting surface 30 is substantially constant.

The drive portion 126 is provided with a drive roller 130 which is normally and reversely rotated by a drive motor (not shown), and idle rollers 132 which together with this drive roller 130 sandwich the guide rail 124 as shown. The drive roller 130 of the drive portion 126 rotates normally or reversely so that the drive portion 126 moves in the direction of moving closer to or away from the printing plate packaging box 112 on the mounting surface 30. Further, in the same manner as in the drive portion 60 of the first embodiment, an air suction pump (not shown) is provided in the drive portion 126, and the terminal end of an air suction pipe which extends from the air suction port of this air suction pump opens at the sucking surface of the suction cup 128. The drive portion 126 slidably supports a slide shaft 134 in the tangent direction of the guide rail 124 and urges the slide shaft 134 towards the mounting surface 30 at a predetermined urging force. The suction cup 128 is disposed at the distal end portion of this slide shaft 134.

(Operation of Second Embodiment)

The operation of the printing plate supplying apparatus structured as above based on the second embodiment of the present invention will be explained. In the printing plate supplying apparatus of the present embodiment, the operation in which the taking-out/conveying mechanism 56 takes out one sheet of photosensitive printing plate 42 from the printing plate packaging box 112 and inserts this photosensitive printing plate 42 into the plate conveying path 96 is the same as the case of the printing plate supplying apparatus 10 of the first embodiment. Accordingly, descriptions regarding the operation of the taking-out/conveying mechanism 56 will be omitted.

When the supplying operation of the photosensitive printing plates 42 is started, the system control portion normally rotates the drive roller 130, moves the drive portion 126 from a standby position shown by a solid line in FIG. 7 to suction position shown by a double-dashed chain line, and drives the air suction pump provided in the drive portion 126. As a result, the suction cup 128 presses and contacts the portion 121 to be sucked of the printing plate packaging box 112 which has been loaded into the printing plate supplying cassette 18 and is stuck to the portion 121 to be sucked. At this time, when the suction cup 128 presses the portion 121 to be sucked at force which is larger than a predetermined force, the slide shaft 134 retracts. Accordingly, application of excessively large pressing force to the printing plate packaging box 112 by the suction cup 128 is prevented.

Further, after the suction cup 128 is stuck to the portion 121 to be sucked, the air suction pump closes a pressure valve (not shown) in an internal circuit which communicates with the air suction pipe so that the negative pressure generated between the suction surface of the suction cup 128 and the portion 121 to be sucked is maintained.

In a state in which the suction cup 128 is stuck to the portion 121 to be sucked of the opening/closing lid 116, the system control portion reversely rotates the drive roller 130 and moves the drive portion 126 from the suction position to the standby position. As the drive portion 126 moves towards the standby position, the swinging end of the opening/closing lid 116 swings in the direction of moving away from the box main body 46, and thereby the supply opening 114D of the box main body 114 is exposed. At this time, as a result of the drive portion 126 moving to the standby position, the opening/closing lid 116 is held at the opened position shown by a double-dashed chain line in FIG. 7 in which the lid does not interfere with the operation of the taking-out/conveying mechanism 56.

When the opening/closing lid 116 is stuck to the suction cup 128 and the drive portion 126 moves to the standby position, in the same way as in the case of first embodiment, the system control portion operates the taking-out/conveying mechanism 56 and inserts one sheet of the photosensitive printing plate 42 at a time into the printing plate conveying path 96.

When the rear end of the sheet of photosensitive printing plate 42 is conveyed to the exterior of the plate loading case 24 by the taking-out/conveying mechanism 56, the system control portion normally rotates the drive roller 130 and moves the drive portion 126 again to the suction position. As a result, the opening/closing lid 116 which is stuck to the suction cup 128 moves to the closed position on the box main body 114 and thus the supply opening 114D is closed by the opening/closing lid 116.

When the drive portion 126 moves to the suction position, the system control portion opens the pressure valve in the internal circuit of the air suction pump which is provided in the drive portion 126 so that the suction force by the suction cup 128 is lost. Thereafter, the drive roller 130 is reversely rotated and the drive portion 126 is returned to the standby position.

In accordance with the printing plate supplying apparatus of the present embodiment described above, in addition to the operation and effect of the printing plate supplying apparatus 10 of the first embodiment, the opening/closing lid 116 is swingably supported by the box main body 114 within the range of the closed position to the opened(release) position. Thus, it is easier to move the opening/closing lid 116 to the closed position/the opened position than the opening/closing lid 48 and the opening/closing lid 116 can be made more compact and light.

As a result, compared to the lid opening/closing mechanism 54 of the printing plate supplying apparatus 10 of the first embodiment, in the printing plate supplying apparatus of the second embodiment, the lid opening/closing mechanism 122 can be made more compact and the structure of the lid opening/closing mechanism 122 can be more simplified than in the first embodiment.

[Third Embodiment]

(Structure of Third Embodiment)

Figure 9:
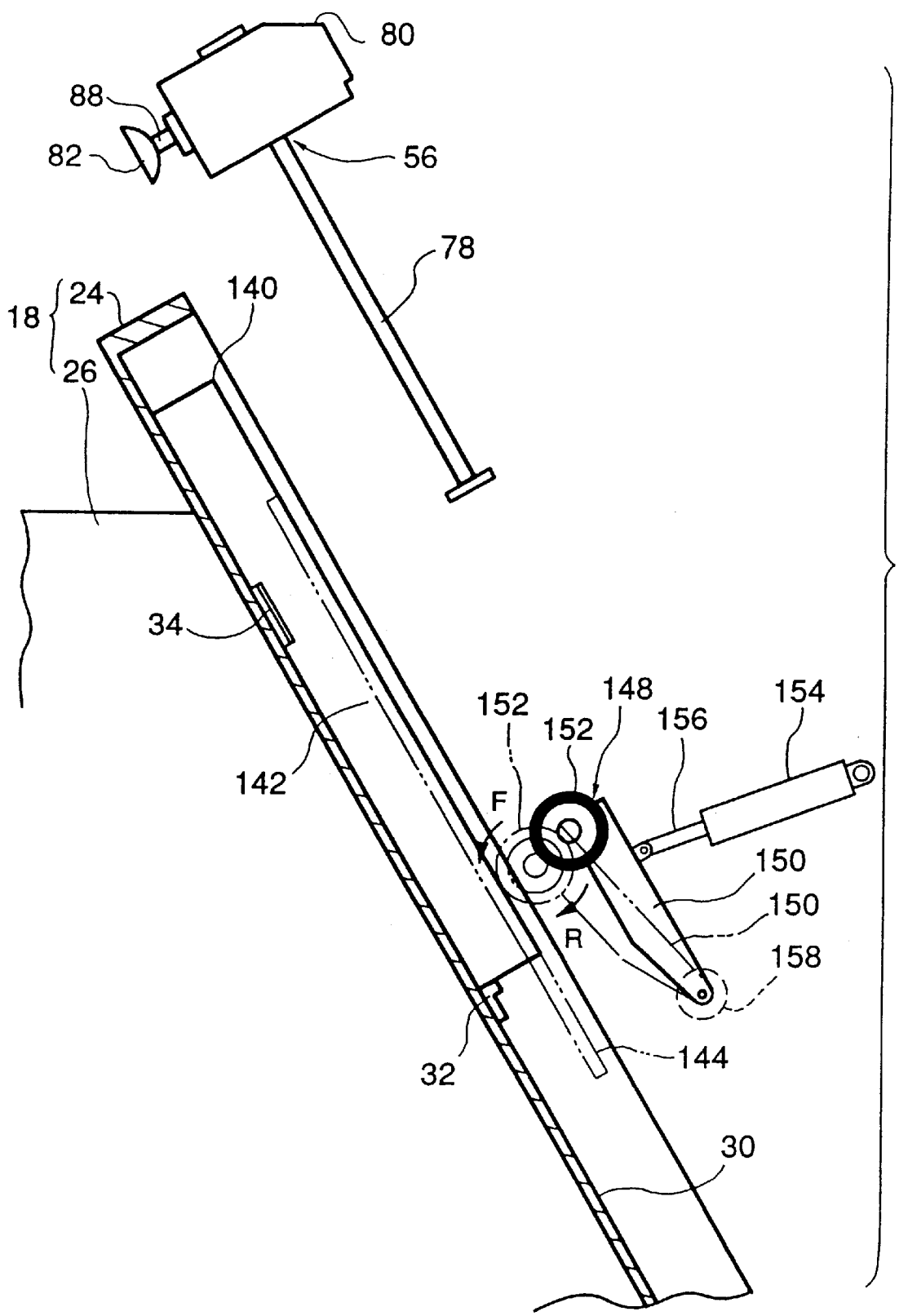
FIG. 9 is a side view which shows the structure of a lid opening/closing mechanism and a taking-out/conveying mechanism in a printing plate supplying apparatus based on a third embodiment.

FIG. 9 shows a lid opening/closing mechanism and a taking-out/conveying mechanism of a printing plate supplying apparatus based on a third embodiment. FIG. 10 shows a printing plate packaging box serving as photosensitive printing plate packaging means used in the printing plate supplying apparatus based on the third embodiment of the present invention.

In the printing plate supplying apparatus based on the third embodiment of the present invention, the basic structures of members which are the same as those in the printing plate supplying apparatus 10 of the first embodiment are denoted by the same reference numerals, and descriptions thereof are omitted.

Similarly to the printing plate packaging box 28 of the first embodiment, a printing plate packaging box 140 contains the plurality of sheets of photosensitive printing plates 42 and superposing papers 44 and is loaded into the printing plate supplying cassette 18. As shown in FIG. 10, the printing plate packaging box 140 comprises a box main body 142 and an opening/closing lid 144 which is slidably supported by this box main body 142. These box main body 142 and opening/closing lid 144 are manufactured from materials having sufficient strengths and light-shielding properties, such as a corrugated cardboard, a thick paper, black-opaque resin, or the like.

The box main body 142 includes a rectangular bottom plate portion, a side plate portion 142A at a long edge side and a side plate portion $142B_1$, $142B_2$ at a short edge side which are bent at substantially right angles from the peripheral edge of this bottom plate portion.

The box main body 142 opens on the upper side and this upper opening forms a supply opening for supplying the photosensitive printing plates 42 to the exterior. A slide groove 142C is formed at each of the upper end portions of the pair of side plate portions 142A at the long edge side of the box main body 142. This slide groove 142C extends along the upper opening of the box main body 142 in the longitudinal direction thereof. Moreover, one of the side plate portions $142B_1$ at the short edge side is formed slightly lower than the side plate portions 142A at the long edge side and the other of the side plate portions $142B_2$. On the other hand, in the opening/closing lid 144, a guide portion 144A which slidably engages with the slide groove 142C is formed at each of the pair of end portions at the long edge side.

Figure 10A:
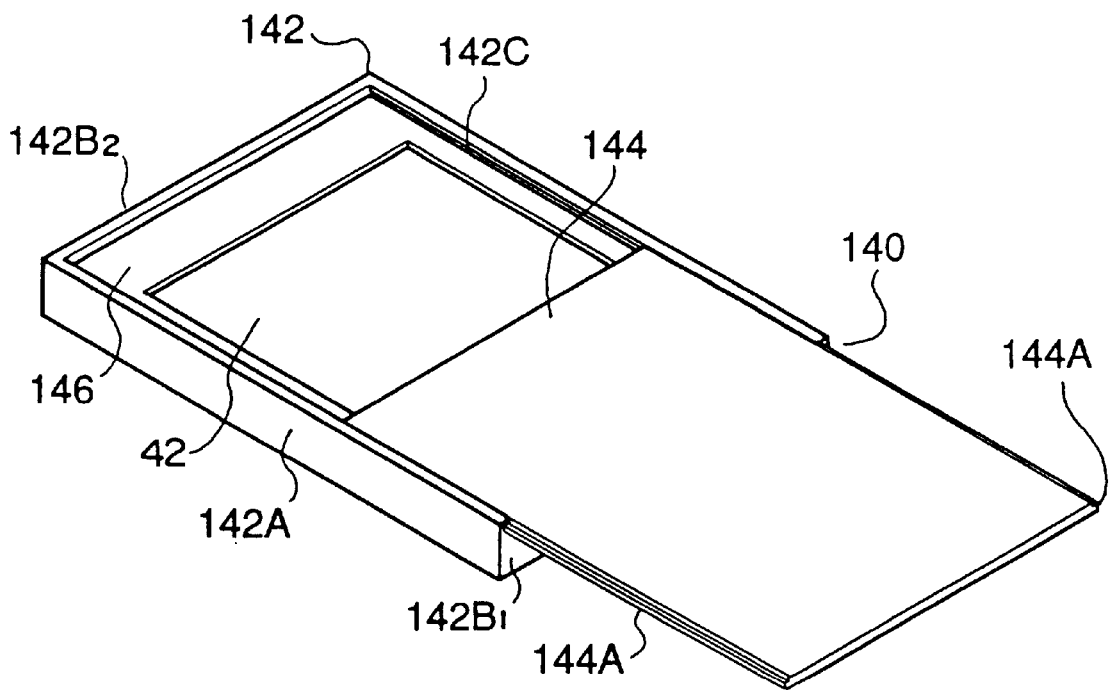
FIG. 10A is a perspective view which shows a state in which an opening/closing lid of a printing plate packaging box serving as photosensitive printing plate packaging means which is used in the printing plate supplying apparatus based on the third embodiment is opened.
Figure 10B:
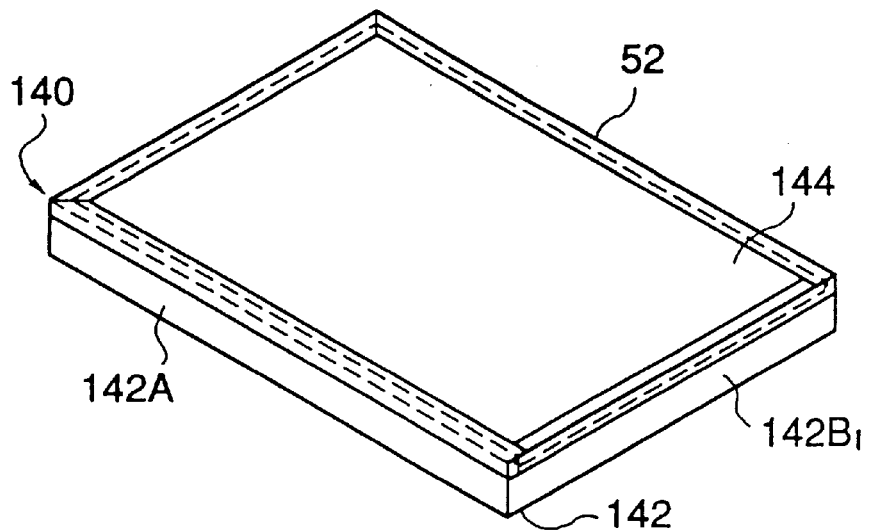
FIG. 10B is a perspective view which shows a state in which the opening/closing lid of the printing plate packaging box in FIG. 10A is closed.

Since the guide portion 144A engages with the slide groove 142C as shown in FIG. 10A, the opening/closing lid 144 is slidably supported along the upper opening of the box main body 142. As shown in FIG.10B, the opening/closing lid 144 can slide to a closed position in which the lid 144 abuts the side plate portion $142B_2$ which is slightly higher than the side plate portion $142B_1$ and closes the upper opening of the box main body 142. Then, from the closed position, the opening/closing lid 144 can slide in the opposite direction (the side plate portion $142B_2$ and the side plate portion $142B_1$) such that the upper opening of the box main body 142 is opened as shown in FIG. 10A.

A spacer 146 is disposed between the side plate portions 142A, $142B_1$, $142B_2$ and the photosensitive printing plate 42 in the box main body 142. This spacer 146 restricts the movement of the photosensitive printing plates 42 within the box main body 142. In addition, the spacer 146 abuts over the entire peripheral edge portion on the lower surface of the opening/closing lid 144 when the opening/closing lid 144 is in the closed state, thus serving the light-shielding portion which prevents light from entering the interior of the box main body 142.

Before being loaded onto the printing plate supplying cassette 18, the opening/closing lid 144 of the printing plate packaging box 140 is fixed, as shown in FIG. 10B, to the box main body 142 at the closed position by the adhesive tape 52 for fixing which is adhered to cover the upper surface peripheral edge portion of the opening/closing lid 144 of the box main body 142.

As shown in FIG. 9, when the printing plate packaging box 140 structured as described above is loaded into the printing plate supplying cassette 18, the adhesive tape 52 is peeled and removed before loading. Then, the printing plate supplying cassette 18 and the printing plate packaging box 140 attached thereto are installed in the printing plate accommodation portion 16. In the printing plate accommodating portion 16, a lid opening/closing mechanism 148 is disposed at a position corresponding to the opening/closing lid 144 of the printing plate packaging box 140 and the taking-out/conveying mechanism 56 is disposed at a position corresponding to the photosensitive printing plate 42.

As shown in FIG. 9, the lid opening/closing mechanism 148 includes a supporting arm 150 which is disposed within the printing plate accommodating portion 16 and a drive roller 152 which is supported by this supporting arm 150. The supporting arm 150 is supported swingably by the printing plate accommodating portion 16 and held at one of a standby position which is shown by a solid line in FIG. 9 and a lid opening/closing position which is shown by a double-dashed chain line.

A drive roller 152 is rotatably disposed at the swinging end portion of this supporting arm 150. When the supporting arm 150 is held at the lid opening/closing position, the drive roller 152 presses and contacts the upper surface of the opening/closing lid 144. On the contrary, when the supporting arm 150 is held at the standby position, the drive roller 152 moves away from the opening/closing lid 144.

An actuator 154 is disposed within the printing plate accommodating portion 16 in a vicinity of the supporting arm 150. This actuator 154 extends/retracts the drive shaft 156 connected to the supporting arm 150 so that the supporting arm 150 is moved to the lid opening/closing position/the standby position.

A transmitting mechanism (not shown) which transmits torque from the drive motor 158 to the drive roller 152 is provided at the supporting arm 150. The drive roller 152 rotates normally or reversely by the torque transmitted from the drive motor 158 via the transmission mechanism.

(Operation of Third Embodiment)

The operation of the printing plate supplying apparatus structured as above based on the third embodiment of the present invention will be explained.

In the printing plate supplying apparatus of the third embodiment, the operation in which the taking-out/conveying mechanism 56 takes out one sheet of photosensitive printing plate 42 from the printing plate packaging box 140 and inserts this photosensitive printing plate 42 into the printing plate conveying path 96 is the same as the case of the printing plate supplying apparatus 10 of the first embodiment. Accordingly, descriptions regarding the operation of the taking-out/conveying mechanism 56 will be omitted.

When supplying operation of the photosensitive printing plates 42 is started, the system control portion drives the actuator 154, swings the supporting arm 150 from the standby position to the lid opening/closing position, and makes the drive roller 152 press and contact the opening/closing lid 144. Thereafter, the system control portion makes the drive roller 152 rotate (in the normal direction) by the drive motor 158 at a predetermined amount in the direction of arrow F. Due to this, the opening/closing lid 144 slides in the direction of opening the upper opening of the box main body 142 by the force form the drive roller 152 and is eventually held at the opened position shown by a double-dashed chain line in FIG. 9.

When the opening/closing lid 144 moves to the opened position, the system control portion operates the taking-out/conveying mechanism 56 in the same way as in the case of the first embodiment and inserts one sheet of the photosensitive printing plate 42 into the printing plate conveying path 96.

When the rear ends of the photosensitive printing plate 42 and the superposing paper 44 are conveyed to the exterior of the printing plate loading case 24 by the taking-out/conveying mechanism 56, the drive roller 152 is reversely rotated by the drive motor 158 in the direction of arrow R at a predetermined amount. As a result, the opening/closing lid 144 slides in the direction of closing the upper opening of the box main body 142 by a force from the drive roller 152, abuts the side plate portion $142B_2$, returning to the closed position in which the upper opening of the box main body 142 is closed.

In accordance with the printing plate supplying apparatus of the third embodiment described hereinbefore, in addition to the operation and effect of the printing plate supplying apparatus 10 of the first embodiment, the opening/closing lid 144 is supported slidably by the box main body 142. Thus, it is easier to move the opening/closing lid 144 to the closed position than the first embodiment and the opened position and the opening/closing lid 144 can be made more compact and light.

As a result, compared to the lid opening/closing mechanism 54 of the printing plate supplying apparatus 10 of the first embodiment, in the printing plate supplying apparatus of the third embodiment, the lid opening/closing mechanism 148 can be made more compact and the structure thereof can be more simplified.

As the lid opening/closing mechanism 54(122) in the first(second) embodiment of the present invention, the structure in which the opening/closing lid 48(116) is stuck to the suction cup 74(128) due to a negative pressure is explained. However, other structures can also be employed for lifting up the opening/closing lid 48(128), and such structures include: a structure in which a thick portion is provided at the opening/closing lid 48(116), a needle member supported by the lid opening/closing mechanism 54(122) thrusts the thick portion so that the lid opening/closing mechanism 54(122) is connected to the opening/closing lid 48(116); a structure in which a portion to be engaged having a specific configuration is provided at the opening/closing lid 48(116), this portion to be engaged is engaged with an engaging portion having a specific configuration which is supported by the lid opening/closing mechanism 54(122) so that the lid opening/closing mechanism 54(122) is connected to the opening/closing lid 48(116); and the like.

Further, as the taking-out/conveying mechanism 56 in the first through third embodiments of the present invention, the one in which the photosensitive printing plate 42 is struck to the suction cup 82 due to a negative pressure and this photosensitive printing plate 42 is conveyed by the drive portion 80 is explained. However, it is possible that a feed roller is pressed and contacted to the photosensitive printing plate 42 and by rotating this feed roller, the sheet of photosensitive printing plate 42 is extruded to the exterior of the box main body 46(114, 142) one at a time and supplied to the interior of the printing plate conveying path 96. When such feed roller is used, it is necessary to provide an opening, an inclined surface, or the like for feeding the photosensitive printing plate 42 at the wall portion of the box main body 46(114, 142) on the printing plate conveying path 96 side.

Moreover, it is possible that an information display portion is provided at at least one place on the outer surface of the printing plate packaging box 28(112, 140) based on the first through third embodiments of the present invention. In this case, data for setting plate making conditions such as a size, a type, an exposure intensity, a development time, or the like of the photosensitive printing plate 42 may be recorded onto this information display portion by a barcode, a numerical value, a symbol, a magnetic pattern, or the like. In addition, an optical or magnetic scanner for reading the recorded information on the information display portion may be provided within the cassette accommodating portion 16.

In accordance with such structure, the information read by the scanner is, for example, first conveyed to the system control portion, so that the operation of the taking-out/conveying mechanism 56 is controlled in accordance with the size or the like of the photosensitive printing plate 42 by the system control portion. In this case, the photosensitive printing plate 42 can be more reliably taken out from the printing plate packaging box and supplied to the printing plate conveying path 96 by the taking-out/conveying mechanism 56 without being influenced by the size of the photosensitive printing plate 42.

Further, because the plate making conditions are controlled by the system control portion in accordance with the data for setting the plate making conditions such as a type or the like of the photosensitive printing plate 42, a plate making process for the photosensitive printing plate 42 can be swiftly adjusted according to the changes in the plate making conditions, always maintaining the optimal conditions.

In short, in accordance with the automatic plate making machine including the printing plate supplying apparatus and the photosensitive printing plate packaging means based on the first through third embodiments of the present invention, the operation of manually opening the packages of the photosensitive printing plates is not required any more and the operation of loading the photosensitive printing plates into the plate making machine can be carried out even under the bright environment.

[Fourth Embodiment]

(Structure of Fourth Embodiment)

Figure 11:
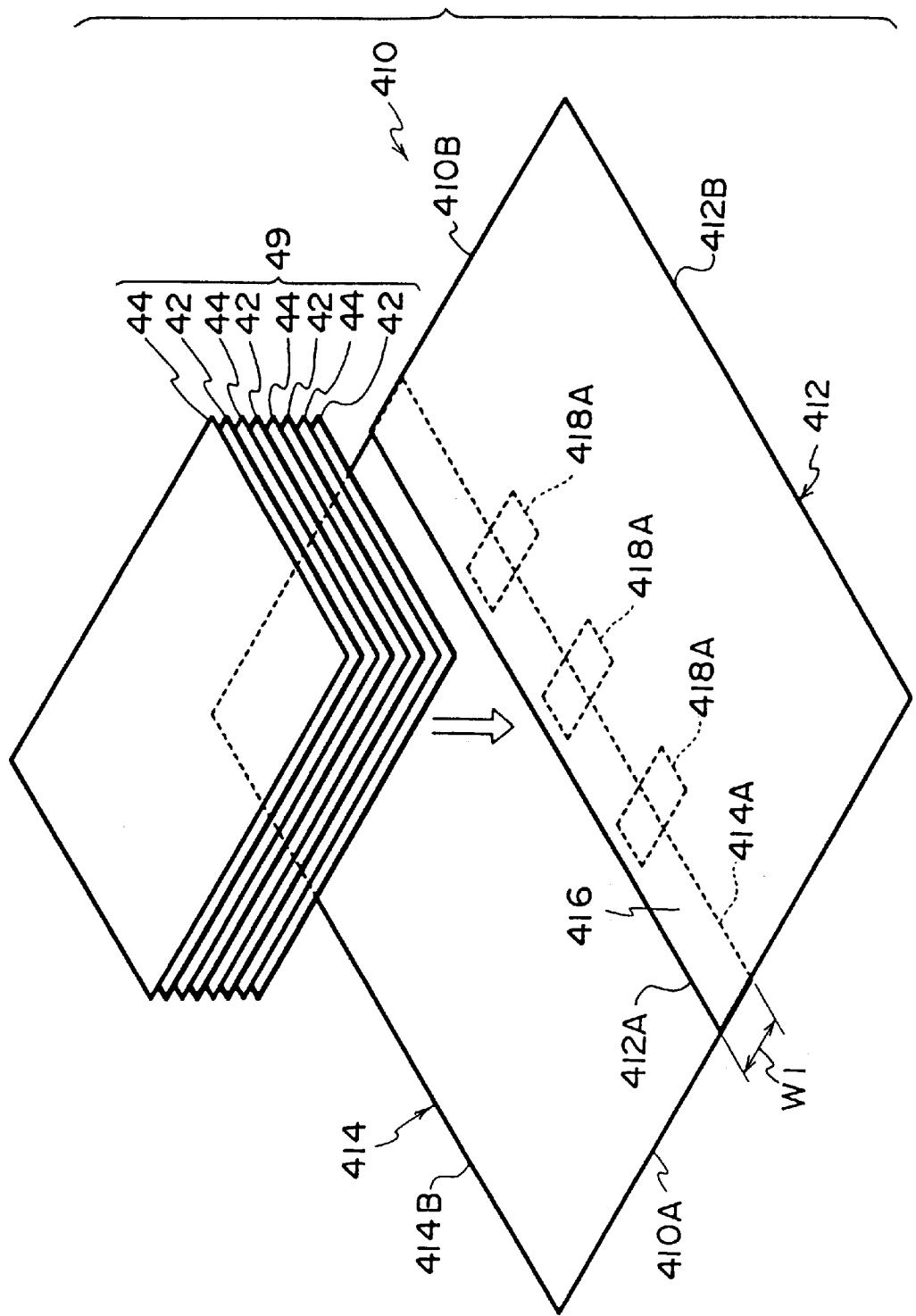
FIG. 11 is an exploded perspective view which shows the unfolding state of a packaging paper serving as photosensitive printing plate packaging means based on a fourth embodiment of the present invention and a bundle of photosensitive printing plates to be packaged in this packaging paper.
Figure 14:
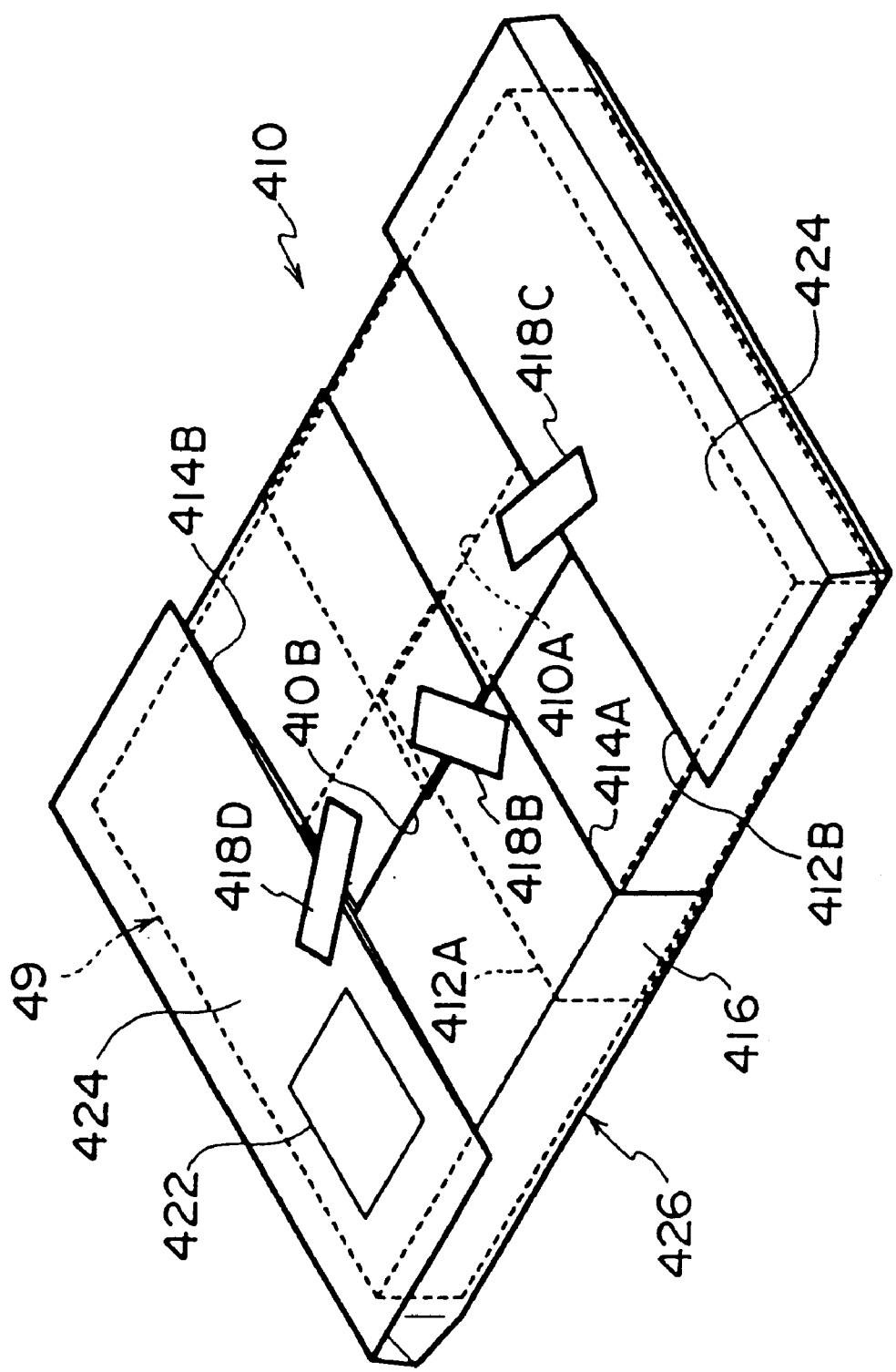
FIG. 14 is a perspective view which shows a state in which the bundle of photosensitive printing plates are packaged in the packaging paper of the fourth embodiment of the present invention.

FIG. 11 shows a packaging paper 410 (in an unfolded state) which forms a photosensitive printing plate packaging means based on a fourth embodiment of the present invention and a bundle of photosensitive printing plates 42 to be packaged in this packaging paper 410. Further, FIG. 14 shows a state in which the bundle 49 of photosensitive printing plates 42 is packaged in the packaging paper 410.

The photosensitive printing plate 42 is formed by applying an electrophotosensitive layer on a thin aluminum plate in the shape of a rectangular plate. As can be seen in FIG. 11, the bundle 49 of the photosensitive printing plates 42 is structured by stacking a photosensitive printing plate 42 and a superposing paper 44 which protects the electrophotosensitive layer of the photosensitive printing plate 42 alternately in the thickness direction.

As shown in FIG. 11, the packaging paper 410 is formed by two sheets of rectangular packaging members 412 and 414 having a predetermined size. A portion of the packaging member 412 at the long edge 412A side and a portion of the packaging member 414 at the long edge 414A side are partially overlapped at a predetermined width W1 and an overlapped portion 416 is formed. The overlapped portion 416 is fixed by adhesive tapes 418A such that the two sheets of packaging members 412 and 414 are not separated unnecessarily. As will be described later, a separate portion of the present invention is essentially formed by this overlapped portion 416.

The packaging members 412 and 414 are formed by attaching a metal thin film such as an aluminum foil onto at least one surface of a paper (e.g., a kraft paper) having a predetermined strength. The packaging paper 410 as a whole has predetermined light-shielding properties and moisture-proofing properties. The packaging members 412 and 414 of the present embodiment are not limited to any particular materials as long as these packaging members have predetermined light-shielding properties and moisture-proofing properties. However, it is further preferable that the members do not cause any undesirable chemical reaction with the photosensitive printing plate 42 which essentially changes the characteristics of the photosensitive printing plate 42 (e.g., fogging, sensitivity change, or the like).

The packaging materials which satisfy such conditions include the one in which linear low density polyethylene is applied as a thin film onto the kraft paper, the one in which a moisture-proofing agent is applied onto the kraft paper, the one in which a moisture-proofing agent and a light-shielding agent are applied onto the kraft paper, the one in which linear low density polyethylene mixed with 3% by weight of carbon black is applied onto the kraft paper, the one in which liner low density polyethylene is applied onto a light-shielding paper or a black paper, a black film formed by oriented polypropylene (OPP), or the like.

The above-described moisture-proofing agent includes, for example, an aqueous emulsion formed from a synthetic rubber latex or a resinous latex and a wax emulsion, the one in which an acrylic emulsion and a wax emulsion are mixed, or the like.

As the light-shielding agent, the material which can absorb or reflect light having the same wavelength region as that of a photosensitive wavelength of the electrophotographic photosensitive layer of the photosensitive printing plate 42 is preferable. For example, when the diazo photosensitive material is used as the electrophotographic photosensitive layer of the photosensitive printing plate 42, a light-shielding agent which includes one or more of a pigment (chrome yellow, benzine yellow, or the like) and a dye can be used which selectively shields a light having the wavelength region of 250 to 500 nm which is a photosensitive wavelength of this diazo photosensitive material.

The light-shielding paper includes a paper which reduces the number of pinholes and thus increases light-shielding properties by containing 5 to 10% of carbon black and kneading well. The amount of carbon black to be contained may be increased or decreased in accordance with the number, density, size of the pinholes, or the like. The black paper includes a black kraft paper which is manufactured by adding a black dye in a paper manufacturing process, a paper which is printed in black onto a kraft paper, or the like.

Some kinds of black dye, the black ink, or the like may contain a material which causes chemical reactions with the photosensitive printing plate 42 that essentially change the characteristics of the photosensitive printing plate 42. Therefore, it is desirable to use a black dye or a black ink which does not include such material or which includes only a small amount thereof in which amount the chemical reaction of the photosensitive printing plate 42 does not essentially become a problem. Further, the basic weight of the light-shielding paper and the black paper is preferably about 70 to 150 g/m².

When the bundle 49 of the photosensitive printing plates 42 is packaged using the packaging paper 410 formed by the two sheets of packaging members 412 and 414, first, the packaging members 412 and 414 are placed so that the surfaces thereof, to which the aluminum foil is attached, are at the top. Then, as shown in FIG. 11, the bundle 49 of the photosensitive printing plates 42 is placed onto the packaging paper 410 so that the portion of the bundle 49 of the photosensitive printing plates 42 in the vicinity of the longitudinal direction center is disposed above the overlapped portion 416 of the packaging members 412 and 414.

Figure 12:
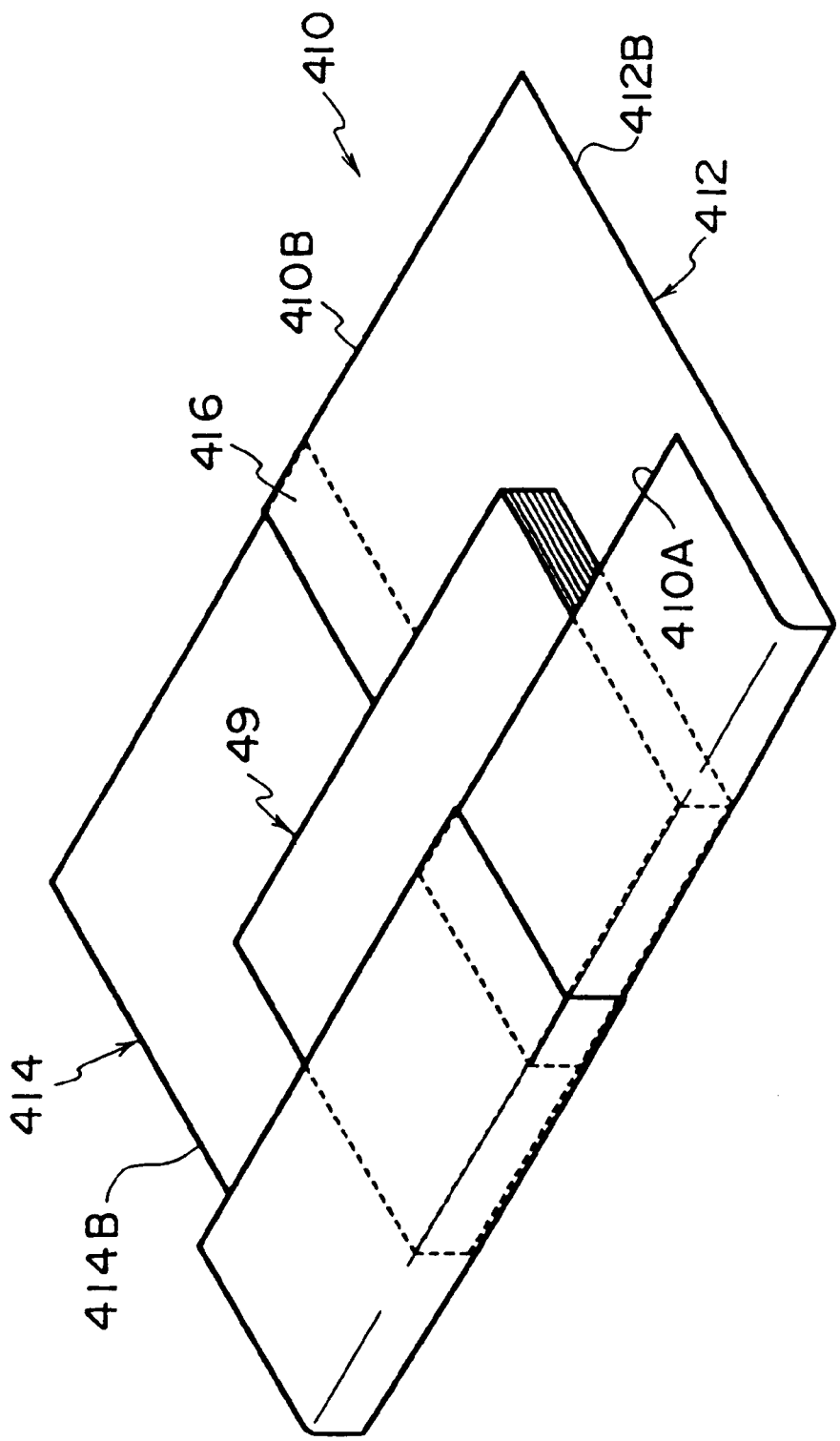
FIG. 12 is a perspective view which shows a state in which the bundle of photosensitive printing plates are in the middle of being packaged in the packaging paper of the fourth embodiment.

Next, as shown in FIG. 12, a portion of the packaging paper 410 at the short edge 410A side is folded over so that the portion overlaps the upper surface of the bundle 49. Further, another portion of the packaging paper 410 at the short edge 410B side is folded over so that the other portion overlaps the upper surface of the bundle 49. In this way, the portion of the packaging paper 410 at the short edge side 410A side partially overlaps the portion thereof at the short edge side 410B side by a predetermined width on the upper surface of the bundle 49, and the packaging paper 410 forms the shape of a substantially flat rectangular pipe.

Figure 13:
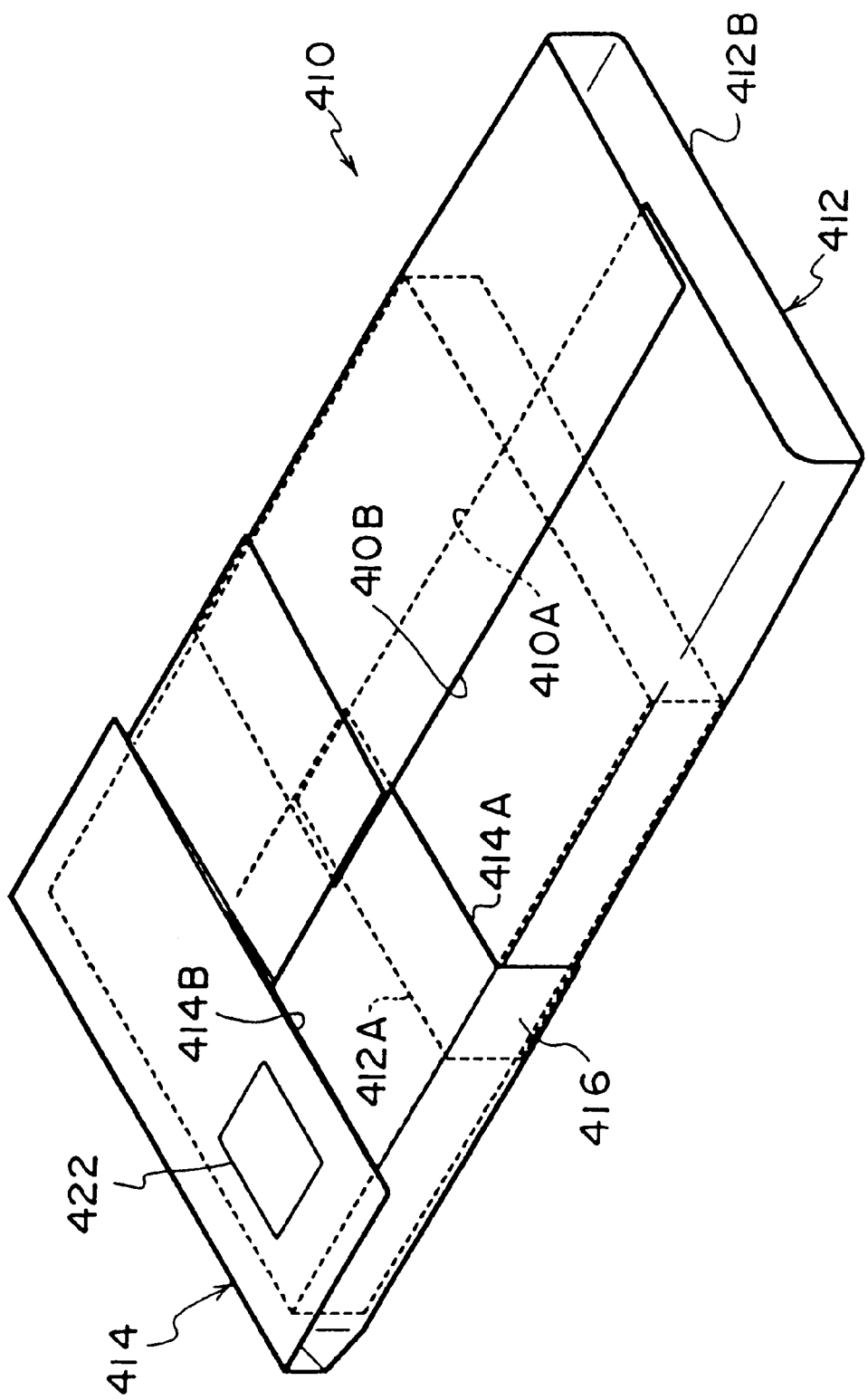
FIG. 13 is another perspective view which shows a state in which the bundle of photosensitive printing plates are in the middle of being packaged in the packaging paper of the fourth embodiment.

Next, as shown in FIG. 13, a portion of the packaging member 414 at the long edge 414B side is folded on the upper surface of the bundle 49. Similarly, a portion of the packaging member 412 at the long edge 412B side is folded on the upper surface of the bundle 49. In this way, as shown in FIG. 14, folded portions 424 are formed and the bundle 49 is enclosed by the packaging paper 410.

The packaging paper 410 may be folded in advance along the lines on which the packaging paper 410 is assumed to be folded so that the packaging members 412 and 414 can be easily folded to form the folded portions 424. Moreover, a portion or all of the distal end portion of the folded portion 424 may be bent to seal the packaging paper 410. In this case, the bent portion of the distal end portion of the folded portion 424 forms seal means of the present invention.

In this way, by forming the seal means at the distal end portion of the folded portion 424, the light-shielding properties of the packaging paper 410 can be increased. In addition to the one which is formed by bending the distal end portions of the folded portions 424, the seal means may include, for example, the one which is formed by sealing the distal end portions of the folded portions 424 by the adhesive agent or the like in the transverse direction of the bundle 49.

The above-described form of packaging is essentially the same as the form of packaging used in individually packaging a block-shaped caramel or a plate-shaped gum. Therefore, the form of such packaging will be hereinafter referred to as "caramel packaging".

Further, the folded portion at the short edge 410A side and the folded portion at the short edge 410B side are fixed by an adhesive tape 418B. Similarly, the folded portion 424 at the long edge 412B side and the folded portion at the short edge 410B side is fixed by the adhesive tape 418C, and the folded portion 424 at the long edge 414B side and the folded portion at the short edge 410B side is fixed by the adhesive tape 418D. In this way, the folded portions 424 are prevented from lifting unnecessarily due to the elasticity or the like of the packaging paper 410. Thus, the bundle 49 is maintained in a completely enclosed state, and the photosensitive printing plates 42 therewithin are reliably light-shielded.

The distal ends of the folded portions 424 may be sealed by an adhesive tape or the like. The above-described operation is to be carried out under the dark environment in the factory of manufacturing the photosensitive printing plates 42, so that the photosensitive printing plates 42 are not exposed.

Accordingly, the bundle 49 of the photosensitive printing plates 42 is packaged and light-shielded in the packaging paper 410. The packaging paper 410 comprises, a packaging paper main body 426 which packages the bundle 49 of the photosensitive printing plates 42 such that the printing plates be completely shielded from light, and the folded portions 424 provided at this packaging paper main body 426.

A display portion 422 is provided at a predetermined position of this packaging paper 410 such that the display portion 422 can be seen on the outer surface of the package when the bundle 49 of the photosensitive printing plates 42 is packaged. The display portion 422 shows information regarding the packaging paper 410 (the procedure and the direction of loading the bundle 49 of the photosensitive printing plates 42 onto a photosensitive printing plate supplying apparatus 432, the withdrawing direction and the holding position of ajutting-out portion 420, which will be described later, the notes in handling, or the like), or information regarding the photosensitive printing plate 42 (the size, the type, the number of photosensitive printing plate 42 which is packaged in the packaging paper 410, or the like) by means which can be recognized by an operator, such as characters, drawings, symbols, or the like.

Due to this, it is possible to increase the operator's operational efficiency. Moreover, these information are also recorded by means which can be read by the photosensitive printing plate supplying apparatus 432, which will be described later, such as magnetic information, optical information, barcodes, or the like. The photosensitive printing plate supplying apparatus 432 can be automatically controlled on the basis of the above-described information.

The number and the position of the display portion 422 is appropriately determined in accordance with a configuration of the package or the like in which configuration the bundle 49 of the photosensitive printing plates 42 is packaged in the packaging paper 410.

Figure 15:
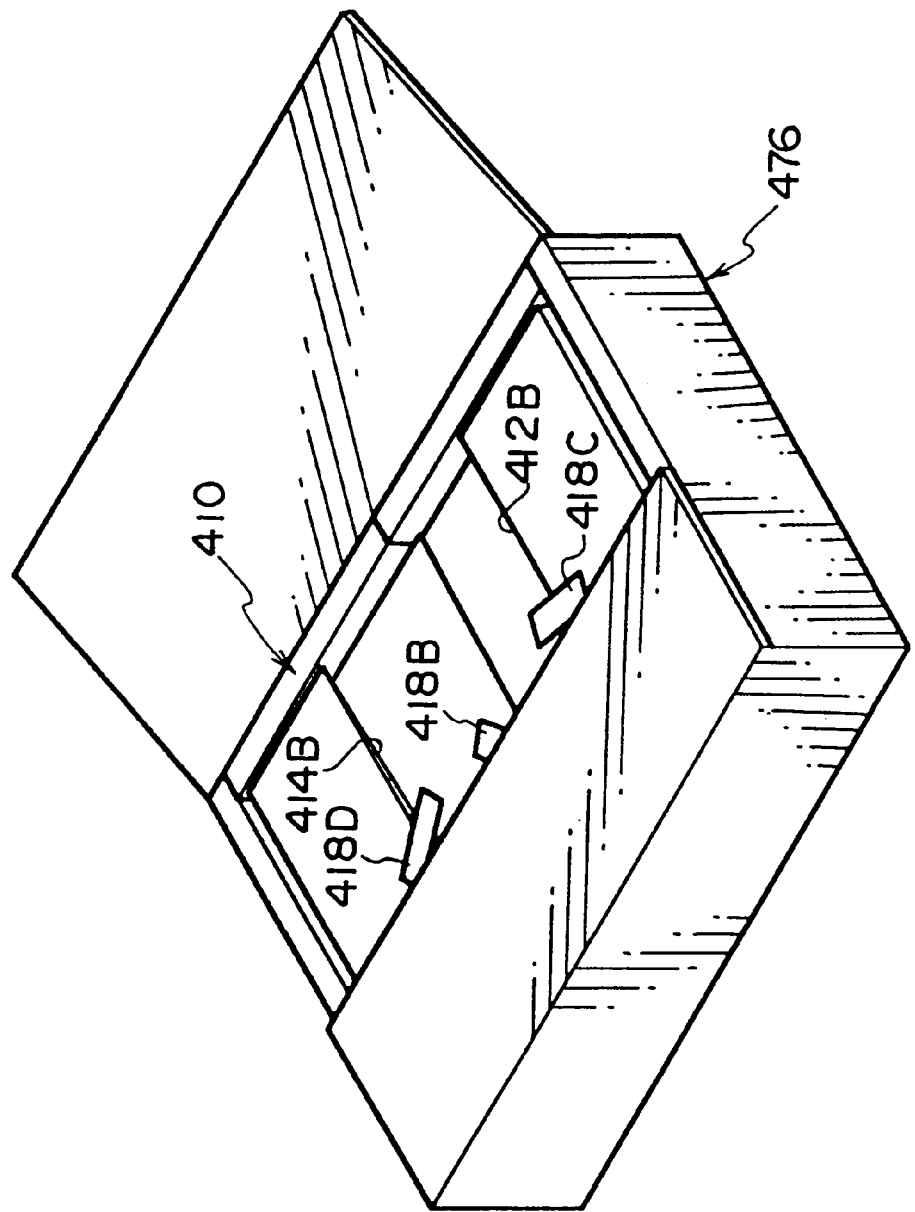
FIG. 15 is a perspective view which shows a state in which the bundle of photosensitive printing plates packaged in the packaging paper of the fourth embodiment is accommodated within a box.

As shown in FIG. 15, in a carrying or storage process, one or a plurality of bundle(s) 49 each packaged in the packaging paper 410 can be placed in a box 476 formed of a corrugated cardboard or a material having a predetermined rigidity such as a resin, such that the bundle 49 is reliably protected. Further, the box 476 can be carried or stored efficiently by placing the plurality of bundles 49 in the box 476.

Figure 16:
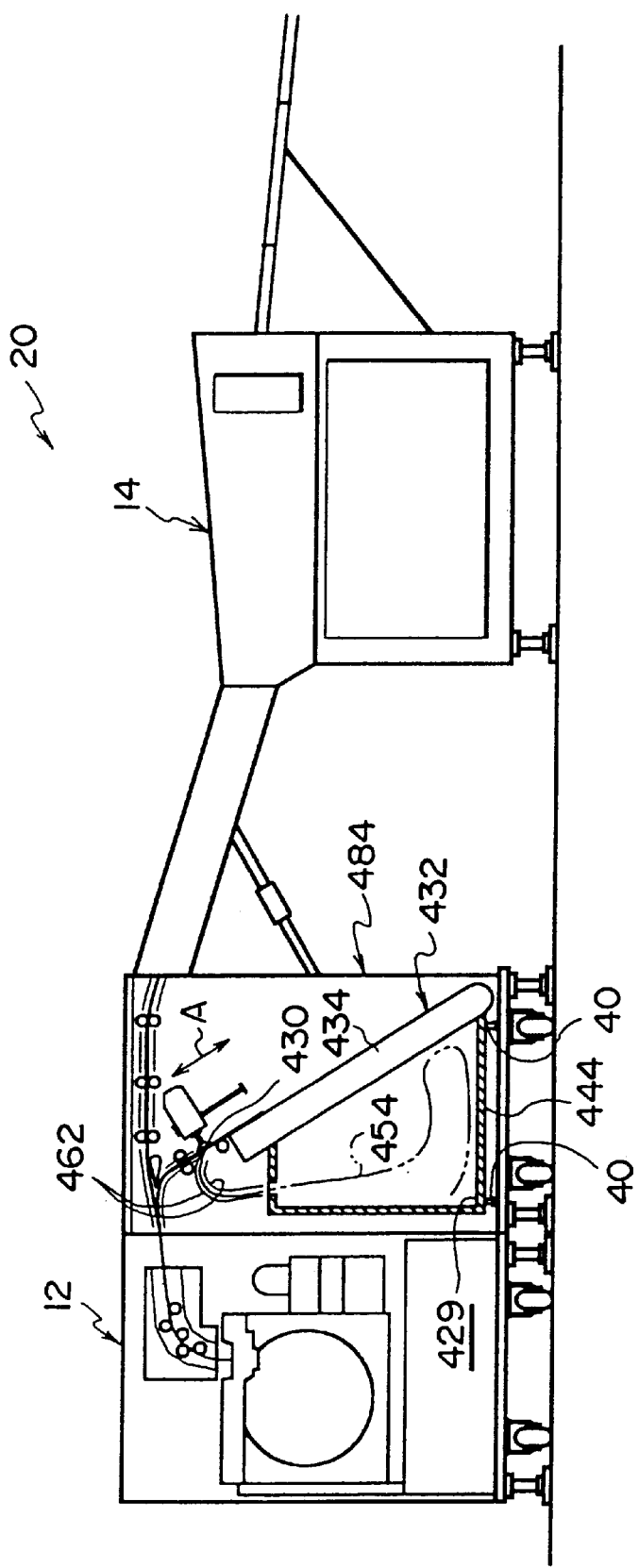
FIG. 16 is a front view which shows the schematic structure of an automatic plate making machine to which the photosensitive printing plates packaged in the packaging materials based on the fourth through eleventh embodiments of the present invention are supplied.
Figure 17:
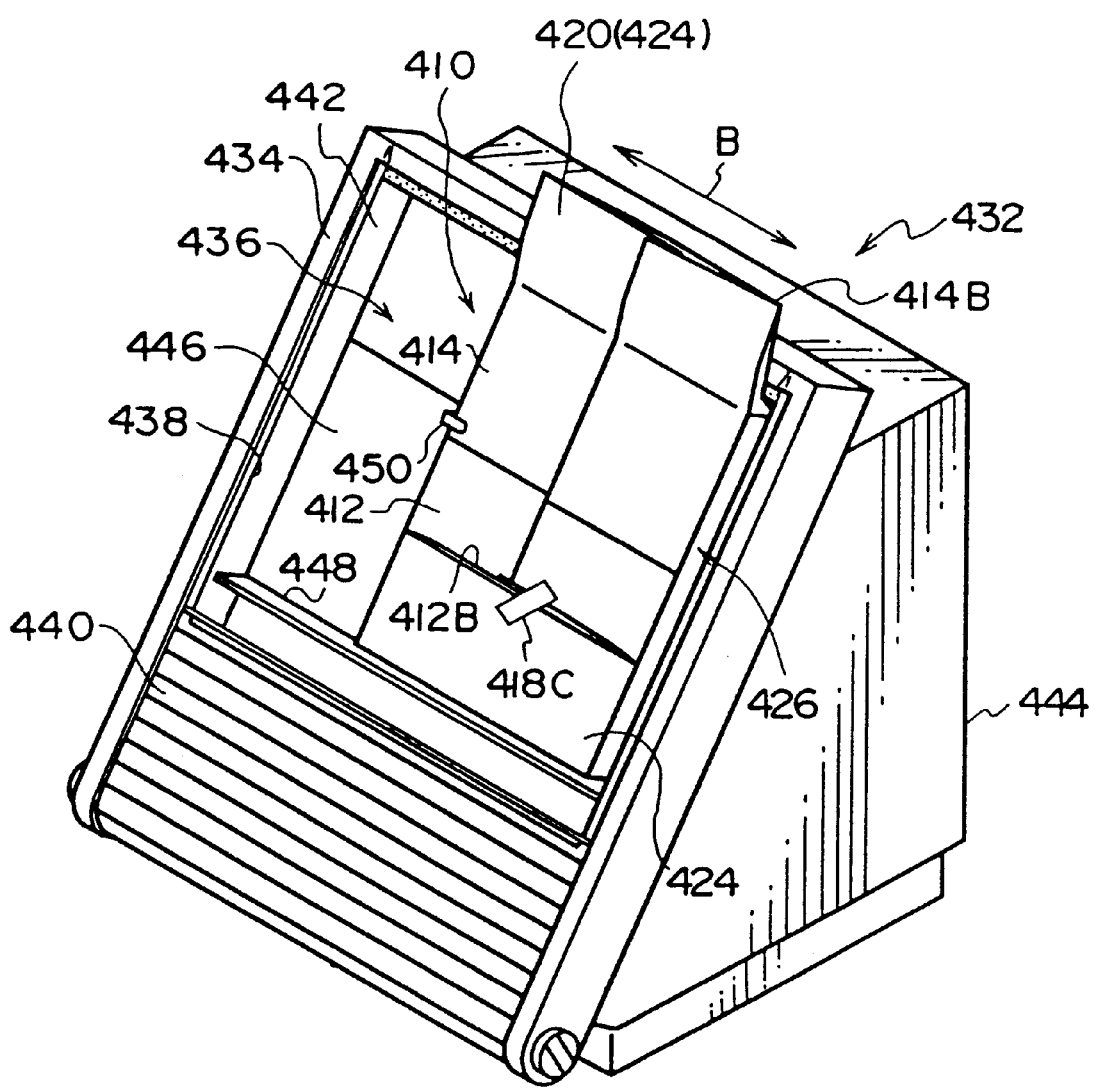
FIG. 17 is a perspective view which shows a photosensitive printing plate supplying apparatus into which the photosensitive printing plates packaged in the packaging materials based on the fourth through eleventh embodiments of the present invention have been loaded.

In order to supply the photosensitive printing plates 42 packaged in the packaging paper 410 to the automatic plate making machine 20 (see FIG. 16), first, the bundle 49 of photosensitive printing plates 42 is taken out from the box 476 and loaded into the photosensitive printing plate supplying apparatus 432 which is shown in detail in FIG. 17.

As shown in FIG. 16, the automatic plate making machine 20 comprises the photosensitive printing plate supplying apparatus 432, a conveying apparatus 484, the exposure apparatus 12, and the development-fixing apparatus 14. A suction cup 430 is attached to the conveying apparatus 484 so as to be able to move closer to or away from the loaded bundle 49 of photosensitive printing plates 42 and so as to be able to move in the conveying direction (the direction of arrow A). The photosensitive printing plates 42 are taken out one by one from the photosensitive printing plate supplying apparatus 432 and supplied to the exposure apparatus 12 by this suction cup 430.

Further, an unillustrated sensor is attached to the photosensitive printing plate supplying apparatus 432. The sensor determines whether an object stuck to the suction cup 430 is the photosensitive printing plate 42 or the superposing paper 44. The suction cup 430 supplies only the photosensitive printing plate 42 to the exposure apparatus 12 on the basis of the information from this sensor and conveys the superposing paper 44 to a paper discharge portion 429 provided within the photosensitive printing plate supplying apparatus 432.

Moreover, a friction guide 462 is attached at the conveying direction downstream side of the photosensitive printing plate 42. When the superposing paper 44 is attached to the photosensitive printing plate 42 lifted up by the suction cup 430, this friction guide 462 contacts the superposing paper 44 during conveyance of the photosensitive printing plate 42 and separates the superposing paper 44 from the photosensitive printing plate 42 by friction.

As shown in detail in FIG. 17, the photosensitive printing plate supplying apparatus 432 comprises a cassette accommodating portion 434 and a photosensitive printing plate supplying cassette 436 which is removably attached to this cassette accommodating portion 434.

On the side surface of the cassette accommodating portion 434, a loading opening 438 is formed and a slide door 440 which opens/closes this loading opening 438 is slidably attached. The loading opening 438 can be completely opened by sliding the slide door 440 downwardly and can be completely closed by moving it upwardly.

Figure 19:
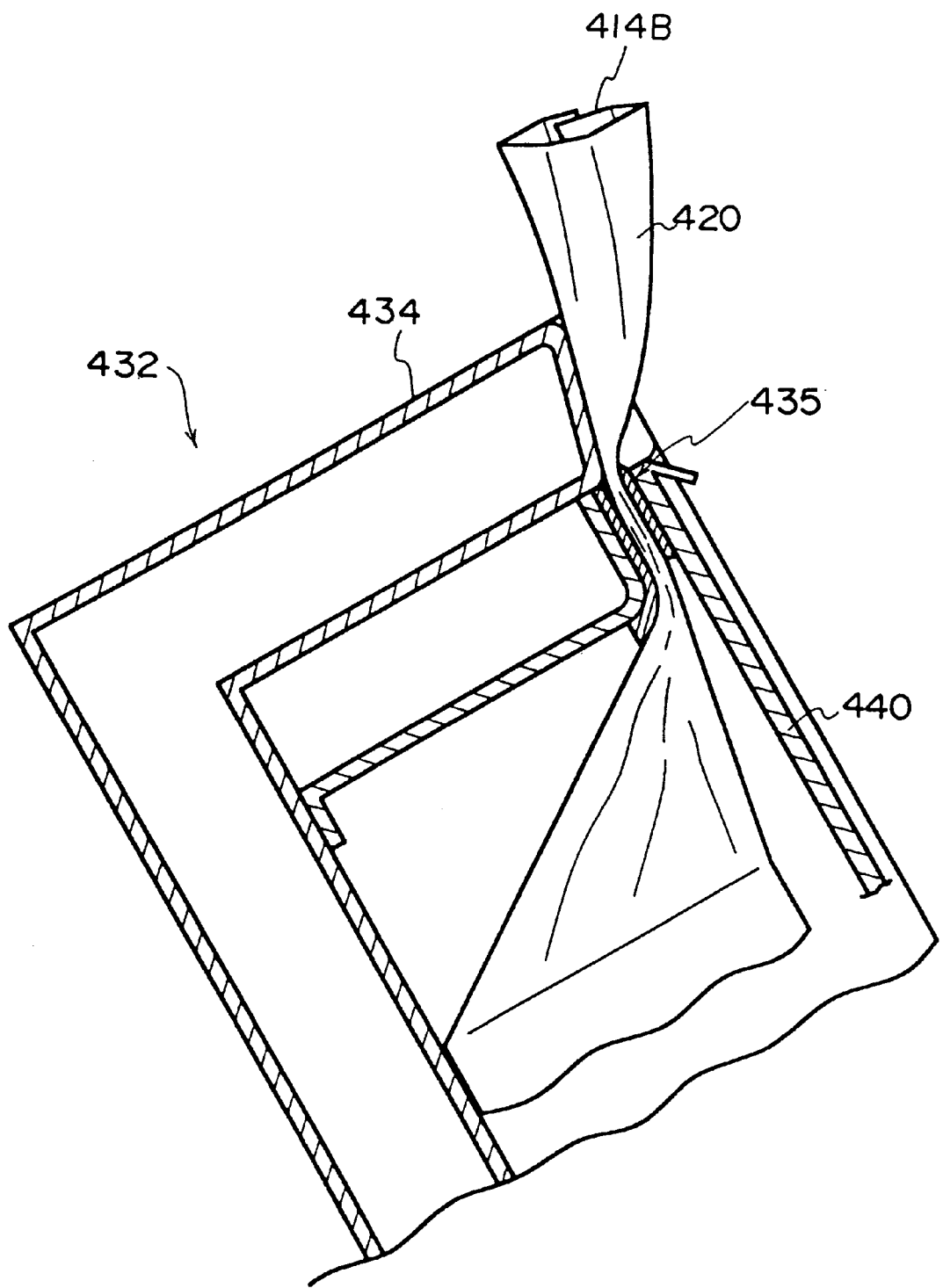
FIG. 19 is a cross-sectional view which shows an expanded portion of the photosensitive printing plate supplying apparatus into which the photosensitive printing plates packaged in the packaging materials based on the fourth through eleventh embodiments of the present invention are loaded.

At this time, as shown in FIG. 19, a light-shielding member 435 is provided at a portion of the cassette accommodating portion 434 in which the upper edge of the slide door 440 presses and adheres at the closed position.

Figure 18:
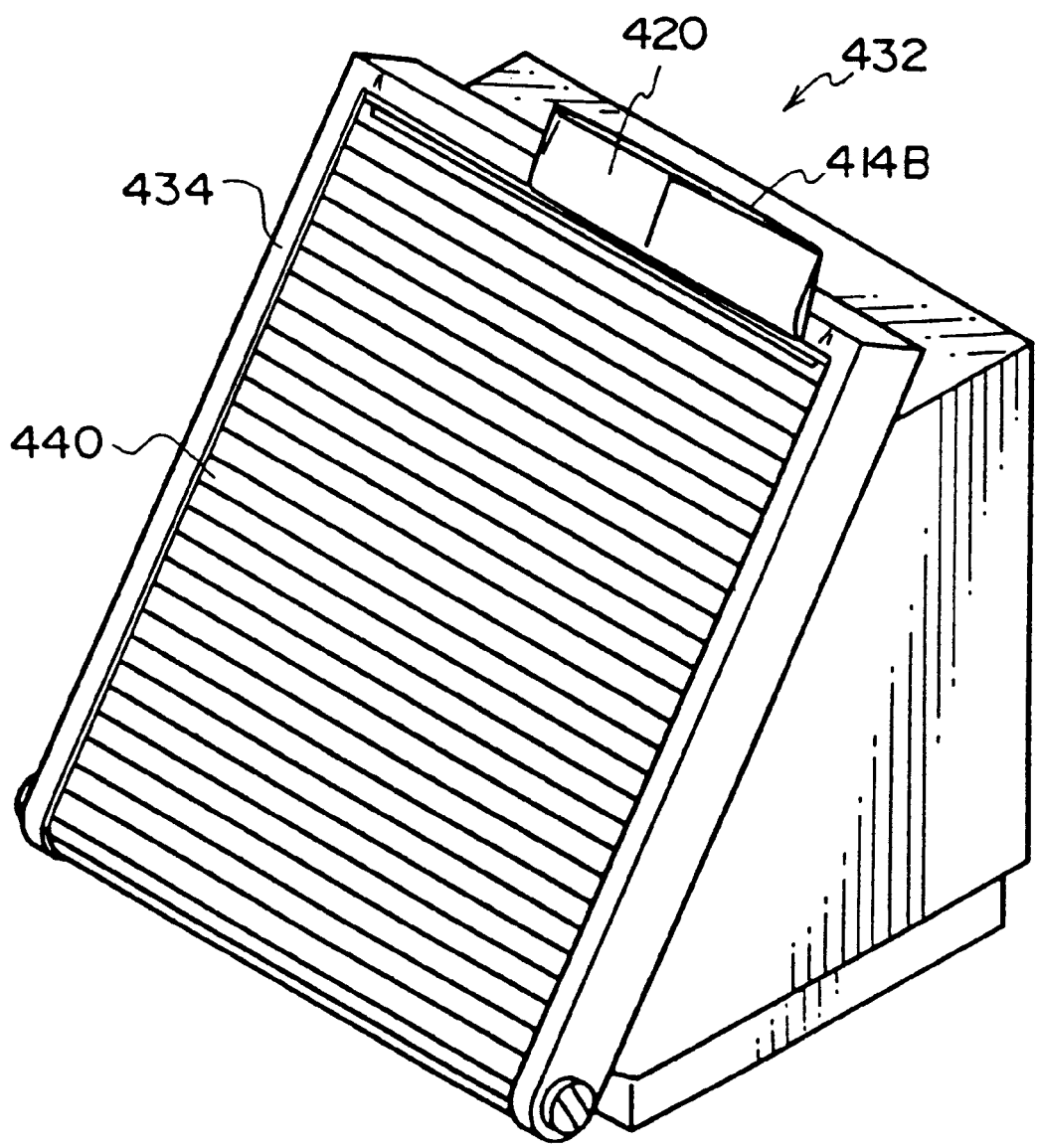
FIG. 18 is another perspective view which shows the photosensitive printing plate supplying apparatus into which the photosensitive printing plates packaged in the packaging materials based on the fourth through eleventh embodiments of the present invention are loaded.

As shown in FIGS. 18 and 19, in a state in which the loading opening 438 is completely closed, the upper edge of the slide door 440 is pressed and adhered to the cassette accommodating portion 434 and thus the photosensitive printing plate supplying apparatus 432 is light-shielded from outside. Further, in this state, the slide door 440 is locked by an unillustrated lock device and not moved downward. As a result, the loading opening 438 is prevented from being not unnecessarily exposed and the interior of the photosensitive printing plate supplying apparatus 432 is reliably maintained in a light-shielded state. By unlocking the lock device, the slide door 440 can be moved downward such that the loading opening 438 is completely exposed.

It is not necessary that the photosensitive printing plate supplying cassette 436 is designed removable to/from the cassette accommodating portion 434. The photosensitive printing plate supplying cassette 436 may be formed integrally with the cassette accommodating portion 434 such that the cassette 436 cannot be attached to and removed from the cassette accommodating portion 434.

As shown in FIG. 17, the photosensitive printing plate supplying cassette 436 comprises a loading case 442, which is formed in a flat rectangular box shape and opens on the upper side, and a supporting stand 444, which supports this loading case 442 so that the bottom surface of the loading case 442 slants. Further, the bottom surface of the loading case 442 serves as a mounting surface 446 at which the packaging paper 410 is provided.

Positioning plates 448 and 450 are attached onto the mounting surface 446. The positioning plates 448 are movable in the upper and lower directions and position the bundle 49 of the photosensitive printing plates 42 provided on the mounting surface 446 at a predetermined position in the upper and lower directions. The left and right positioning plates 450 are movable in the transverse directions (the directions of arrow B) of the mounting surface 446 and can position the bundle 49 in accordance with the size of the photosensitive printing plates 42 in the left and right directions.

As shown in FIG. 16, a guide roller (member) 40 is attached to the bottom surface of the supporting stand 444. Due to this, the supporting stand 444 can be moved between a position which is accommodated within the photosensitive printing plate supplying apparatus 432 (see FIG. 16) and a position which is completely moved out of the photosensitive printing plate supplying apparatus 432.

When the cassette is to be loaded supporting stand 444 of the photosensitive printing plate supplying apparatus 432 which is structured as described above is moved to the position which is completely out of the automatic plate making machine 20, the slide door 440 is moved downward, and the loading opening 438 is exposed (see FIG. 17). The bundle 49 of the photosensitive printing plates 42 packaged in the packaging paper 410 is mounted through the loading opening 438 on the mounting surface 446 so that the long edges 412B and 414B are each horizontal (In FIG. 17, the long edge 414B is provided above the long edge 412B).

Next, the adhesive tape 418D at the long edge 414B side which is disposed at the upper portion in FIG. 17 and the adhesive tape 418B at the center (see FIG. 14) are peeled off. The folded portion 424 is then extended upwardly so that the portion 424 juts out of the photosensitive printing plate supplying apparatus 432 as shown in FIG. 17. In this way, the folded portion 424 serves as a jutting-out portion 420, and the rest of the packaging paper 410 serves as a packaging means main body. Then, the slide door 440 is slid upwardly such that this jutting-out portion 420 is nipped between the upper edge of the slide door 440 and the cassette accommodating portion 434. The slide door 440 is locked at the completely closed position by the unillustrated lock device. In this way, the photosensitive printing plate 42 is doubly completely shielded from light by the packaging paper 410 and the photosensitive printing plate supplying apparatus 432.

Figure 20:
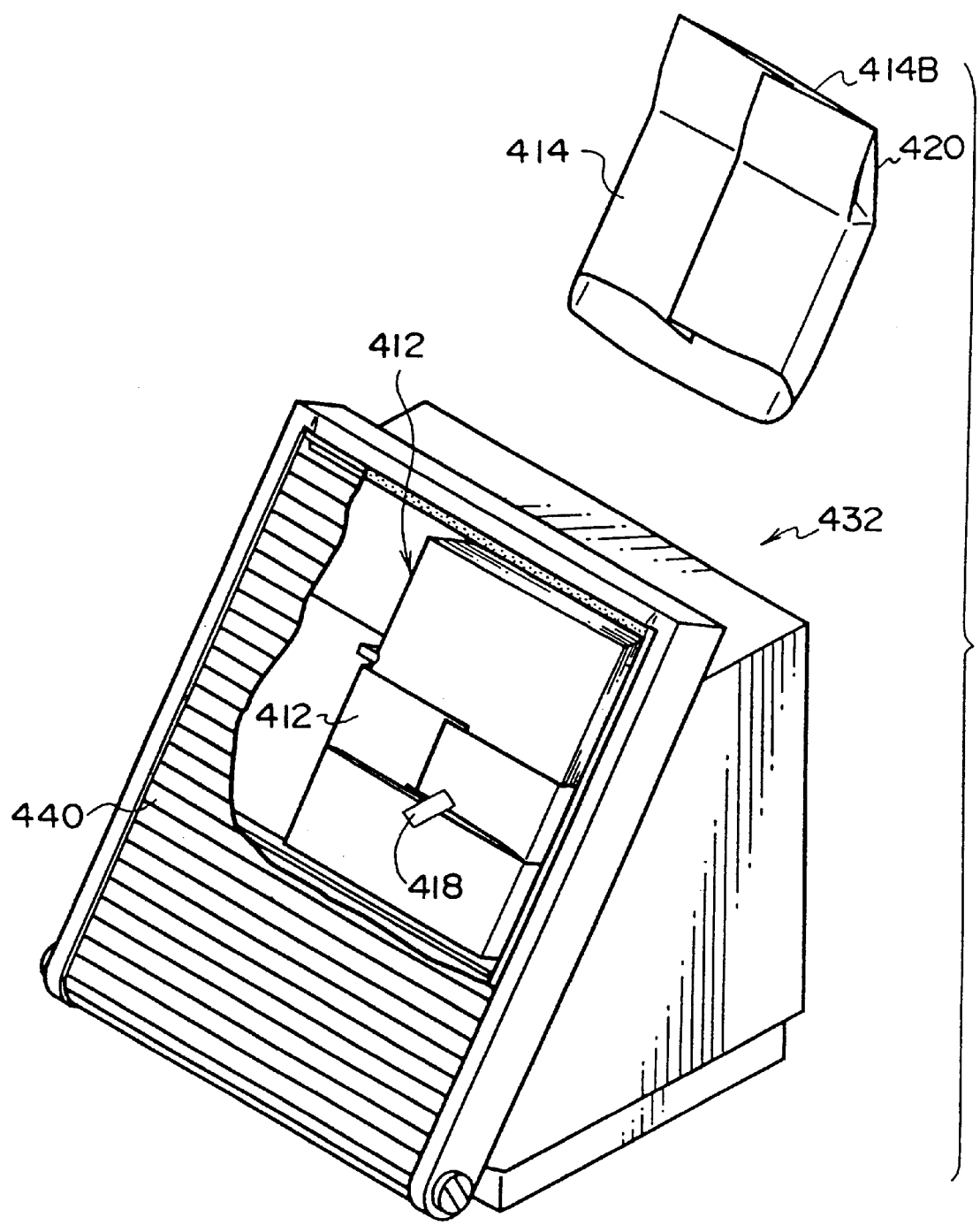
FIG. 20 is a partly-broken perspective view of the photosensitive printing plate supplying apparatus into which the photosensitive printing plates packaged in the packaging materials based on the fourth through eleventh embodiments of the present invention are loaded.

Next, the jutting-out portion 420 is pulled out and the pulling-out force is applied to the packaging members 412 and 414. As shown in FIG. 20, when the pulling-out force reaches a predetermined value, the packaging member 414 is separated from the packaging member 412 against the adhesive strength of the adhesive tape 418A (see FIG. 11) which fixes the packaging members 412 and 414. Accordingly, the upper portion of the photosensitive printing plate 42 is exposed inside the photosensitive printing plate supplying apparatus 432. However, the photosensitive printing plate 42 has been already light-shielded by the photosensitive printing plate supplying apparatus 432 itself and entry of light is further prevented by the light-shielding member 436 provided at the removal position. Therefore, when the jutting-out portion 420 is pulled out, the light does not enter from this removal portion and the photosensitive printing plate 42 is not exposed.

In this state, the supporting stand 444 is moved and accommodated within the photosensitive printing plate supplying apparatus 432.

Next, the photosensitive printing plate supplying apparatus 432 moves the slide door 440 downward and exposes the loading opening 438. Since the upper portion of the photosensitive printing plate 42 is exposed, the conveying apparatus 484 can now stick to this exposed portion using the suction cup 430, convey and supply the photosensitive printing plates 42 one by one to the exposure apparatus 12. At this time, the unillustrated sensor determines whether the object stuck to the suction cup 430 is the photosensitive printing plate 42 or the superposing paper 44, and only the photosensitive printing plate 42 is supplied to the exposure apparatus 12.

Even if the photosensitive printing plate 42 is conveyed while the superposing paper 44 is attached thereto, the superposing paper 44 touches the friction guide 462 during the conveyance and is separated from the photosensitive printing plate 42, falling onto the paper discharge portion 429. Accordingly, only the photosensitive printing plate 42 is reliably supplied to the exposure apparatus 12.

Thus, in the packaging paper 410 of the fourth embodiment, as the jutting-out portion 420 is provided at the packaging paper 410 such that the jutting-out portion 420 can jut out of the photosensitive printing plate supplying apparatus 432, the photosensitive printing plate 42 can be loaded into the photosensitive printing plate supplying apparatus 432 in a state in which the photosensitive printing plate 42 is packaged in the packaging paper 410. Also, the jutting-out portion 420 is automatically pulled out after the loading and a portion of the photosensitive printing plate 42 can be exposed within the photosensitive printing plate supplying apparatus 432.

As a result, the photosensitive printing plates 42 can be loaded into the photosensitive printing plate supplying apparatus 432 even under the bright environment. Namely, it is not necessary to load the photosensitive printing plates 42 under the dark environment as in a conventional example. Therefore, the operational efficiency improves and the operator's burden is reduced.

Further, as it is not necessary to darken the entire room at which the automatic plate making machine 20 is located, the other operation can be carried out within this room without any problem (such other operations were significantly disturbed because of darkness in the case of the prior art), and thus the operational efficiency can be increased.

Figure 21:
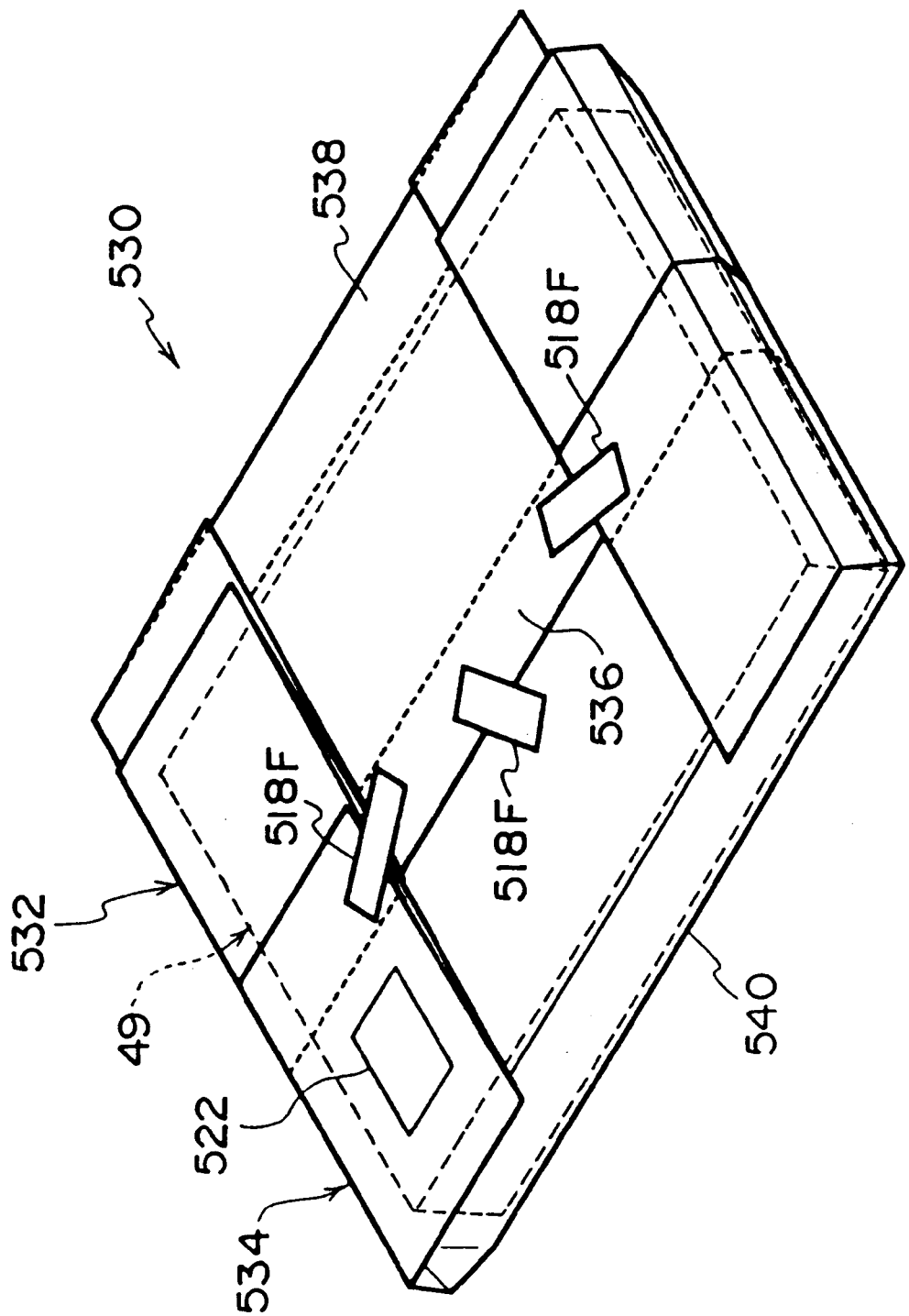
FIG. 21 is a perspective view which shows a state in which a bundle of photosensitive printing plates are packaged in a packaging paper based on a fifth embodiment of the present invention.

FIG. 21 shows a state in which the bundle 49 of the photosensitive printing plates 42 is packaged in a packaging paper 530 in a fifth embodiment of the present invention. Further, FIG. 22 shows the packaging paper 530 in an unfolded state.

Similarly to the packaging paper 410 in the fourth embodiment, this packaging paper 530 comprises packaging members 532 and 534 which are formed by attaching a thin film having light-shielding properties and moisture-proof properties onto at least one surface of the paper having a predetermined strength.

Further, similarly to the packaging paper 410, the bundle 49 of the photosensitive printing plates 42 is packaged by the packaging members 532 and 534 in the form of "caramel packaging". However, compared to the packaging paper 410 of the fourth embodiment, the structure of a jutting-out portion is different in the present embodiment.

Figure 22:
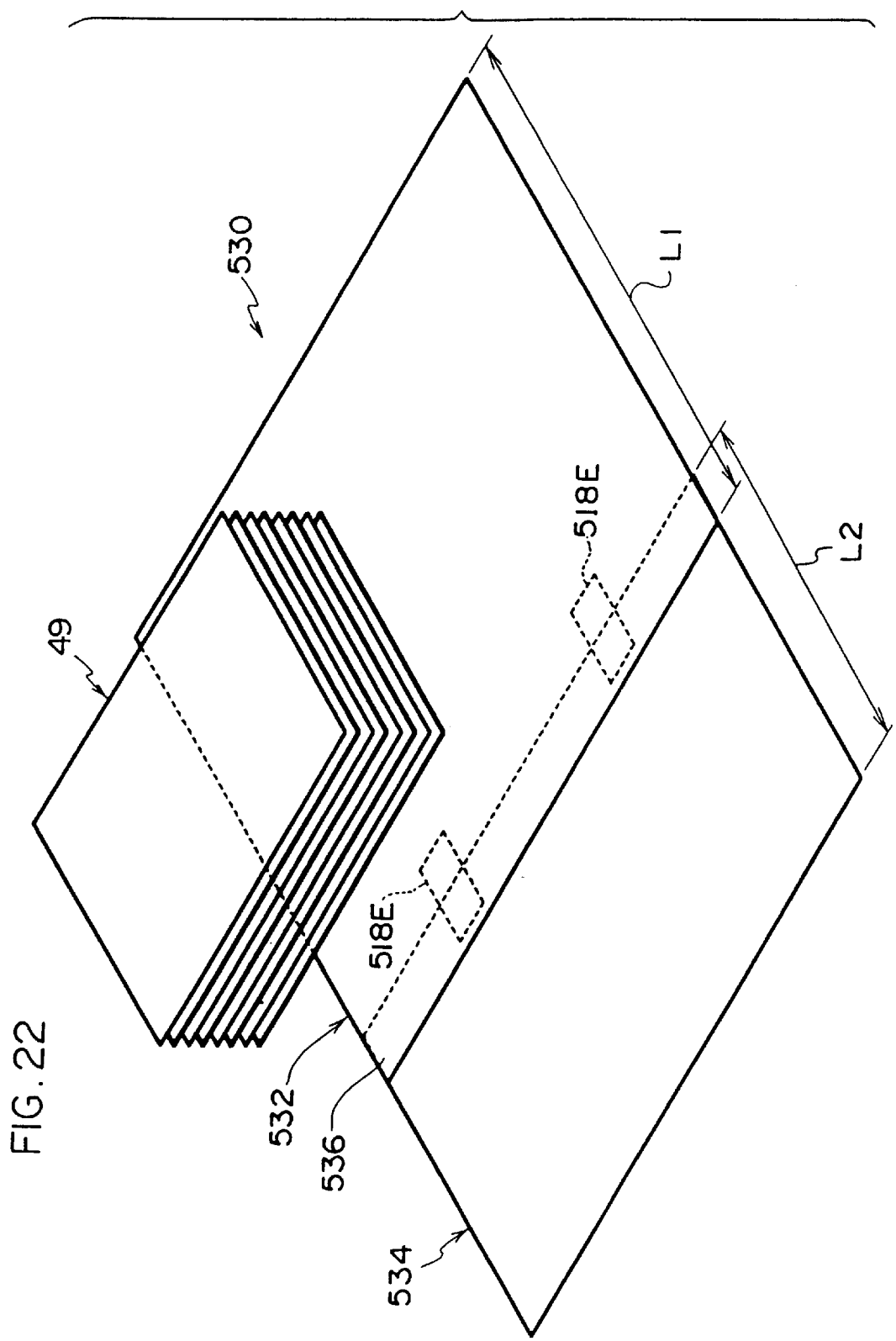
FIG. 22 is an exploded perspective view which shows the unfolding state of a packaging paper of the fifth embodiment and a bundle of photosensitive printing plates to be packaged in this packaging paper.

Namely, as can been seen from the unfolded state shown in FIG. 22, of the two packaging members 532 and 534 which form the packaging paper 530, a width L1 of the one packaging member 532 is longer than a width L2 of the other packaging member 534. The packaging members 532 and 534 are overlapped at an overlapped portion 536 having a predetermined width, and the packaging paper 530 as a whole is rectangle. Moreover, the packaging members 532 and 534 are fixed by adhesive tapes 518E.

In this fifth embodiment and the embodiments thereafter as well, similarly to the packaging paper 410 of the fourth embodiment, a display portion (522 in the fifth embodiment) is provided. In the fifth embodiment, because the other structural components are the same as those in the fourth embodiment, the descriptions thereof are omitted.

Figure 23:
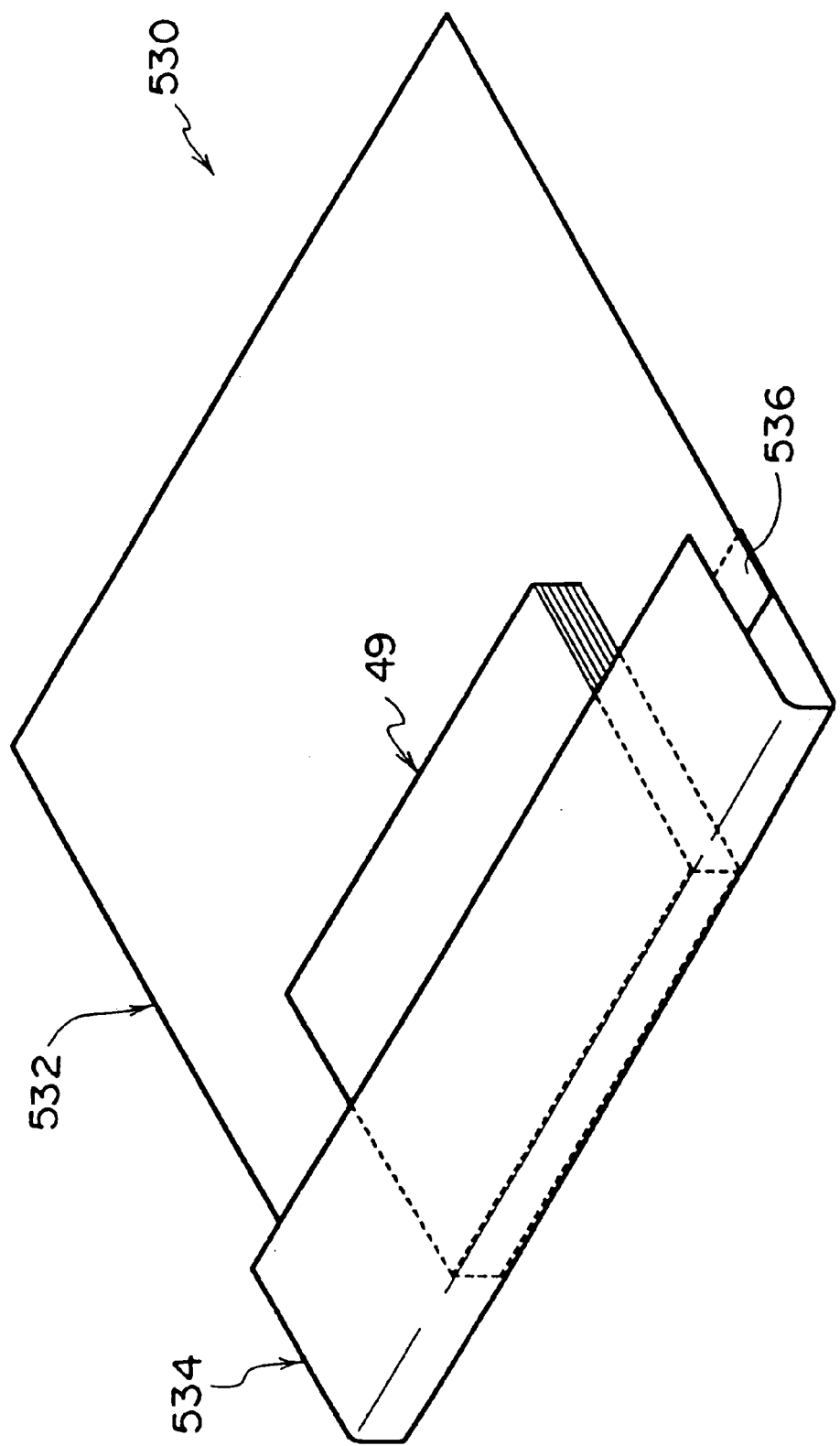
FIG. 23 is a perspective view which shows a state in which the bundle of photosensitive printing plates are in the middle of being packaged in the packaging paper of the fifth embodiment.

As shown in FIG. 22, first, the bundle 49 is placed onto the packaging members 532 and 534 so that the longitudinal directions of the packaging members 532 and 534 correspond to the longitudinal direction of the bundle 49. As shown in FIG. 23, a part of the packaging member 534 is folded over on the upper surface of the bundle 49. Then, the packaging member 532 is folded over on the upper surface of the bundle 49 along a double-dashed chain line in FIG.

Figure 24:
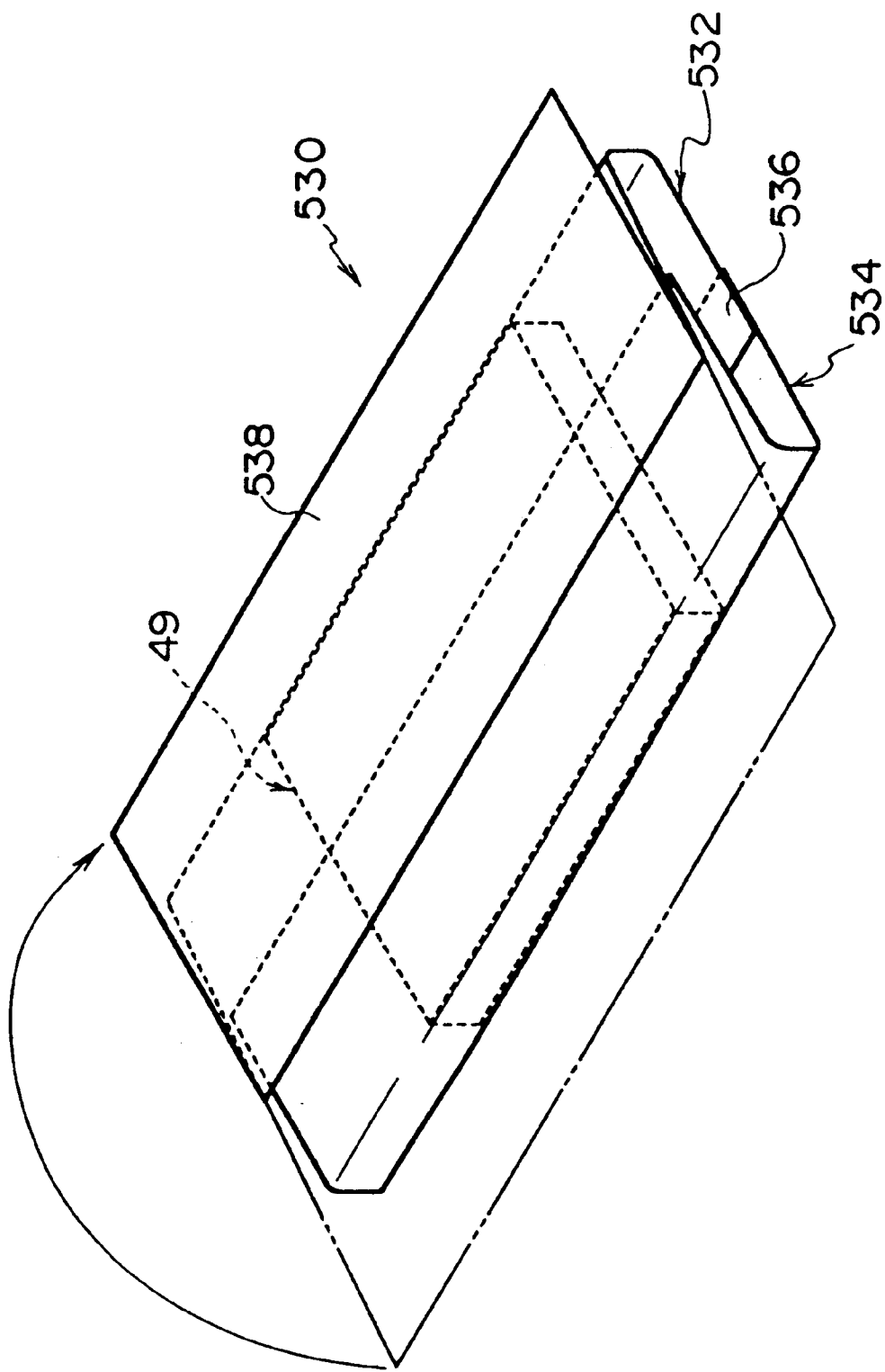
FIG. 24 is another perspective view which shows a state in which the bundle of photosensitive printing plates are in the middle of being packaged in the packaging paper of the fifth embodiment.

24. Further, the folded portion of the packaging member 532 lying on the upper surface of the bundle 49 is folded over to the opposite side so that this folded portion of the packaging member 532 overlaps the packaging member 534 by a predetermined width. In this way, as shown by a solid line in FIG. 24, a portion of the packaging paper 532 at the distal end side forms a jutting-out portion 538 which juts further outward than the bundle 49.

Lastly, portions of the packaging paper 530 which protrude out of the longitudinal direction ends of the bundle 49 (see FIG. 24) are folded over on the upper side of the bundle 49 as shown in FIG. 21. Further, the overlapped portion 536 is fixed by adhesive tapes 518F.

Consequently, the bundle 49 of the photosensitive printing plates 42 is packaged and light-shielded by the packaging paper 530. The packaging paper 530 comprises a packaging paper main body 540 which packages and shields the bundle 49 of the photosensitive printing plates 42 from light and the jutting-out portion 538 which is provided at this packaging paper main body 540.

Accordingly, when the bundle 49 of the photosensitive printing plates 42 packaged in the packaging paper 530 is loaded into the photosensitive printing plate supplying apparatus 432 (see FIG. 17), the bundle 49 is set on the mounting surface 446 so that the jutting-out portion 538 is disposed on the upper side in a state in which the slide door 440 is lowered and the loading opening 438 is completely exposed. Then, the slide door 440 is slid upwardly, this jutting-out portion 538 is nipped between the upper edge of the slide door 440 and the cassette accommodating portion 434, and the slide door 440 is locked at a completely closed position by an unillustrated lock device.

Next, the jutting-out portion 538 is (manually) pulled out and the pulling-out force is applied to the packaging members 532 and 534. The packaging member 532 is then separated from the packaging member 534 against the adhesive strengths of the adhesive tapes 518E and 518F, and the upper portion of the photosensitive printing plate 42 is exposed within the photosensitive printing plate supplying apparatus 432.

In this way, in the packaging paper 530 of the fifth embodiment, the jutting-out portion 538 is provided at the packaging paper 530 such that the jutting-out portion 538 juts out of the photosensitive printing plate supplying apparatus 432. The bundle 49 of the photosensitive printing plates 42 is loaded into the photosensitive printing plate supplying apparatus 432 in a state in which the bundle 49 is packaged in the packaging paper 530. The jutting-out portion 538 which projects out of the printing plate supplying apparatus 432 is pulled out after the loading and thus a portion of the photosensitive printing plate 42 can be exposed within the photosensitive printing plate supplying apparatus 432.

As a result, the photosensitive printing plates 42 can be loaded into the photosensitive printing plate supplying apparatus 432 tunder the bright environment. Therefore, the operational efficiency improves and the operator's burden is reduced compared to the conventional example.

Moreover, as it is not necessary to darken the entire room at which the automatic plate making machine 20 is located, the other operations can be carried out within this room without any problem (Such other operations were significantly disturbed in the case of the conventional device) and the operational efficiency is increased.

Figure 25:
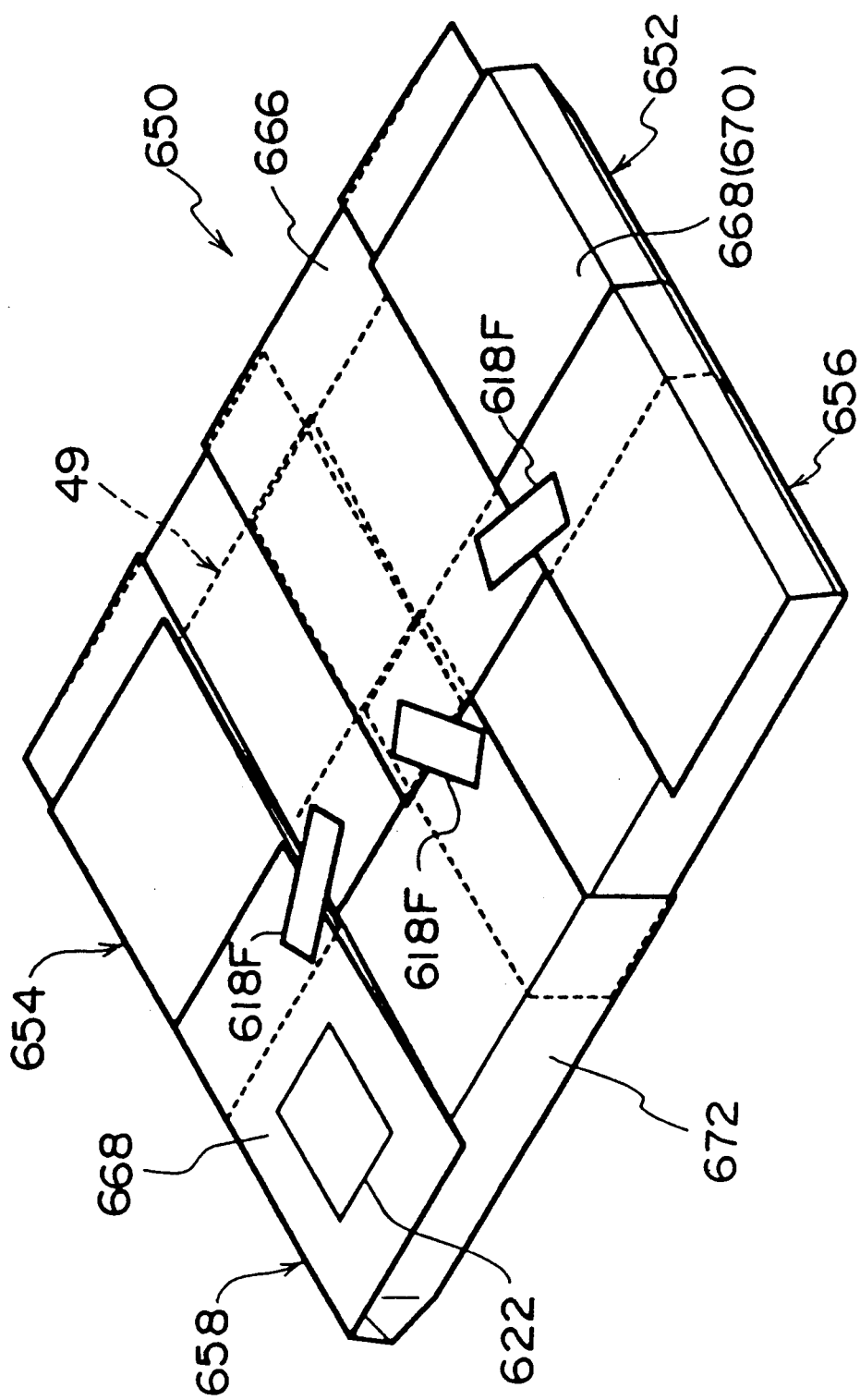
FIG. 25 is a perspective view which shows a state in which a bundle of photosensitive printing plates are packaged in a packaging paper based on a sixth embodiment of the present invention.
Figure 26:
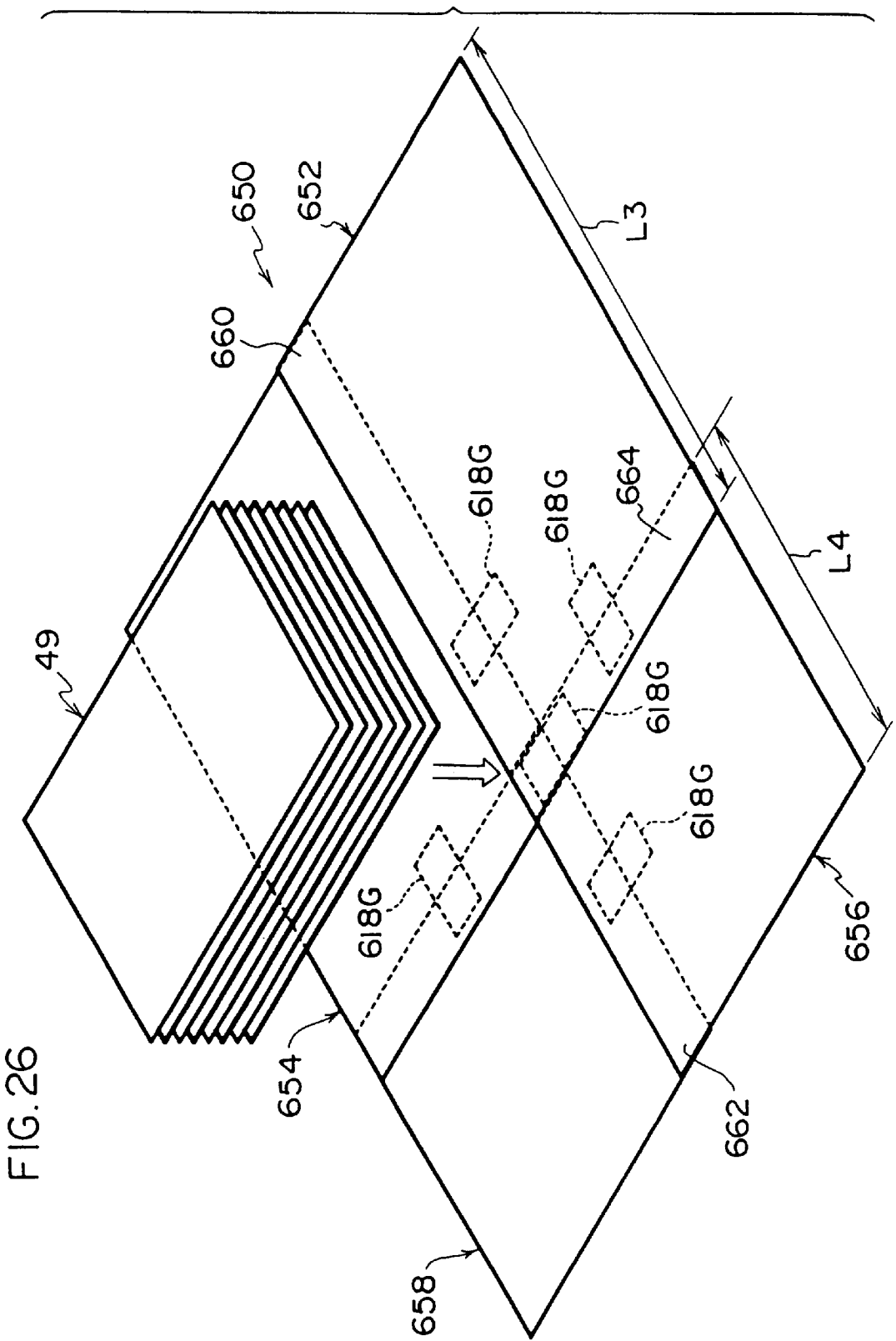
FIG. 26 is a perspective view which shows a state in which the bundle of photosensitive printing plates are in the middle of being packaged in the packaging paper of the sixth embodiment.

FIG. 25 shows a packaging paper 650 which is a sixth embodiment of the present invention. Further, FIG. 26 shows this packaging paper 650 in an unfolded state. A display portion 722 is provided.

As can be seen from FIG. 25, similarly to the packaging paper 410 of the fourth embodiment and the packaging paper 530 of the fifth embodiment, the bundle 49 of the photosensitive printing plates 42 is packaged by the packaging paper 650 in the form of "caramel packaging".

Further, this packaging paper 650 forms a structure which includes a jutting-out portion like the jutting-out portion 420 (shown in FIG. 17 and provided at the packaging paper 410 of the fourth embodiment) and a jutting-out portion like the jutting-out portion 538 (shown in FIG. 21 and provided at the packaging paper 530 of the fifth embodiment).

Namely, as can be seen from FIG. 26, this packaging paper 650 is different from the packaging paper 410 of the fourth embodiment and the packaging paper 530 of the fifth embodiment and comprises four packaging members 652, 654, 656, and 658.

Among the four packaging members 652, 654, 656, and 658, an overlapped portion 660 is formed by overlapping the two packaging members 652 and 654 by a predetermined width. Similarly, an overlapped portion 662 is formed by overlapping the other packaging members 656 and 658 by a predetermined width.

Further, an overlapped portion 664 is formed by overlapping the two overlapped packaging members 652 and 654 and the two overlapped packaging members 656 and 658 by predetermined widths. In this way, a substantially plus-shaped overlapped portion is formed as a result and the entire packaging paper 650 is rectangular as a whole. The four packaging members 652, 654, 656, and 658 are fixed with each other by adhesive tapes 618G.

Moreover, among the four packaging members 652, 654, 656, and 658, the width L3 of the two packaging members 652 and 654 is longer than the width L4 of the other two packaging members 656 and 658.

In order to package the bundle 49 of the photosensitive printing plates 42 by this packaging paper 650, first, as shown in FIG. 26, the bundle 49 is placed onto the packaging paper 650 so that the center of the packaging paper 650 in an unfolded state substantially corresponds to the center of the bundle 49.

Figure 27:
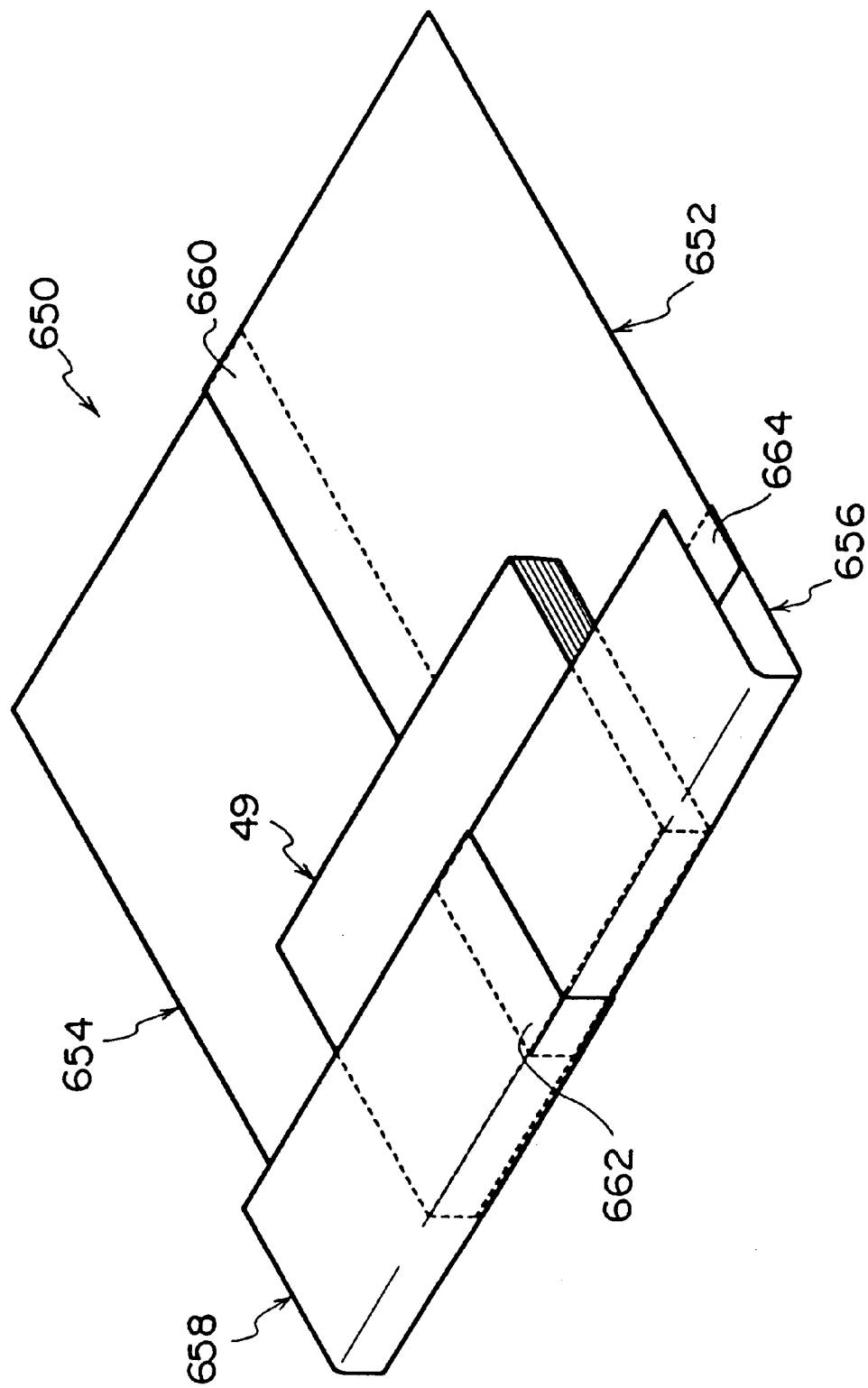
FIG. 27 is another perspective view which shows a state in which the bundle of photosensitive printing plates are in the middle of being packaged in the packaging paper of the sixth embodiment.
Figure 28:
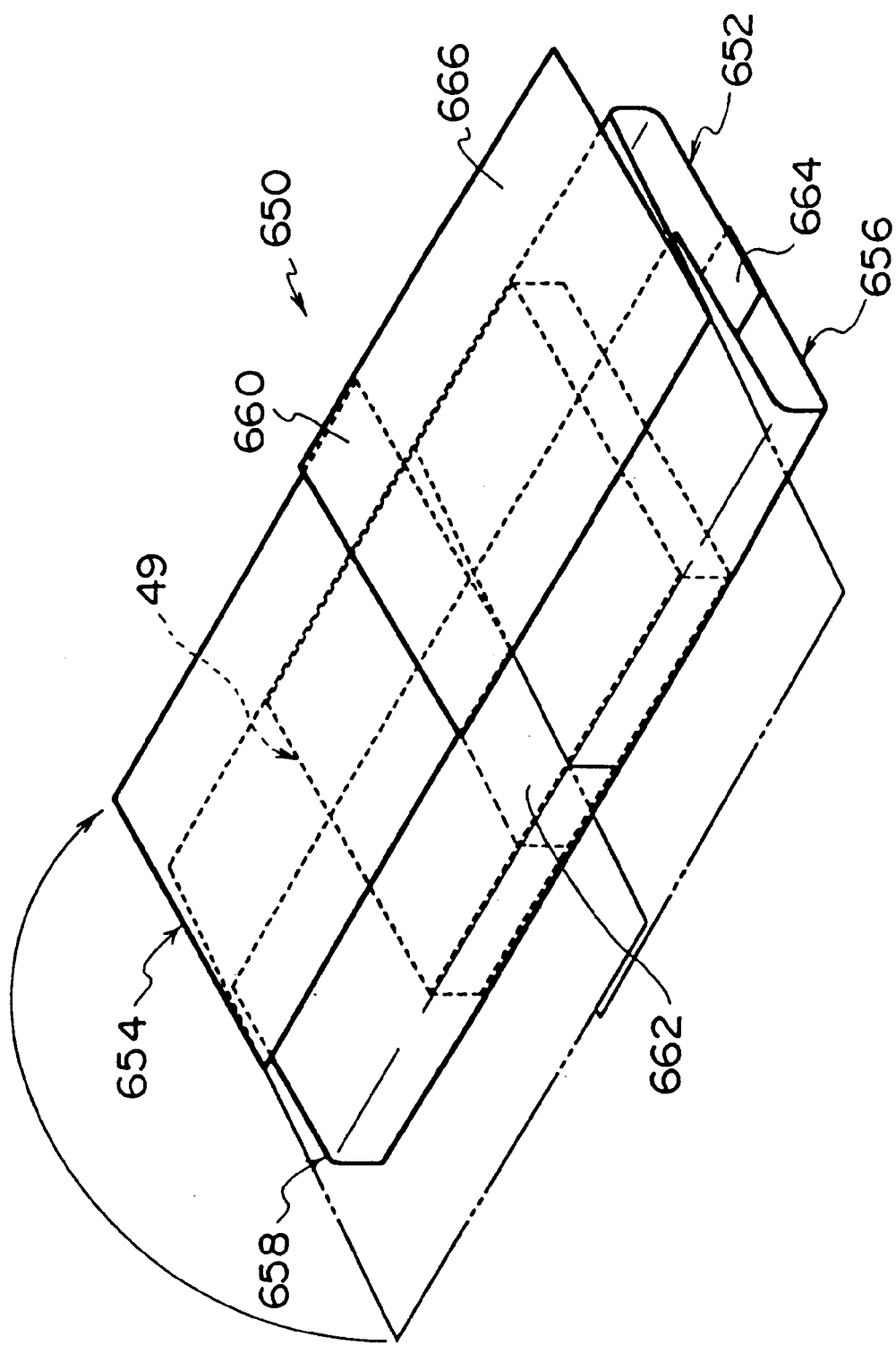
FIG. 28 is yet another perspective view which shows a state in which the bundle of photosensitive printing plates are in the middle of being packaged in the packaging paper of the sixth embodiment.

Next, as shown in FIG. 27, in the same way as in the packaging paper 510 of the fifth embodiment, the packaging members 656 and 658 are folded over on the upper surface of the bundle 49, and then the packaging members 652 and 654 are folded over on the upper surface of the bundle 49 along a double-dashed chain line in FIG. 28. Further, the folded portions of the packaging members 652 and 654 lying on the upper surface of the bundle 49 are folded over to the opposite side so that the folded portions of the packaging members 652 and 654 overlap the packaging members 656 and 658 by a predetermined width.

In this way, as shown by a solid line in FIG. 28, portions of the packaging members 652 and 654 form a jutting-out portion 666 which juts out of the bundle 49. The portions of the packaging paper 650 which protrude out of the longitudinal direction both ends of the bundle 49 (see FIG. 28) are folded over on the upper side of the bundle 49 and thus forms a folded portion 668. Accordingly, the bundle 49 is packaged and light-shielded by the packaging paper 650.

In the same way as in the jutting-out portion 420 of the packaging paper 410 in the fourth embodiment, the folded portion 668 can serve as a jutting-out portion 670 when loaded onto the printing plate supplying cassette. The folded portion 668 is fixed to the packaging members 652 and 654 by adhesive tapes 618F.

Consequently, the bundle 49 of the photosensitive printing plates 42 is packaged and light-shielded by the packaging paper 650. The packaging paper 650 comprises a packaging paper main body 672 which packages and shields the bundle 49 of the photosensitive printing plates 42 from light, and the jutting-out portion 666 and the folded portion 668 (the jutting-out portion 670) which are provided at this packaging paper main body 672.

When the bundle 49 of the photosensitive printing plates 42 packaged in the packaging paper 650 is loaded into the photosensitive printing plate supplying apparatus 432, in the same way as in the packaging paper 530 of the fifth embodiment, the bundle 49 can be loaded so that the jutting-out portion 666 is placed on the upper side. By applying a predetermined value or more of pulling-out force to the jutting-out portion 666, the packaging members 652 and 654 are separated from the packaging members 656 and 658.

In addition to this, in the same way as in the packaging paper 410 of the fourth embodiment, the bundle 49 can be loaded in a state in which the folded portion 668 is placed at the upper side, the adhesive tapes 618 are peeled off, and the folded portion 668 is extended so that the portion 668 juts out of the photosensitive printing plate supplying apparatus 432 and can serve as the juttingout portion 670. In this case as well, by applying a predetermined value or more of pulling-out force to the jutting-out portion 666, the packaging members 652 and 656 are separated from the packaging members 654 and 658.

Thus, as the two orthogonal separate portions (the overlapped portions 660 and 662) are formed at the packaging paper 650 by the four packaging members 652, 654, 656, and 658, the packaging paper 650 is separated regardless of any of the jutting-out portions 666 and 670 being pulled out. As a result, it is not necessary to consider the direction of the packaging paper with respect to the bundle 49 of the photosensitive printing plates 42 as in the case of the fourth embodiment, and the flexibility of the packaging paper increases.

The overlapped portions 660 and 662 need not be orthogonal. Specifically, if the overlapped portions 660 and 662 are not orthogonal, the packaging paper 650 can still be separated by applying pulling-out force from the different directions to the packaging paper 650. The flexibility of the packaging paper 650 thereby increases.

Figure 29:
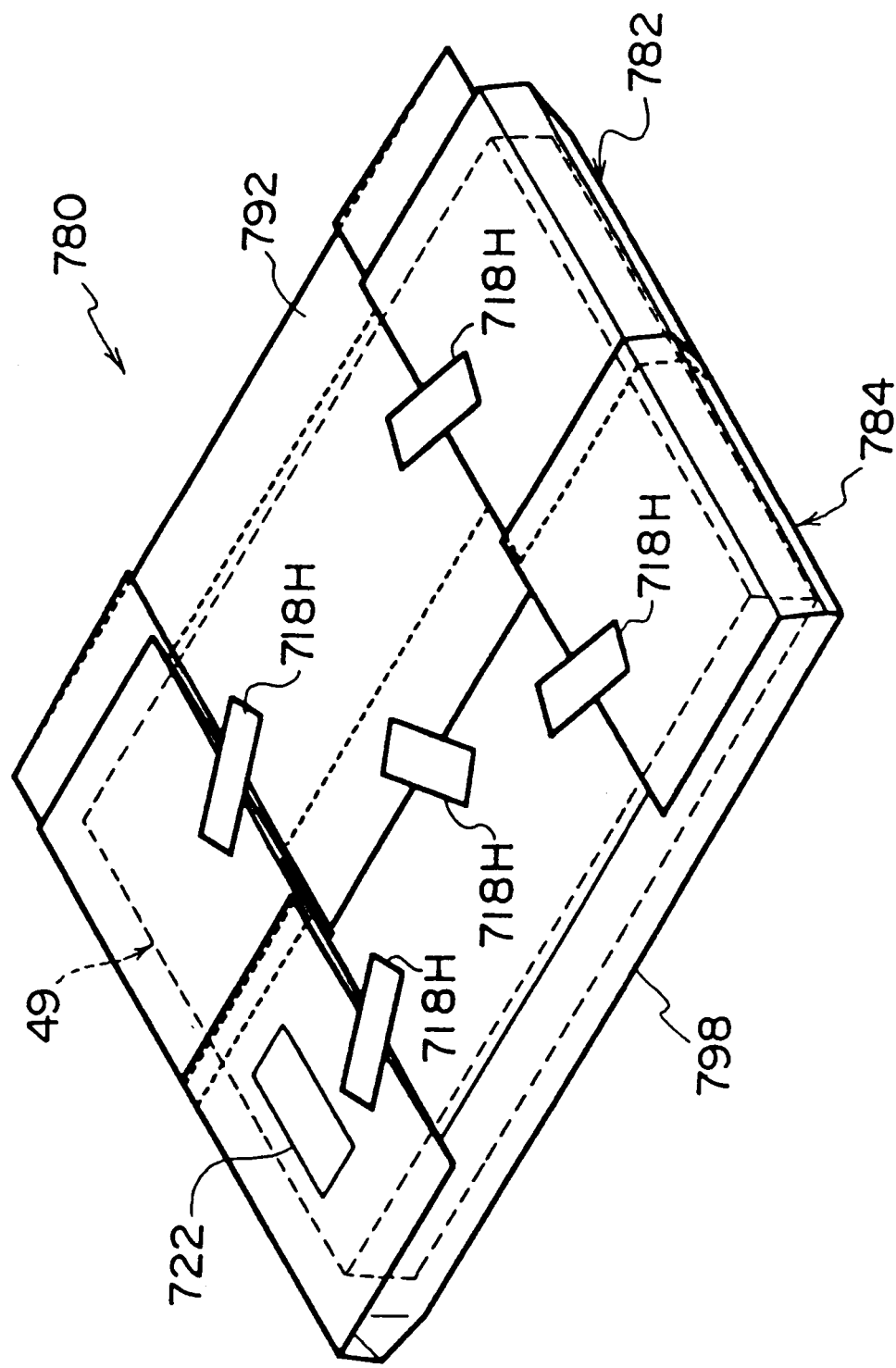
FIG. 29 is a perspective view which shows a state in which the bundle of photosensitive printing plates are packaged in the packaging paper based on a seventh embodiment.
Figure 30:
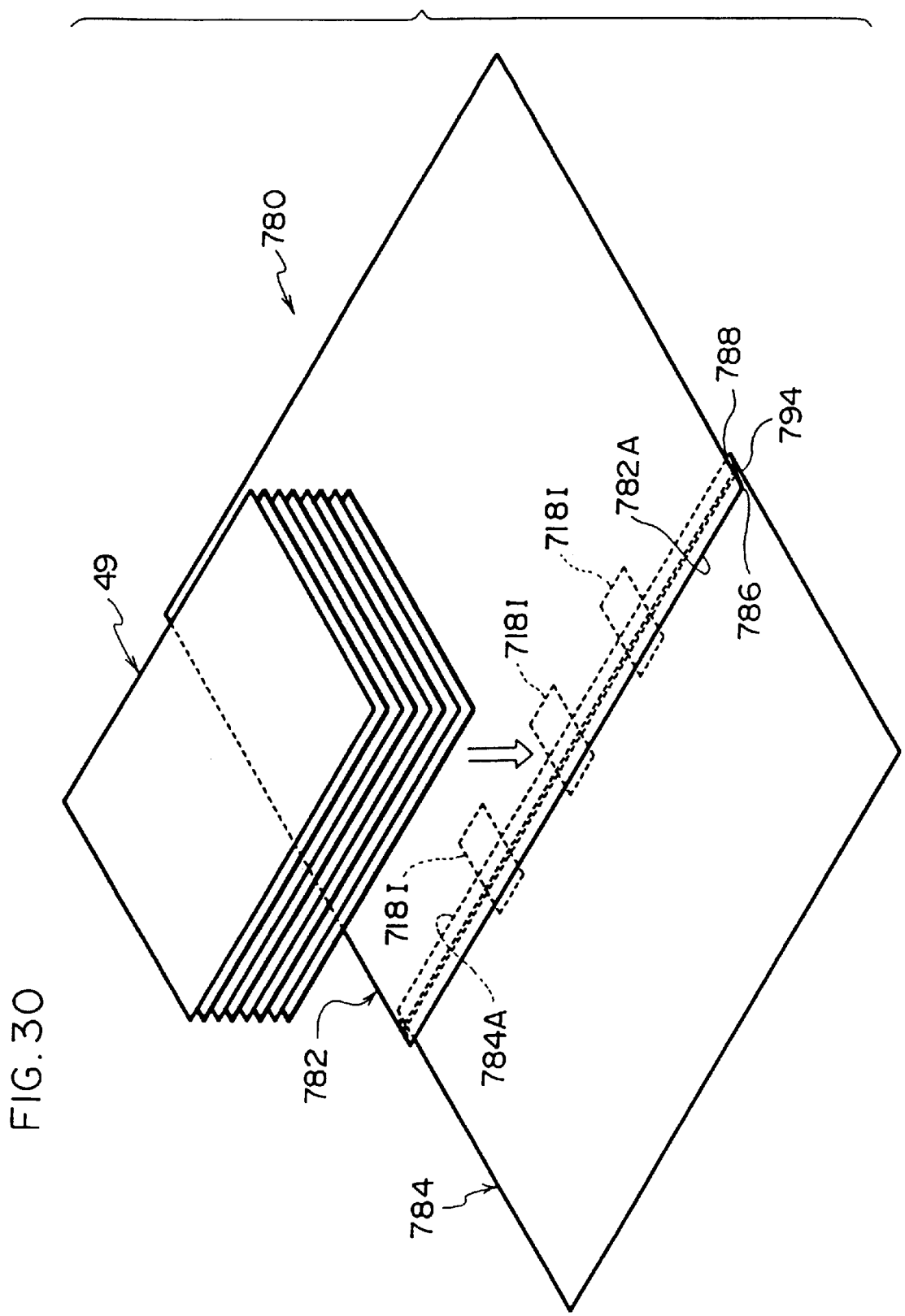
FIG. 30 is a perspective view which shows a state in which the bundle of photosensitive printing plates are in the middle of being packaged in the packaging paper of a seventh embodiment.

FIG. 29 shows a state in which a packaging paper 780 in a seventh embodiment of the present invention packages the bundle 49 of the photosensitive printing plates 42. Further, FIG. 30 shows this packaging paper 780 in an unfolded state.

This packaging paper 780 packages the bundle 49 in the same way of folding as the packaging paper 530 of the fifth embodiment. However, the structure of an overlapped portion is different in the present embodiment.

Figure 31:
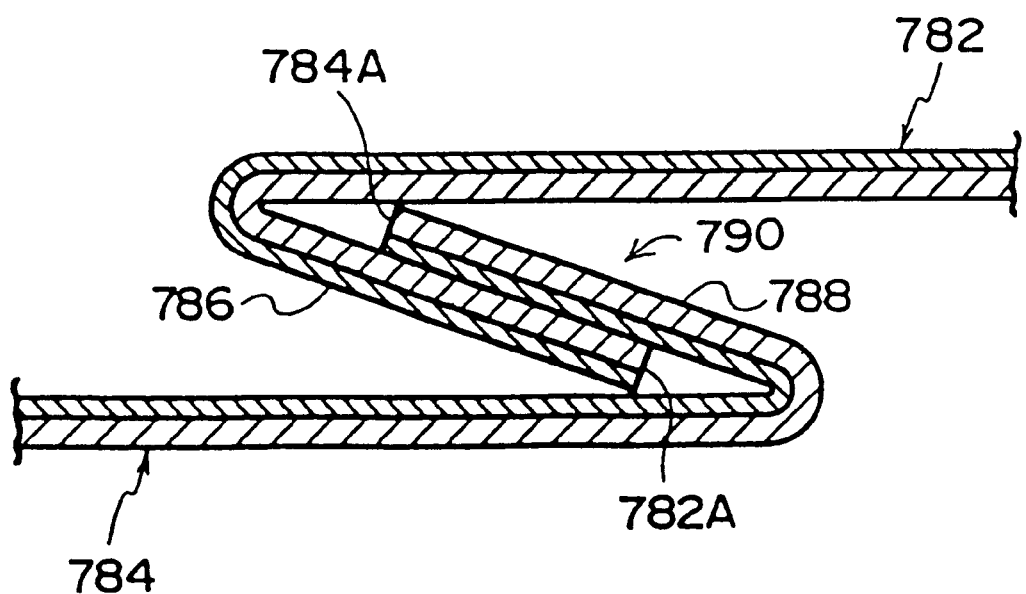
FIG. 31 is an enlarged cross-sectional view which shows an overlapped portion of the packaging paper of the seventh embodiment.

Namely, as shown in detail in FIG. 31, a portion of a packaging member 782 at a long edge 782A side and a portion of a packaging member 784 at a long edge 784A side are bent at acute angles, and bent portions 786 and 788 are formed. By engaging the bent portions 786 and 788 so as to catch on each other, an overlapped portion 790 is formed, and the two packaging members 782 and 784 are prevented from being separated accidentally in the carrying process or the storage process.

The packaging members 782 and 784 are more reliably fixed by adhesive tapes 718I.

Consequently, the bundle 49 of the photosensitive printing plates 42 is packaged and light-shielded by the packaging paper 780. In short, the packaging paper 780 comprises a packaging paper main body 798 which packages and shields the bundle 49 of the photosensitive printing plates 42 from light and a jutting-out portion 792 which is provided at this packaging paper main body 798. Because the other structural components in the seventh embodiment are similar to those in the aforementioned fifth embodiment, detailed descriptions thereof are omitted.

In order to package the bundle 49 of the photosensitive printing plates 42 in this packaging paper 780, similarly to the packaging paper 530 in the fifth embodiment, the bundle 49 is placed onto the packaging members 782 and 784 so that the longitudinal directions of the overlapped portion 790 of the packaging members 782 and 784 correspond to the longitudinal direction of the bundle 49. Then, the packaging member 784 is folded over on the upper surface of the bundle 49, and the packaging member 782 is folded over on the upper surface of the bundle 49. Further, the folded portion of the packaging member 782 lying on the upper surface of the bundle 49 is folded over to the opposite side so that the folded portion of the packaging member 782 overlaps the packaging member 784 by a predetermined width.

In this way, a portion of the packaging paper 782 at the distal end side forms a jutting-out portion 792 which juts out of the bundle 49. Accordingly, after the bundle is loaded into the photosensitive printing plate supplying apparatus 432 (see FIG. 17), the jutting-out portion 792 can be made jut out of the photosensitive printing plate supplying apparatus 432. The folded portions of the packaging members 782, 784 are fixed by adhesive 718H. This jutting-out portion 792 can then be pulled out. When the pulling-out force reaches a predetermined value, or more, the bent portions 786 and 788 are extended and released from engagement, and the packaging member 782 can be separated from the packaging member 784.

When the accidental separation of the two packaging members 782 and 784 can be more reliably prevented by the engagement between the bent portions 786 and 788, the adhesive tapes 718I may be omitted. Consequently, the number of parts is reduced and the structure can be made simpler.

Figure 32:
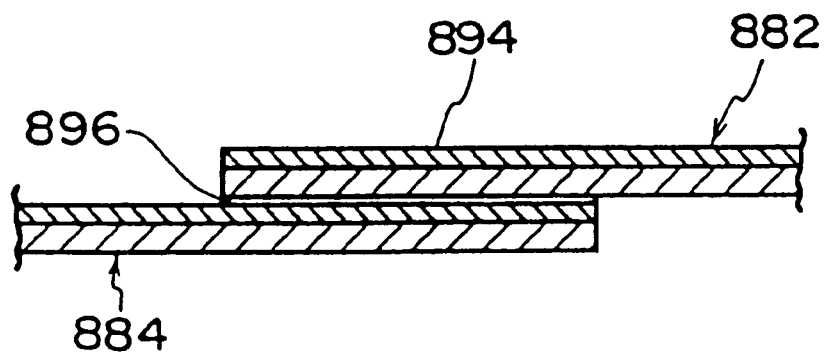
FIG. 32 is an enlarged cross-sectional view which shows an overlapped portion of packaging paper based on an eighth embodiment of the present invention.

FIG. 32 shows a partially enlarged view of an overlapped portion 894 of a packaging paper in an eighth embodiment of the present invention. The structure of the packaging paper in the eighth embodiment is substantially the same as that of the packaging paper 780 relating to the seventh embodiment and only the structure of the overlapped portion is different.

Namely, in the packaging paper in the eighth embodiment, the packaging members 882 and 884 are simply overlapped and the overlapped portion 894 is formed without forming the bent portions like the bent portions 786 and 788. The layers in the overlapped portion 894 are adhered to each other by an adhesive agent 896. This adhesive agent 896 effects a predetermined degree of adhesion which is strong enough to prevent packaging members 882 and 884 from being separated unnecessarily during the carrying process or the storage process but easily breaks when the predetermined value or more of the pulling-out force is applied to the packaging members 812 and 814 allowing the packaging members 882 and 884 to be separated.

Thus, in the packaging paper relating to the eighth embodiment, the packaging members 882 and 884 are prevented from being separated accidentally without using an adhesive tape. Accordingly, the number of parts which form the packaging paper can be reduced.

The adhesive agent 896 which adheres the overlapped portion 894 may be of any type and is not particularly limited to the one described above as long as the above-described conditions are satisfied. For example, the adhesive agent 896 may be a hot melt adhesive which is melted by heating to become a liquid state and is solidified for a short cooling time, or may be an ordinary adhesive agent such as glue or the like which is liquious or in a gel state in an ordinary temperature and solidified by drying or the other process.

Figure 33:
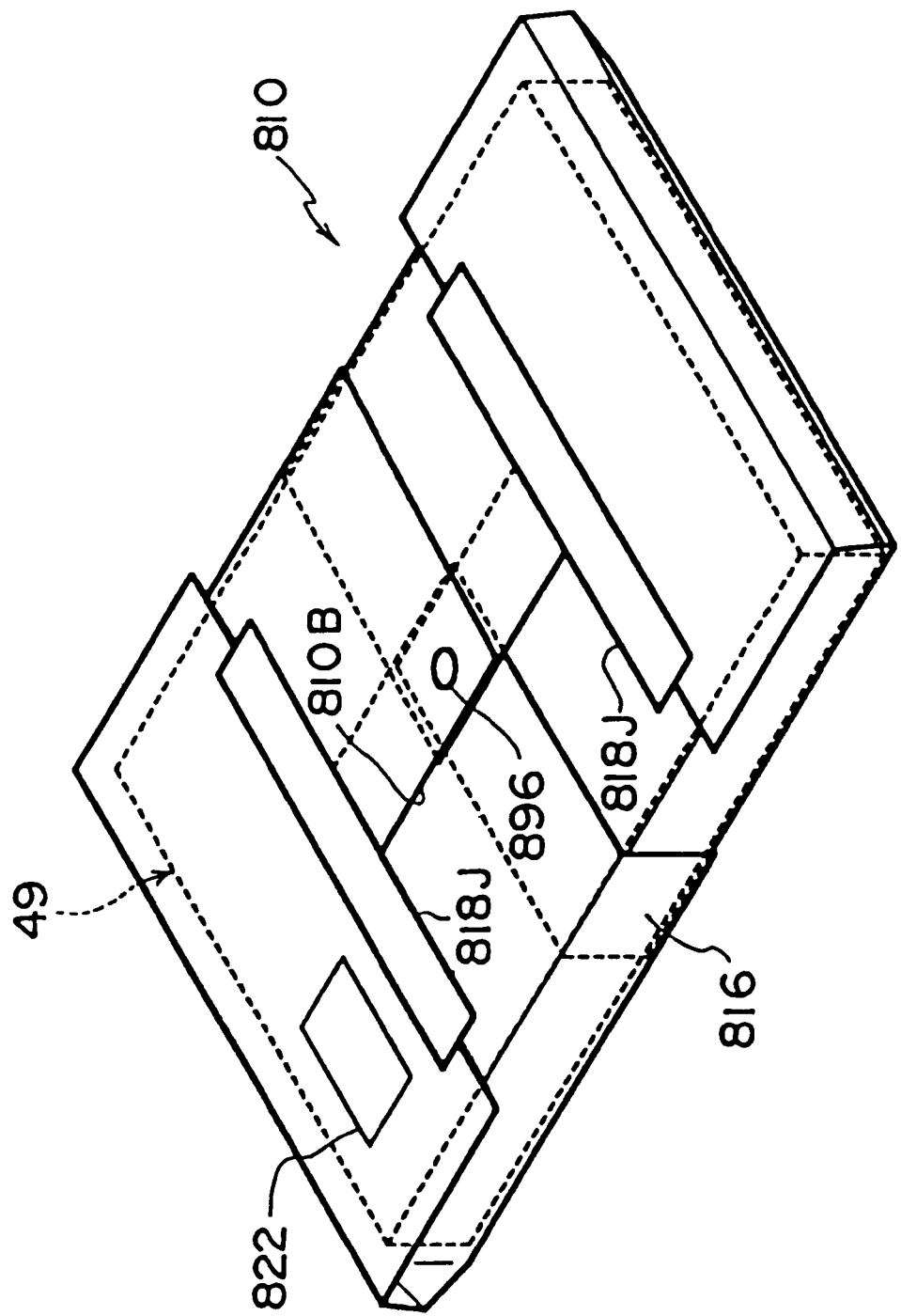
FIG. 33 is a perspective view which shows a state in which a bundle of photosensitive printing plates are packaged in the packaging paper of the eighth embodiment using fixing means which is different from the one shown in FIG. 14.

Further, the configuration or the attached positions of the adhesive tapes may not necessarily be the configurations or attached positions shown in FIGS. 11, 14, 21, 22, 26, 29 and 30. For example, FIG. 33 shows adhesive tapes 81&J which are longer in the transverse direction of the bundle 49 than those shown in FIG. 14 in the packaging paper 410 of the fourth embodiment. The adhesive strength of the adhesive tapes can be significantly increased by such a simple modification in which the lengths of the adhesive tapes in the transverse direction of the bundle 49 are increased.

Further, the range which is adhered by the adhesive agent need not extend over the entire overlapped portion 816 which corresponds to the overlapped portion 416 shown in FIG. 14, and only a part of the overlapped portion may be adhered by the adhesive agent 896. For example, in the example shown in FIG. 33, only a substantially central portion of the packaging paper 810 is adhered by the adhesive agent 896. A display portion 822 is provided.

Figure 34:
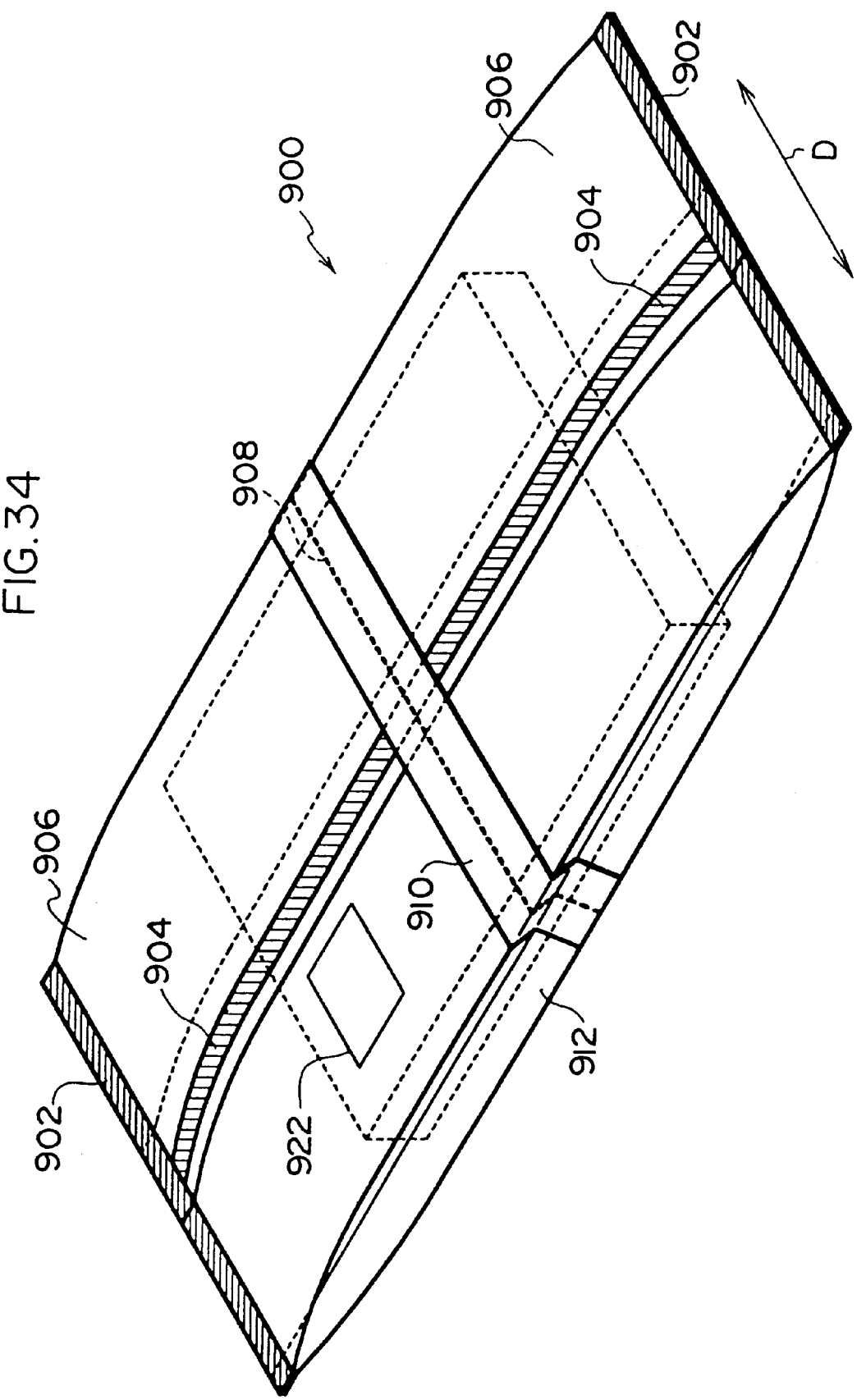
FIG. 34 is a perspective view which shows a state in which a bundle of photosensitive printing plates are packaged in a packaging paper based on a ninth embodiment of the present invention.

FIG. 34 shows a packaging paper 900 in a ninth embodiment of the present invention. This packaging paper 900 is different from the packaging paper in the fourth through eighth embodiments and is formed by a sheet-typed packaging member. A thin film-shaped material which is melted by a predetermined amount of heating and thus allows heat sealing is used as a material of the packaging member.

In this packaging paper 900, as can be seen from FIG. 34, the portions of the packaging member at the transverse direction (the direction of arrow D) end sides are folded over on the upper surface of the bundle 49, and further, the overlapped portions of the packaging member are linearly heat sealed by predetermined widths at the longitudinal direction (the direction orthogonal to that of arrow D) ends of the packaging member. Melt-adhesion portions 902 are thereby formed.

Moreover, the portions overlapped on the upper surface of the bundle 49 are also heat sealed and a melt-adhesion portion 904 is formed. In this way, the packaging paper 900, which is so-called "pillow-type packaging", packages and completely shields from light the bundle 49 of the photosensitive printing plates 42.

In the state shown in FIG. 34, the portions in the vicinity of the melt-adhesion portions 902 of the packaging paper 900 jut out of the bundle 49. When the bundle 49 of the photosensitive printing plates 42 packaged in the packaging member 900 is loaded into the photosensitive printing plate supplying apparatus 432 (see FIG. 17), the portions in the vicinity of the melt-adhesion portions serve as jutting-out portions 906 which jut out of the photosensitive printing plate supplying apparatus 432.

Further, in this packaging member which forms the packaging paper 900, perforations 908, which are formed by through-holes which penetrate the packaging material in the thickness direction, are provided at the portions to be separated such that the perforations 908 are arranged intermittently at predetermined intervals along the portions to be separated. The perforations 908 are formed at predetermined positions so as to encircle the bundle 49 in the package at a center of the bundle 49 in the longitudinal direction (the direction orthogonal to that of arrow D) thereof in a state in which the bundle 49 of the photosensitive printing plates 42 is packaged in the packaging member. The strength of the packaging member against a pulling-out force is partially weakened due to these perforations 908.

Moreover, a belt-shaped light-shielding belt 910 which covers the packaging member at a predetermined width is attached to the packaging member along the perforations 908. Due to this light-shielding belt 910, entry of light into the packaging paper 900 through the perforations 908 is prevented and the photosensitive printing plates 42 enveloped in the packaging paper 900 is prevented from being accidentally exposed.

Consequently, the bundle 49 of the photosensitive printing plates 42 is packaged and light-shielded by the packaging paper 900. In short, the packaging paper 900 comprises a packaging paper main body 912 which packages and shields the bundle 49 of the photosensitive printing plates 42 from light and the jutting-out portions 906 which are provided at this packaging paper main body 912. A display portion 922 is provided.

When the bundle 49 of the photosensitive printing plates 42 enveloped in the above-structured packaging paper 900 is loaded into the photosensitive printing plate supplying apparatus 432, the jutting-out portions 906 can be made jut out of the photosensitive printing plate supplying apparatus 432. The jutting-out portions 906 are then pulled out so that a portion of the photosensitive printing plate 42 can be exposed within the photosensitive printing plate supplying apparatus 432.

The packaging paper 900 relating to the ninth embodiment, as the packaging paper 900 can be formed by the one sheet of packaging member, the number of parts required to form the packaging paper is reduced compared to the packaging papers relating to the fourth through eighth embodiments.

The melt-adhesion portions 902 and 904 need not be formed at the above-described positions and may be formed at any positions as long as the bundle 49 of the photosensitive printing plates 42 are packaged by the packaging member in a pillow-type packaging and the photosensitive printing plates 42 are prevented from being accidentally exposed. For example, the melt-adhesion portions 902 may not be formed and may be formed at the positions which are closer to the bundle 49 of the photosensitive printing plates 42, instead of at the longitudinal direction (the direction orthogonal to arrow D) end portions of the packaging member.

Figure 35:
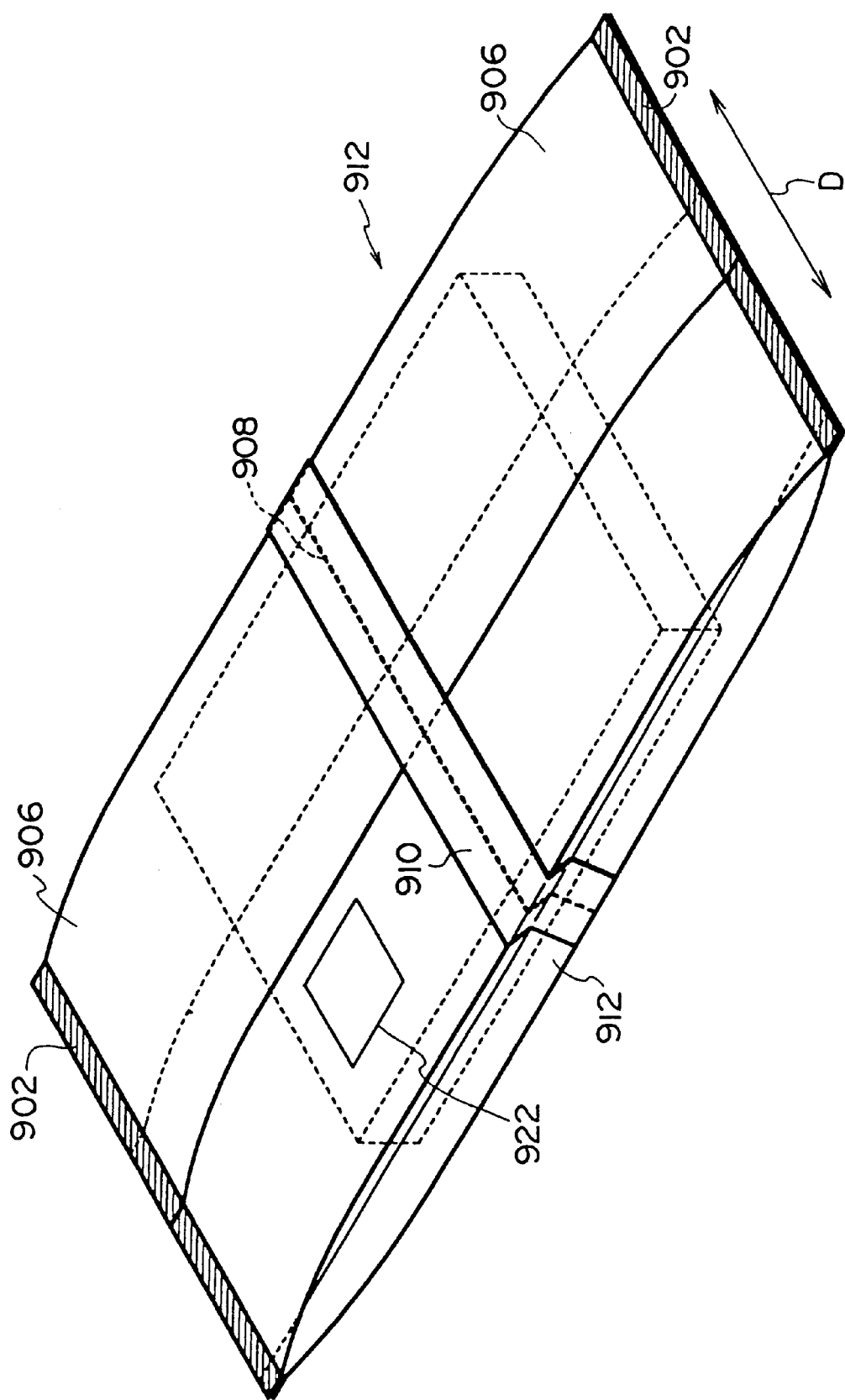
FIG. 35 is a perspective view which shows another state in which the bundle of photosensitive printing plates are packaged in the packaging paper of the ninth embodiment.

In a modified packaging paper 912 shown in FIG. 35, the melt-adhesion portion 904 of the packaging paper 900 shown in FIG. 34 is omitted. Namely, when the bundle 49 of the photosensitive printing plates 42 is reliably light-shielded, the melt-adhesion portion 904 may be omitted.

A structure for partially weakening the strength against the pulling-out force applied to the packaging member is not limited to the perforations 908. In short, it suffices as long as fragile portions are provided so that the packaging member is divided into two or more pieces by the predetermined value or more of the pulling-out force applied thereto. For example, a thin portion or a fragile portion such as a fold or the like may be provided at the same position as those of the perforations 908. When the fragile portion which does not penetrate the packaging member is provided, the light-shielding belt 910 is not required.

Figure 36:
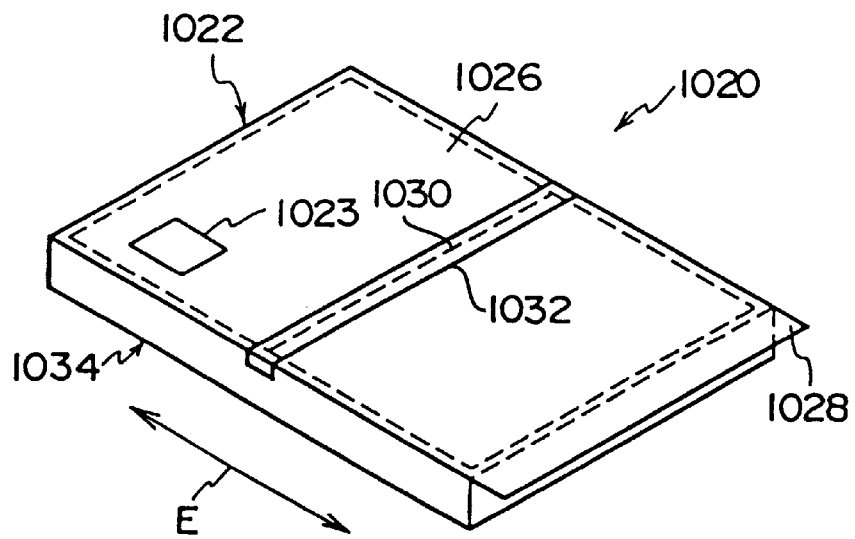
FIG. 36 is a perspective view which shows a state in which an opening portion of a packaging material based on a tenth embodiment of the present invention is closed.
Figure 37:
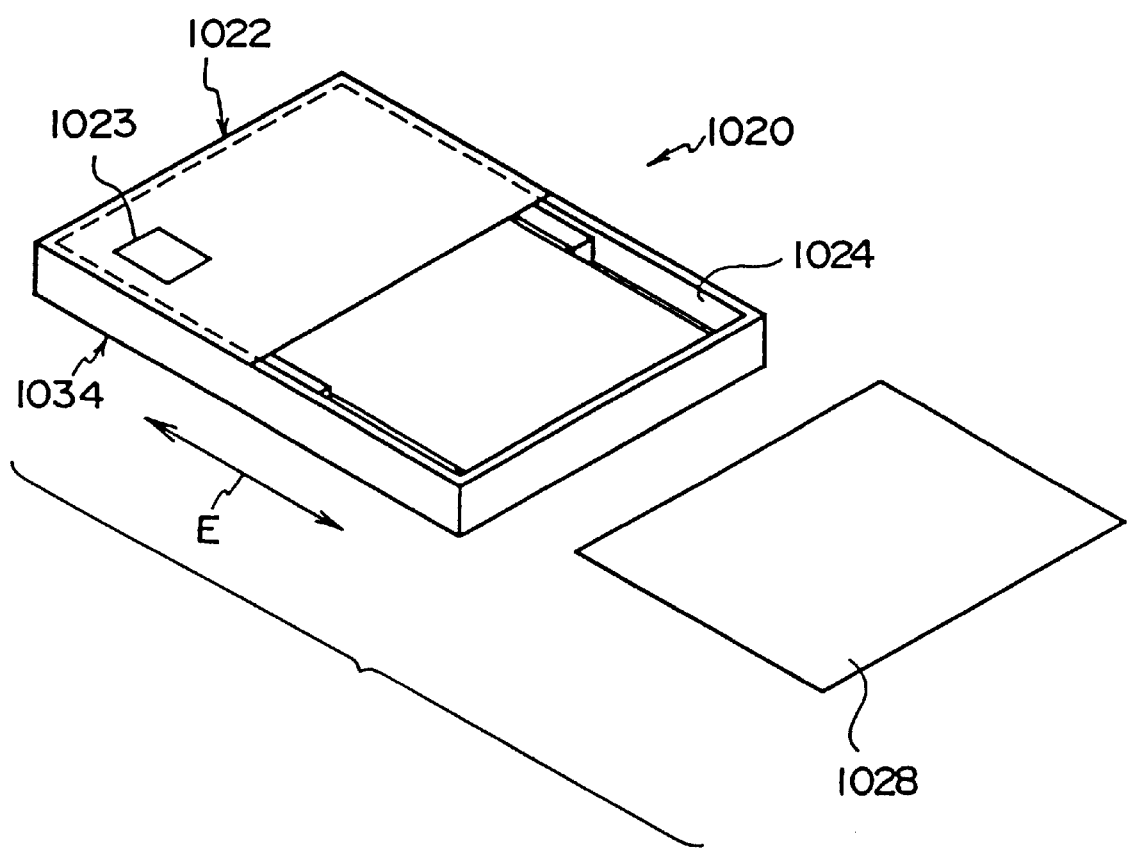
FIG. 37 is a perspective view which shows a state in which the opening portion of the packaging material of the tenth embodiment is opened.

FIGS. 36 and 37 show a packaging member 1020 in a tenth embodiment of the present invention. This packaging member 1020 includes-an accommodation box 1022, within which the bundle 49 of the photosensitive printing plates 42 is accommodated. The accommodation box 1022 is formed in a flat rectangular parallelopiped box shape which opens on the upper side so as to form an opening portion 1024. A display portion 1023 is provided.

The accommodation box 1022 is different from the packaging members in the fourth through ninth embodiments in both material and structure and is formed by a material having predetermined rigidity (metal, resin, wood, corrugated cardboard, thick paper, a paper-made complex (such as a honeycomb material, a core material, or the like). The accommodation box 1022 is designed such that the configuration of the accommodation box 1022 is not easily changed by external force.

A light-shielding paper 1026 is attached to the opening portion 1024 and the interior of the accommodation box 1022 is light-shielded by this light-shielding paper 1026.

The configuration of the light-shielding paper 1026 is substantially the same as that of the opening portion 1024. However, the length of the light-shielding paper 1026 is longer than that of the accommodation box 1022 in the longitudinal directions (the directions of arrow E) and the light-shielding paper 1026 juts out of the accommodation box 1022. In a state in which the accommodation box 1022 is loaded into the photosensitive printing plate supplying apparatus 432 (see FIG. 17), this jutting-out portion 1028 juts out of the photosensitive printing plate supplying apparatus 432.

Further, perforations 1030 which penetrate the light-shielding paper 1026 in the thickness direction are formed at substantially in a center of the light-shielding paper 1026 in the longitudinal direction such the perforations 1030 are arranged intermittently at predetermined intervals along the center portion. Moreover, a light-shielding belt 1032 which covers the light-shielding paper 1026 is adhered to the light-shielding paper 1026 along the perforations 1030, so that the photosensitive printing plates 42 accommodated within the accommodation box 1022 are not accidentally exposed by light which enters through the perforations 1030.

Consequently, the bundle 49 of the photosensitive printing plates 42 is packaged and light-shielded by the accommodation box 1022 and the light-shielding paper 1026. The photosensitive printing plate packaging means based on the tenth embodiment, in short, comprises the accommodation box 1022 and the light-shielding paper 1026. More specifically, the packaging member 1020 comprises a packaging means main body 1034 which packages and shields the bundle 49 of the photosensitive printing plates 42 from light and the jutting-out portion 1028 which is provided at this packaging member main body 1034.

When the bundle 49 of the photosensitive printing plates 42 which is accommodated and light-shielded in the above-structured packaging member 1020 is loaded into the photosensitive printing plate supplying apparatus 432, the jutting-out portion 1028 can be made jut out of the photosensitive printing plate supplying apparatus 432. The jutting-out portion 1028 is then pulled out so that a portion of the photosensitive printing plate 42 can be exposed within the photosensitive printing plate supplying apparatus 432.

Instead of the perforations 1030, a thin portion or a fragile portion such as a fold which does not penetrate the light-shielding paper 1026 may be provided. In this case, the light-shielding belt 1032 may be omitted.

Figure 38:
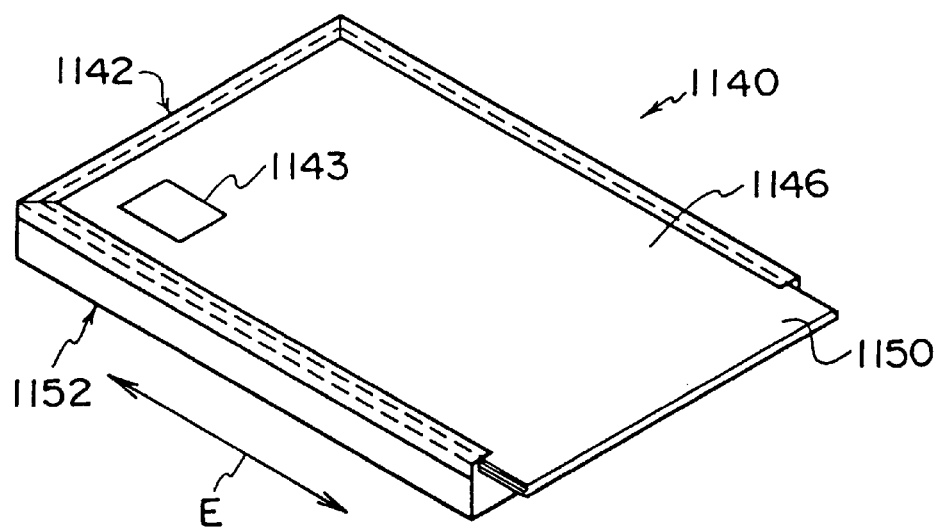
FIG. 38 is a perspective view which shows a state in which an opening portion of a packaging material based on an eleventh embodiment of the present invention is closed.
Figure 39:
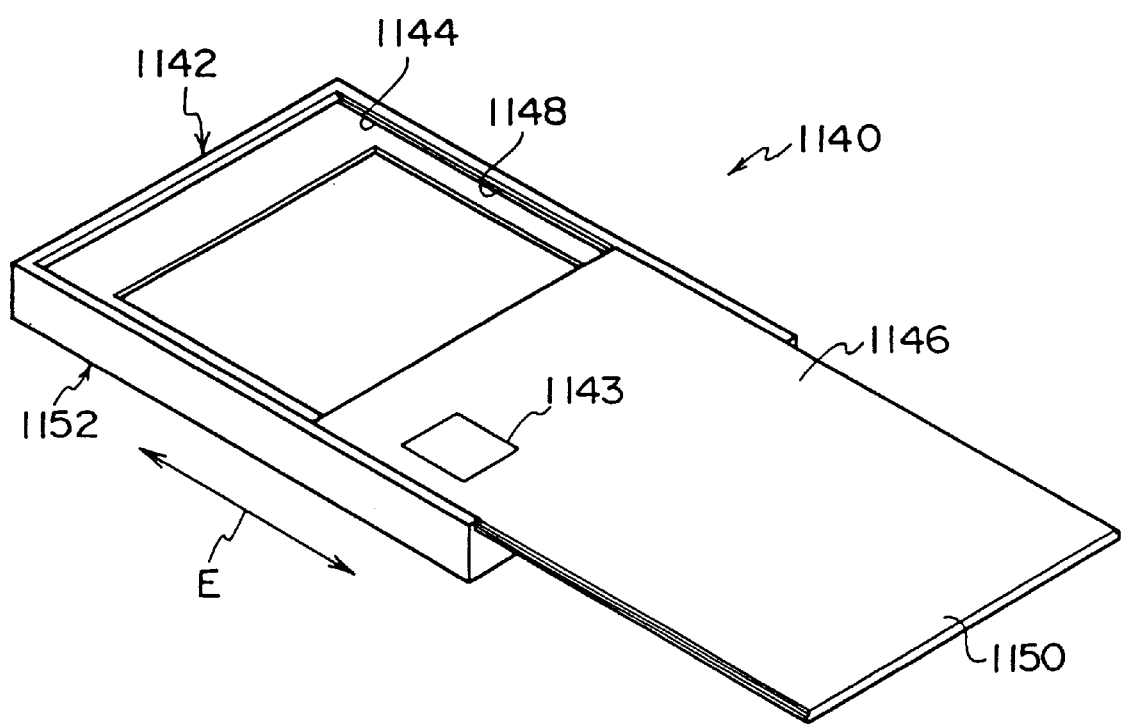
FIG. 39 is a perspective view which shows a state in which the opening portion of the packaging material of the eleventh embodiment is opened.

FIGS. 38 and 39 show a packaging member 1140 in an eleventh embodiment of the present invention. This packaging member 1140 includes an accommodation box main body 1142 which has substantially the same structure as that of the accommodation box 1022 in the tenth embodiment. However, it is different in that the interior of the accommodation box main body 1142 is shielded by the light-shielding plate 1146 instead of the light-shielding paper 1026 in the tenth embodiment. A display portion 1043 is provided.

The light-shielding plate 1146 is formed in a rectangular plate shape by the material having predetermined rigidity such as metal, resin, wood, corrugated cardboard, thick paper, a paper-made complex, or the like (the material may be the same as or different from that of the accommodation box main body 1142). A groove 1148 is formed at the periphery of an opening portion 1144 of the accommodation box main body 1142, and transverse direction end portions of the light-shielding plate 1146 are engaged with this groove 1148. The light-shielding plate 1146 can slide in the longitudinal directions (the directions of arrow E) along the groove 1148.

The length of the light-shielding plate 1146 is longer than that of the accommodation box main body 1142 in the longitudinal directions, and a portion of the light-shielding plate 1146 juts out of the accommodation box main body 1142. When the accommodation box main body 1142 is loaded into the photosensitive printing plate supplying apparatus 432 (see FIG. 17), this jutting-out portion 1150 juts out of the photosensitive printing plate supplying apparatus 432.

Consequently, the bundle 49 of the photosensitive printing plates 42 is packaged and light-shielded in the accommodation box main body 1142 and the light-shielding plate 1146. The photosensitive printing plate packaging means based on the eleventh embodiment, in short, comprises the accommodation box main body 1142 and the light-shielding plate 1146. More specifically, the packaging member 1140 comprises a packaging means main body 1152 which packages and shields the bundle 49 of the photosensitive printing plates 42 from light and the jutting-out portion 1150 which is provided at this packaging member main body 1152.

When the bundle 49 of the photosensitive printing plates 42 which is accommodated and light-shielded in the above-structured packaging member 1040 is loaded into the photosensitive printing plate supplying apparatus 432, the jutting-out portion 1150 can be made to jut out of the photosensitive printing plate supplying apparatus 432. The jutting-out portion 1150 is pulled out so that a portion of the photosensitive printing plate 42 can be exposed within the photosensitive printing plate supplying apparatus 432.

In the above descriptions, the bundle 49 of the photosensitive printing plates 42 is packaged in the form of caramel packaging and pillow-type packaging (in the fourth to the ninth embodiments), and further, in the accommodation box 1022 or 1142 and the light-shielding paper 1026 or the light-shielding plate 1146 (in the tenth and the eleventh embodiments). However, it should be noted that the form of packaging is not limited to these examples. In short, it suffices as long as the bundle 49 of the photosensitive printing plates 42 is packaged and completely shielded from light properly such that unnecessary exposure of the printing plates 42, is avoided.

For example, a three-sided seal packaging or a four-sided seal packaging may be used. Further, it is possible that perforations as shown in FIG. 34 or FIG. 35 are formed on one sheet of packaging member and the bundle 49 of the photosensitive printing plates 42 is packaged in the form of caramel packaging with the one sheet of packaging member. Moreover, it is possible that the packaging paper which is the same as that of the fourth embodiment is used and the bundle 49 of the photosensitive printing plates 42 is packaged in the form of pillow-type packaging with the packaging paper.

Further, the way of opening the opening portion 1024 of the accommodation box 1022 or the opening portion 1144 of the accommodation box main body 1142 is not limited to the one described above. For example, it is possible that the light-shielding plate 1146 is rotatably attached to a corresponding portion of the accommodation box 1022 or 1142 by a hinge or the like and is lifted up by the suction cup or the like, to open the opening portion 1024 or 1144.

Similarly, the jutting-out portion is not limited to the one described above. In short, the jutting-out portion may be modified as desired as long as the jutting-out portion juts out of the photosensitive printing plate supplying apparatus 432 in a state in which the packaging member is loaded into the photosensitive printing plate supplying apparatus 432 and the loading opening 438 is closed with the slide door 440.

Further, by attaching a holding member such as a cord or a grip to the jutting-out portion for gripping the jutting-out portion, pulling-out force can be more easily applied to the jutting-out portion. Or, as the holding member, a hole may be formed at an appropriate position of the jutting-out portion so that the existence of a hole would not mar the light-shielding properties of the packaging member, so that a finger or the like is inserted through this hole so as to hold the jutting-out portion. In this case, the hole essentially constitutes the holding member.

In any case, when there is the concern that light enters the interior of the package through the separate portions or the like of the packaging member, the entry of light is to be prevented by the light-shielding portion which is similar to the light-shielding belt 910 in the ninth embodiment so that the exposure of the photosensitive printing plates 42 is prevented.

Still further, the structure of the packaging means (paper) is not necessarily limited to the one in which the bundle 49 of the photosensitive printing plates 42 is eventually exposed by separating the packaging means into two or more. For example, by arranging the package means (paper) such that the entire packaging paper is pulled out of the photosensitive printing plate supplying apparatus 432 when the jutting-out portion is pulled out, all of the bundle 49 of the photosensitive printing plates 42 can be exposed within the photosensitive printing plate supplying apparatus 432. In this case, by providing a material which has small coefficient of friction with respect to the packaging paper on the mounting surface, the packaging paper can be pulled out of the photosensitive printing plate supplying apparatus 432 by a relatively small pulling-out force.

Test Example

Next, the present invention will be described in detail by a specific test example. It should be noted that the present invention is not limited to the following example.

In the present test example, the bundle 49 of the photosensitive printing plates 42 was packaged and light-shielded in the packaging member 410 of the fourth embodiment (see FIGS. 11 through 14).

The size of the photosensitive printing plate 42 was 1033 mm by 800 mm and the thickness thereof was 0.33 mm.

The superposed paper 44 was a paper manufactured from a bleached pulp and having the basic weight of 38 g/m² and the density of 0.75 g/cm³. Then, thirty sheets of the photosensitive printing plate 42 and thirty sheets of the superposed paper 44 were alternately superposed so as to form the bundle 49 of the photosensitive printing plates 42.

As the packaging members 412 and 414, the aluminum foil having the thickness of 6 μm was adhered to the kraft paper having the basic weight of 83 g/m² by a linear low density polyethylene having the thickness of 10 μm and then the two sheets of aluminum kraft paper were prepared by cutting the above-mentioned aluminum adhered paper to the size of 1800 mm (long edge) by 900 mm (short edge). The portions of the two packaging members 412 and 414 (aluminum kraft paper) at the long edges 412A and 414A sides were overlapped by the width W1 of 200 mm (see FIG. 11) so as to form the overlapped portion 416. As a result, the packaging paper 410 having the long edges 412B and 414B of 1800 mm and the short edges 410A and 410B of 1600 mm was formed.

The aluminum foil of this aluminum kraft paper was placed on the top, and the bundle 49 was placed onto the center of the aluminum kraft paper so that the long edges 412B and 414B and the short edge of the bundle 49 were parallel. Then, the packaging members 412 and 414 were bent along the long edge of the bundle 49 and folded over on the bundle 49. The overlapped portion over the bundle 49 was fixed by the adhesive tape 418B. Further, the portions of the aluminum kraft paper at the long edges 412B and 414B sides were folded over on the upper surface of the bundle 49 and the overlapped portion was fixed by the adhesive tapes 418C and 418D. In this way, the bundle 49 was packaged and light-shielded in the packaging paper 410.

The bundle 49 of the photosensitive printing plates 42 packaged in the packaging paper 410 was then placed in the box 476 shown in FIG. 15 and conveyed to a destination.

At the destination, the box 476 was opened and the bundle 49 of the photosensitive printing plates 42 packaged in the packaging paper 410 was taken out and loaded in a bright room into the photosensitive plate supplying apparatus 432 shown in FIG. 17. As shown in FIG. 17, the jutting-out portion 420 was made jut out of the photosensitive printing plate supplying apparatus 432, and the slide door 440 is slid upwardly, so that the interior of the photosensitive printing plate supplying apparatus 432 was light-shielded.

The operator then pulled out the jutting-out portion 420 by hand, and the packaging member 414 formed by the aluminum kraft paper was separated from the packaging member 412. As a result, the portion (the upper half) of the photosensitive printing plate 42 was exposed within the photosensitive printing plate supplying apparatus 432. In this state, the supporting stand 444 was moved and the photosensitive printing plate supplying apparatus 432 was accommodated within the automatic plate making machine 20. Further, the slide door 440 was slid downwards and the loading opening 438 was exposed. The photosensitive printing plate 42 was lifted up by the suction cup 430 (see FIG. 16) and conveyed to the exposure apparatus 426.

By the results of the test example, it was demonstrated that the photosensitive printing plate supplying apparatus and the photosensitive printing plate packaging means based on the present invention suitably functioned in the actual use and achieved the desired effect.

As described above, in short, in accordance with the photosensitive printing plate packaging means based on the fourth through eleventh embodiments of the present invention, the photosensitive printing plate can be loaded into the photosensitive printing plate supplying apparatus under the bright environment, the operational efficiency improves, and the operator's burden is reduced.

What is claimed is:

1. A photosensitive printing plate supplying apparatus comprising:

printing plate packaging means which accommodates a bundle of photosensitive printing plates and which has an opening/closing lid which can open and close a supply opening through which the photosensitive printing plates are taken out;

a printing plate accommodating portion which can be opened/closed, and to which said printing plate packaging means is removably attached when the accommodation portion is in an opened state, the supply opening being closed by the opening/closing lid of said printing plate packaging means when said printing plate packaging means is attached to said printing plate accommodating portion, and which is completely shielded from light when the accommodation portion is in a closed state;

taking-out/conveying means which takes out the photosensitive printing plates one by one from the interior of said printing plate packaging means whose supply opening is opened in said printing plate accommodating portion in the closed state, and conveys the photosensitive printing plate to a predetermined position; and lid opening/closing means which, when the taking-out operation by said taking-out/conveying means is started, moves the opening/closing lid of said printing plate packaging means to an opening position in which the supply opening is opened, and after the taking-out operation by said taking-out/conveying means is completed, said lid opening/closing means returns the opening/closing lid of said printing plate packaging means to a closing position in which the supply opening is closed.

2. A photosensitive printing plate supplying apparatus according to claim 1, wherein said printing plate packaging means includes a box main body, which is formed in a box shape such that the bundle of photosensitive printing plates can be accommodated therein and which is provided with the supply opening through which the photosensitive printing plates are taken out, and an opening/closing lid which can be removably attached to said box for opening/closing the supply opening.

3. A photosensitive printing plate supplying apparatus according to claim 1, wherein said printing plate packaging means includes a box main body, which is formed in a box shape such that the bundle of photosensitive printing plates can be accommodated therein and which is provided with the supply opening through which the photosensitive printing plates are taken out, and an opening/closing lid which can be swingably attached to said box for opening/closing the supply opening.

4. A photosensitive printing plate supplying apparatus according to claim 1, wherein said printing plate packaging means includes a box main body, which is formed in a box shape such that the bundle of photosensitive printing plates can be accommodated therein and which is provided with the supply opening through which the photosensitive printing plates are taken out, and an opening/closing lid which can be slidably attached to said box for opening/closing the supply opening.

5. A photosensitive printing plate supplying apparatus according to claim 1, wherein said lid opening/closing means includes a lid sucking portion, and the lid sucking portion sucks and opens/closes said opening/closing lid of said printing plate packaging means.

6. A photosensitive printing plate supplying apparatus according to claim 5, wherein said lid sucking portion includes a suction cup and a suction tube which extends from a suction port of a suction pump and is connected to the suction cup, and the suction cup sucks the photosensitive printing plate at a negative pressure which is generated by the suction pump and transmitted via the suction.

7. A photosensitive printing plate supplying apparatus according to claim 6, wherein said lid opening/closing means includes pressure adjusting means which adjusts pressure at the suction cup such that a predetermined value or less of the pressing force is applied to said printing plate packaging means by the suction cup.

* * * * *